(12) United States Patent
Uehara

(10) Patent No.: US 8,681,075 B2
(45) Date of Patent: Mar. 25, 2014

(54) DISPLAY DEVICE AND ELECTRONIC APPLIANCE

(71) Applicant: NLT Technologies, Ltd, Kanagawa (JP)

(72) Inventor: Shinichi Uehara, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/630,543

(22) Filed: Sep. 28, 2012

(65) Prior Publication Data

US 2013/0033466 A1 Feb. 7, 2013

Related U.S. Application Data

(63) Continuation of application No. 12/388,772, filed on Feb. 19, 2009, now Pat. No. 8,362,975.

(30) Foreign Application Priority Data

Mar. 31, 2008 (JP) ................................. 2008-092865

(51) Int. Cl.
*G09G 5/00* (2006.01)

(52) U.S. Cl.
USPC ............................................. 345/32; 345/204

(58) Field of Classification Search
USPC ............................................. 345/89, 32, 204
See application file for complete search history.

(56) References Cited

U.S. PATENT DOCUMENTS

| | | |
|---|---|---|
| 6,271,896 B2 | 8/2001 | Moseley et al. |
| 7,965,365 B2 | 6/2011 | Uehara et al. |
| 2006/0050385 A1 | 3/2006 | Uehara et al. |
| 2006/0097971 A1* | 5/2006 | Lee et al. .......................... 345/89 |
| 2006/0126156 A1 | 6/2006 | Evans et al. |
| 2007/0285775 A1 | 12/2007 | Lesage et al. |
| 2009/0102990 A1* | 4/2009 | Walton et al. .................... 349/15 |
| 2011/0205623 A1 | 8/2011 | Uehara et al. |

FOREIGN PATENT DOCUMENTS

| | | |
|---|---|---|
| CN | 1744724 | 3/2006 |
| JP | 6-110403 | 4/1994 |
| JP | 2003-233074 | 8/2003 |

(Continued)

OTHER PUBLICATIONS

Notification of First Office action issued May 22, 2012 by the State Intellectual Property Office of the People's Republic of China in corresponding Chinese Patent Application No. 200910133036.6, with English translation, 19 pages.

(Continued)

*Primary Examiner* — Quan-Zhen Wang
*Assistant Examiner* — Tony Davis
(74) *Attorney, Agent, or Firm* — Young & Thompson

(57) ABSTRACT

To provide a display device that is capable of achieving a sufficient confidentiality keeping performance for directions other than a specific direction without a troublesome work such as wearing special eyeglasses. The display device includes: a plurality of display units each having a main pixel for displaying a first image and a sub-pixel for displaying a second image arranged in matrix in a first direction and a second direction; and an optical member which distributes light emitted from the plurality of display units towards different directions along the first direction. The display unit has a first display area in which the main pixel and the sub-pixel are formed in the second direction, and a second display area in which only the main pixel is formed.

16 Claims, 39 Drawing Sheets

(56) References Cited

FOREIGN PATENT DOCUMENTS

| JP | 2004-302186 | 10/2004 |
| JP | 2005-316211 | 10/2005 |
| JP | 2007-333867 | 12/2007 |
| WO | 2006/126659 | 11/2006 |

OTHER PUBLICATIONS

Japanese Office Action issued Aug. 1, 2012 in corresponding Japanese Patent Application No. 2008-092865 with English translation of the relevant portion.

* cited by examiner

DISPLAY DEVICE AND ELECTRONIC APPLIANCE

CROSS-REFERENCE TO RELATED APPLICATION

This application is based upon and claims the benefit of priority from Japanese patent application No. 2008-092865, filed on Mar. 31, 2008, the disclosure of which is incorporated herein in its entirety by reference.

BACKGROUND OF THE INVENTION

1. Field of the Invention

The present invention relates to a display device, an electronic appliance, an optical member, a display panel, a controller, and a control method and a control program for driving the display panel.

2. Description of the Related Art

Due to rapid developments in display devices, those display devices are loaded on various terminal devices in large and small sizes and used in various scenes.

When displaying important information such as privacy information that needs to be kept confidential, it is necessary to have a confidentiality keeping function so that such information cannot be exposed to the eyes of third parties. Therefore, there has been investigated to develop a peeping prevention technique that is capable of concealing the displayed information.

As related techniques of such display device, there are those disclosed in Japanese Unexamined Patent Publication 6-110403 (Patent Document 1) and Japanese Unexamined Patent Document 2003-233074 (Patent Document 2) described below, for example.

Patent Document 1 discloses a structure in which a visualizing device is placed between a specific user and a display panel.

The visualizing device is an optical shutter which selectively transmits only a specific image that is required by the specific user from a plurality of images that are displayed sequentially on the display panel.

This makes it possible only for the specific user who has the visualizing device to visually recognize confidential information.

Other surrounding unspecified people having no visualizing device are to visually recognize a plurality of sequentially displayed images in a mixed manner, so that those unspecified people cannot recognize the confidential information. With this, a confidentiality keeping function can be achieved.

Further, regarding a liquid crystal display device depicted in Patent Document 2, disclosed is a structure in which area with a different alignment condition of liquid crystal molecules is formed larger than a pixel. In the area larger than the pixel, different viewing angle properties can be achieved due to the difference in the alignment conditions.

Thus, the alignment condition and the driving condition are so set that the patterns of the area with different alignment condition are visually recognized when the display device is viewed from directions other than the front-face direction.

This makes it possible to display the fixed patterns in a superimposed manner for oblique directions, so that displayed information can be prevented from being visually recognized from those directions.

In the meantime, almost no pattern of the area with different alignment condition is visually recognized when the display device is viewed from the front-face direction, so that the displayed information can be visually recognized from that direction.

Furthermore, with the liquid crystal display device disclosed in Patent Document 2, the confidentiality keeping function is achieved by utilizing the angles of viewing the display device. Therefore, it is unnecessary to wear special optical shutter eye glasses, so that a troublesome work for the users can be lightened.

However, there are following shortcomings in the display devices of the related techniques.

That is, with the display device depicted in Patent Document 1, there is such a shortcoming that it requires a troublesome work of wearing special optical shutter eyeglasses as mentioned above.

Further, with the liquid crystal display device depicted in Patent Document 2, there may be cases where third parties can grasp displayed contents because the patterns that can be superimposed on the displayed image are coarser than the pixels and fixed, even though no troublesome work of wearing special eyeglasses is required.

Furthermore, there is also such a shortcoming that a normal display cannot be done, since the fixed patterns are always superimposed on the display images for the directions other than the front-face direction.

SUMMARY OF THE INVENTION

The present invention has been designed to overcome the foregoing shortcomings of the above-described techniques. An exemplary object of the present invention is to provide a display device, an electronic appliance, an optical member, a display panel, a controller, and a control method and a control program for driving the display panel, which require no troublesome work of wearing special eyeglasses and are capable of switching to a normal display while decreasing the visibility of displayed information for the directions other than a specific direction.

In order to achieve the foregoing exemplary object, the display device according to an exemplary aspect of the invention includes: a display part in which a plurality of display units each containing a main pixel for displaying a first image and a sub-pixel for displaying a second image are arranged in matrix in a first direction and a second direction that crosses with the first direction; and an optical member provided by being corresponded to each of the display units for distributing light emitted from the display units to different directions at least along the first direction, wherein a display area of the display unit includes a first display area in which the main pixel and the sub-pixel are formed in the second direction, and a second display area in which only the main pixel is formed in the second direction.

The optical member according to another exemplary aspect of the invention is an optical member provided by being opposed to a display panel. The optical member includes a plurality of stacked parallax barriers, each having a large number of apertures and a large number of slits formed between the apertures on a face opposing to the display panel, wherein each of the parallax barriers is stacked in such a manner that positions of the apertures in one of the parallax barriers substantially coincide with positions of the apertures in the other parallax barrier, and positions of the slits in one of the barriers and positions of the slits in the other parallax barrier become different from each other.

The display panel according to still another exemplary aspect of the invention is a display panel in which a plurality of display units each containing a main pixel for displaying a first image and a sub-pixel for displaying a second image are arranged in matrix in a first direction and a second direction that crosses with the first direction, wherein a display area of the display unit includes a first display area in which the main pixel and the sub-pixel are formed in the second direction, and a second display area in which only the main pixel is formed in the second direction.

The controller according to still another exemplary aspect of the invention is a controller for controlling each circuit which respectively controls scanning lines and signal lines of a display panel containing main pixels and sub-pixels. The controller includes: a mode switching control part for switching a display angle limited mode which displays a first image on the main pixels and a second image on the sub-pixels and a normal display mode which displays the first image on the main pixels and the sub-pixels, respectively; and a display control part for executing a control so as to display the first image and the second image in a first display area that is a part of the display unit configured with the main pixel and the sub-pixel in the display angle limited mode, and to display the first image in a second display area that is a part of the display unit configured only with the main pixel.

The driving control method of a display according to still another exemplary aspect of the invention is a method a display panel in which a plurality of display units each containing a main pixel for displaying a first image and a sub-pixel for displaying a second image are arranged in matrix in a first direction and a second direction that crosses with the first direction. The display unit has a first display area in which the main pixel and the sub-pixel are formed in the second direction, and a second display area in which only the main pixel is formed in the second direction, wherein the method executes a control to display the first image and the second image in the first display area, and to display the first image in the second display area by performing a drive to execute polarity inversion of each pixel so that the main pixel and the sub-pixel come to be in a same polarity.

The control program according to still another exemplary aspect of the invention is a program for allowing a computer, which is provided to a controller that controls a display panel containing main pixels and sub-pixels, to execute various functions. The program includes: a mode switching control function for switching a display angle limited mode which displays a first image on the main pixels and a second image on the sub-pixels and a normal display mode which displays the first image on the main pixels and the sub-pixels, respectively; and a display control function for executing a control so as to display the first image and the second image in a first display area that is a part of the display unit configured with the main pixel and the sub-pixel in the display angle limited mode, and to display the first image in a second display area that is a part of the display unit configured only with the main pixel.

BRIEF DESCRIPTION OF THE DRAWINGS

FIGS. 8A-8J are timing charts showing examples of display operations performed in the display device according to the exemplary embodiment, in which: FIG. 8A shows a case where the lateral axis is time and the longitudinal axis is output voltage of a common electrode control circuit to a common electrode and storage capacity line; FIG. 8B shows a case where the lateral axis is time and the longitudinal axis is output voltage to a scanning line that is connected to a main pixel of a display unit positioned in the first row and the first column; FIG. 8C shows a case where the lateral axis is time and the longitudinal axis is output voltage to a scanning line that is connected to a sub-pixel of the display unit positioned in the first row and the first column; FIG. 8D shows a case where the lateral axis is time and the longitudinal axis is output voltage to a scanning line that is connected to a main pixel of a display unit positioned in the second row and the first column; FIG. 8E shows a case where the lateral axis is time and the longitudinal axis is output voltage to a scanning line that is connected to a sub-pixel of the display unit positioned in the second row and the first column; FIG. 8F shows a case where the lateral axis is time and the longitudinal axis is output voltage to a first-row signal line of a signal line driving circuit; FIG. 8G shows a case where the lateral axis is time and the longitudinal axis is voltage of a pixel electrode for a common electrode in the main pixel of the display unit positioned in the first row and the first column; FIG. 8H shows a case where the lateral axis is time and the longitudinal axis is voltage of a pixel electrode for a common electrode in the sub-pixel of the display unit positioned in the first row and the first column; FIG. 8I shows a case where the lateral axis is time and the longitudinal axis is voltage of a pixel electrode for a common electrode in the main pixel of the display unit positioned in the second row and the first column; and FIG. 8J shows a case where the lateral axis is time and the longitudinal axis is voltage of a pixel electrode for a common electrode in the sub-pixel of the display unit positioned in the second row and the first column;

FIGS. 10A-10C show explanatory illustrations for describing examples of display images of the display device according to the first exemplary embodiment of the invention, in which FIG. 10A is for describing an example of an image displayed on the main pixels in a display angle limited mode, FIG. 10B is for describing an example of an image displayed on the sub-pixels, and FIG. 10C is for describing an image viewed when observed from oblique directions;

FIGS. 11A-11J are timing charts showing examples of display operations in a normal display mode performed in the display device according to a second exemplary embodiment of the invention, in which: FIG. 11A shows a case where the lateral axis is time and the longitudinal axis is output voltage of a common electrode control circuit to a common electrode and storage capacity line; FIG. 11B shows a case where the lateral axis is time and the longitudinal axis is output voltage to a scanning line that is connected to a main pixel of a display unit positioned in the first row and the first column; FIG. 11C shows a case where the lateral axis is time and the longitudinal axis is output voltage to a scanning line that is connected to a sub-pixel of the display unit positioned in the first row and the first column; FIG. 11D shows a case where the lateral axis is time and the longitudinal axis is output voltage to a scanning line that is connected to a main pixel of a display unit positioned in the second row and the first column; FIG. 11E shows a case where the lateral axis is time and the longitudinal axis is output voltage to a scanning line that is connected to a sub-pixel of the display unit positioned in the second row and the first column; FIG. 11F shows a case where the lateral axis is time and the longitudinal axis is output voltage to a first-row signal line of a signal line driving circuit; FIG. 11G shows a case where the lateral axis is time and the longitudinal axis is voltage of a pixel electrode for a common electrode in the main pixel of the display unit positioned in the first row and the first column; FIG. 11H shows a case where the lateral axis is time and the longitudinal axis is voltage of a pixel electrode for a common electrode in the sub-pixel of the display unit positioned in the first row and the first column; FIG. 11I shows a case where the lateral axis is time and the longitudinal axis is voltage of a pixel electrode for a common electrode in the main pixel of the display unit positioned in the second row and the first column; and FIG. 11J shows a case where the lateral axis is time and the longitudinal axis is voltage of a pixel electrode for a common electrode in the sub-pixel of the display unit positioned in the second row and the first column;

FIGS. 12A-12J are timing charts showing examples of display operations in a display angle limited mode performed in the display device according to the second exemplary embodiment of the invention, in which: FIG. 12A shows a case where the lateral axis is time and the longitudinal axis is output voltage of a common electrode control circuit to a common electrode and storage capacity line; FIG. 12B shows a case where the lateral axis is time and the longitudinal axis is output voltage to a scanning line that is connected to a main pixel of a display unit positioned in the first row and the first column; FIG. 12C shows a case where the lateral axis is time and the longitudinal axis is output voltage to a scanning line that is connected to a sub-pixel of the display unit positioned in the first row and the first column; FIG. 12D shows a case where the lateral axis is time and the longitudinal axis is output voltage to a scanning line that is connected to a main pixel of a display unit positioned in the second row and the first column; FIG. 12E shows a case where the lateral axis is time and the longitudinal axis is output voltage to a scanning line that is connected to a sub-pixel of the display unit positioned in the second row and the first column; FIG. 12F shows a case where the lateral axis is time and the longitudinal axis is output voltage to a first-row signal line of a signal line driving circuit; FIG. 12G shows a case where the lateral axis is time and the longitudinal axis is voltage of a pixel electrode for a common electrode in the main pixel of the display unit positioned in the first row and the first column; FIG. 12H shows a case where the lateral axis is time and the longitudinal axis is voltage of a pixel electrode for a common electrode in the sub-pixel of the display unit positioned in the first row and the first column; FIG. 12I shows a case where the lateral axis is time and the longitudinal axis is voltage of a pixel electrode for a common electrode in the main pixel of the display unit positioned in the second row and the first column; and FIG. 12J shows a case where the lateral axis is time and the longitudinal axis is voltage of a pixel electrode for a common electrode in the sub-pixel of the display unit positioned in the second row and the first column;

FIGS. 14A-14F are timing charts showing examples of display operations in a normal display mode performed in the display device according to the third exemplary embodiment of the invention, in which: FIG. 14A shows a case where the lateral axis is time and the longitudinal axis is output voltage of a common electrode control circuit to a common electrode and storage capacity line of a main pixel; FIG. 14B shows a case where the lateral axis is time and the longitudinal axis is output voltage of a common electrode control circuit to a common electrode and storage capacity line of a sub-pixel; FIG. 14C shows a case where the lateral axis is time and the longitudinal axis is output voltage to a scanning line that is connected to a main pixel of a display unit positioned in the first row and the first column; FIG. 14D shows a case where the lateral axis is time and the longitudinal axis is output voltage to a signal line that is connected to a main pixel of a display unit positioned in the first row and the first column; FIG. 14E shows a case where the lateral axis is time and the longitudinal axis is voltage of a pixel electrode for a common electrode in the main pixel of the display unit positioned in the first row and the first column; and FIG. 14F shows a case where the lateral axis is time and the longitudinal axis is voltage of a pixel electrode for a common electrode in the sub-pixel of the display unit positioned in the first row and the first column;

FIGS. 15A-15F are timing charts showing examples of display operations in a display angle limited mode performed in the display device according to a third exemplary embodiment of the invention, in which: FIG. 15A shows a case where the lateral axis is time and the longitudinal axis is output voltage of a common electrode control circuit to a common electrode and storage capacity line of a main pixel; FIG. 15B shows a case where the lateral axis is time and the longitudinal axis is output voltage of a common electrode control circuit to a common electrode and storage capacity line of a sub-pixel; FIG. 15C shows a case where the lateral axis is time and the longitudinal axis is output voltage to a scanning line that is connected to a main pixel of a display unit positioned in the first row and the first column; FIG. 15D shows a case where the lateral axis is time and the longitudinal axis is output voltage to a signal line that is connected to the main pixel of the display unit positioned in the first row and the first column; FIG. 15E shows a case where the lateral axis is time and the longitudinal axis is voltage of a pixel electrode for a common electrode in the main pixel of the display unit positioned in the first row and the first column; and FIG. 15F shows a case where the lateral axis is time and the longitudinal axis is voltage of a pixel electrode for a common electrode in the sub-pixel of the display unit positioned in the first row and the first column;

FIGS. 21A-21F are timing charts showing an example of display operations in a display angle limited mode performed in the display device according to the fifth exemplary embodiment of the invention, in which: FIG. 21A shows a case where the lateral axis is time and the longitudinal axis is output voltage of a common electrode control circuit to a common electrode and storage capacity line; FIG. 21B shows a case where the lateral axis is time and the longitudinal axis is output voltage to a scanning line that is connected to a main pixel of a display unit positioned in the first row and the first column; FIG. 21C shows a case where the lateral axis is time and the longitudinal axis is output voltage to a scanning line that is connected to a sub-pixel of the display unit positioned in the first row and the first column; FIG. 21D shows a case where the lateral axis is time and the longitudinal axis is output voltage to a first-row signal line of a signal line driving circuit; FIG. 21E shows a case where the lateral axis is time and the longitudinal axis is voltage of a pixel electrode for a common electrode in the main pixel of the display unit positioned in the first row and the first column; and FIG. 21F shows a case where the lateral axis is time and the longitudinal axis is voltage of a pixel electrode for a common electrode in the sub-pixel of the display unit positioned in the first row and the first column;

Figure 1:
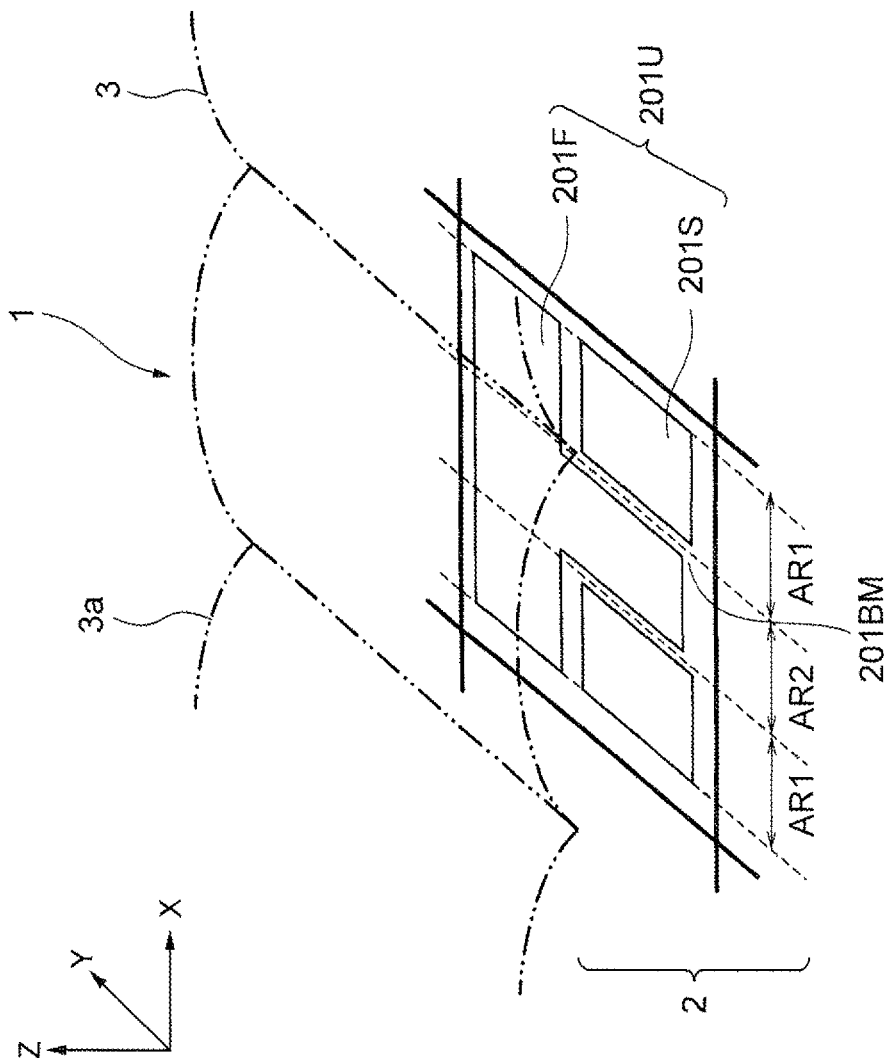
FIG. 1 is a perspective view showing an example of a schematic structure of a display device according to a first exemplary embodiment of the invention.

DETAILED DESCRIPTION OF THE EXEMPLARY EMBODIMENTS (Basic Structure of Display Device of the Invention)

first, the basic structure of the display device will be described. The display device according to the invention (reference numeral 1 shown in FIG. 1, for example) is structured to include: a display part in which a plurality of display units (reference numeral 201U shown in FIG. 1, for example) each including a main pixel (reference numeral 201F shown in FIG. 1, for example) for displaying a first image and a sub-pixel (reference numeral 201S shown in FIG. 1, for example) for displaying a second image are arranged in matrix in a first direction (X direction shown in FIG. 1, for example) and in a second direction (Y direction shown in FIG. 1, for example) which crosses with the first direction; and an optical member (reference numeral 3 shown in FIG. 1, for example) which is provided by corresponding to each of the display units for distributing light emitted from the display units towards different directions from each other at least along the first direction.

The display areas of the display units can include a first display area (reference numeral AR1 shown in FIG. 1, for example) in which the main pixel and the sub-pixel are formed in the second direction and a second display area (reference numeral AR2 shown in FIG. 1, for example) in which only the main pixel is formed in the second direction.

With the display device of such structure, it is possible to display the first image displayed on the main pixels by itself for a specific direction at all times and to display the first display image displayed on the main pixels by having a second image displayed on the sub-pixels superimposed thereupon for the range of angles other then the specific direction. Thus, the use of the sub-pixels makes it possible to: present the first image and the second image as different images for preventing the display of the main pixels from being visually recognized from the directions other than the specific direction; avoid a troublesome work of wearing special eyeglasses; and decrease the visibility of the displayed information from the directions other than the specific direction so that the confidentiality can be sufficiently kept for the directions other than the specific direction. Further, it is also possible to switch to a normal display by displaying the same image as the first image and the second image.

That is, this makes it possible to provide a display angle limited mode which prevents the display of the main pixels from being visually recognized from the directions other than the specific direction. In that case, the sub-pixels are arranged to correspond to the main pixels, so that it is possible to provide a normal display mode with which the display can be visually recognized from a wide range of angles by simply making the display contents of the sub-pixels be the same as the display contents of the main pixels.

With the display angle limited mode, images of same-level high definition as that of the images displayed on the main pixels can be displayed on the sub-pixels, which are displayed by being interposed on the images displayed on the main pixels. This makes it possible to decrease the visibility of the displayed information from the directions other than the specific direction, so that the performance of the display angle limited mode can be improved. Further, since the sub-pixels that are independent from the main pixels can be disposed, moving images and the like which are highly noticeable can be displayed by using the sub-pixels. With this, the images can be prevented more effectively from being peeped from the directions other than the specific direction.

Further, this structure uses the optical member that is capable of distributing light from the pixels spatially. Therefore, it is unnecessary to ware special eyeglasses, thereby making it possible to avoid a troublesome work.

Hereinafter, an example of preferred embodiments of such display device according the present invention will be described in a concretive manner by referring to the accompanying drawings.

First Exemplary Embodiment
(Structure of Display Device)

First, specific structures of the display device, the terminal device, the optical member, and the display panel according to the exemplary embodiment will be described from the overall structures to the detailed structures of each part thereafter.

Figure 2:
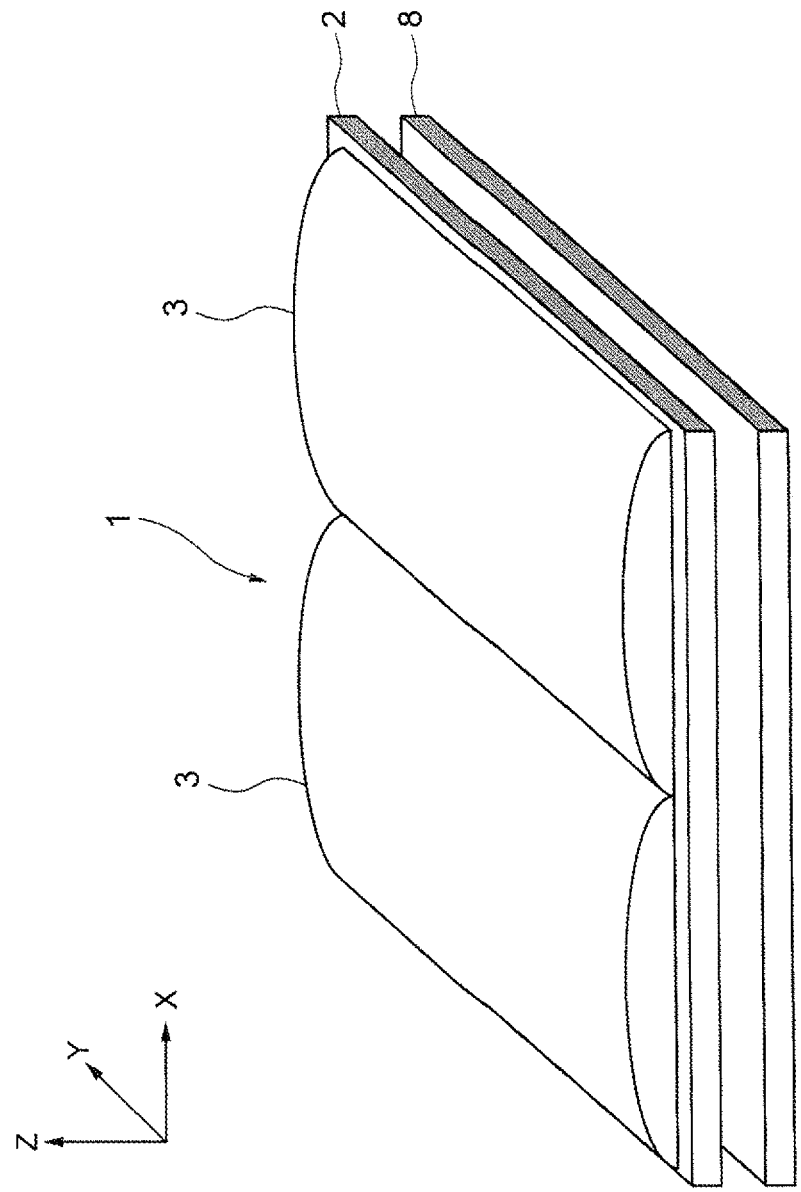
FIG. 2 is a perspective view showing an example of an overall structure of the display device according to the first exemplary embodiment of the invention.
Figure 3:
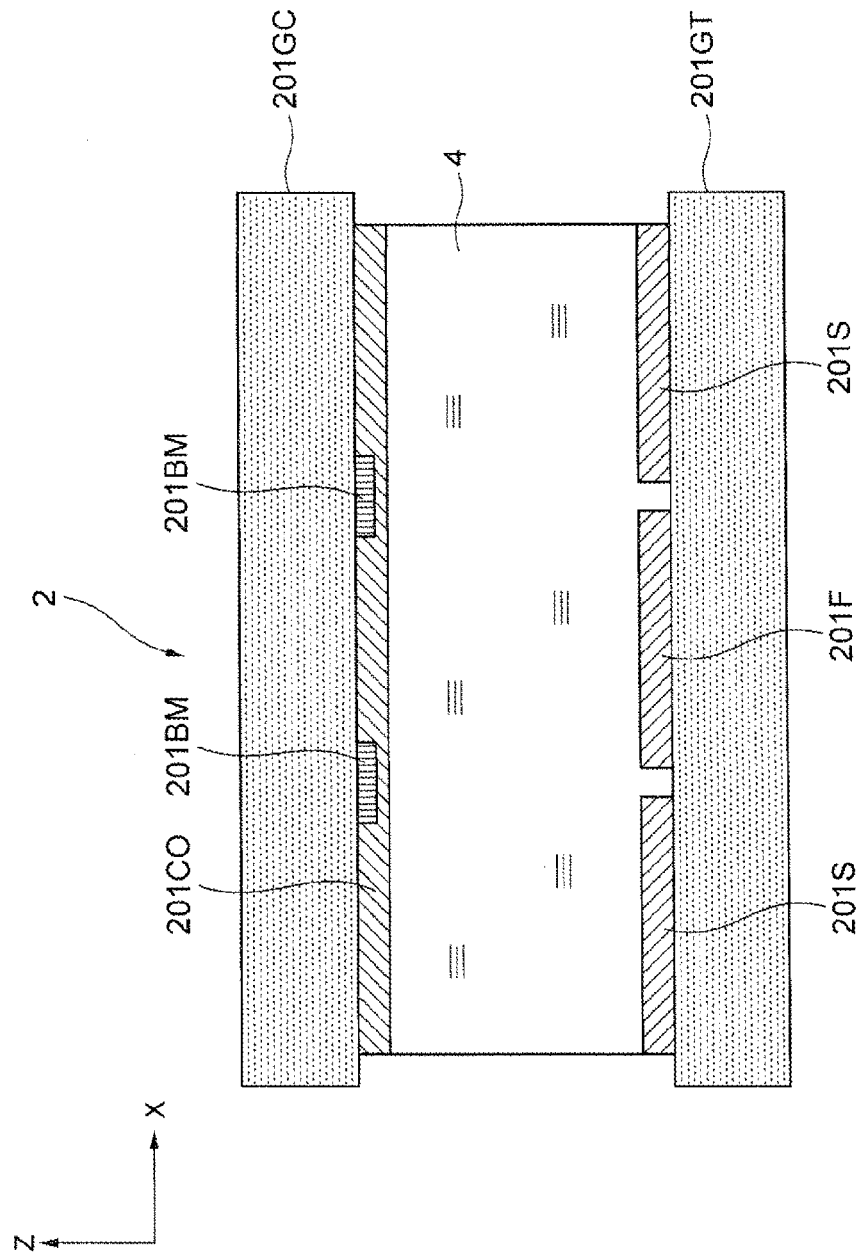
FIG. 3 is a sectional view showing an example of a schematic structure of the display device according to the first exemplary embodiment of the invention.
Figure 4:
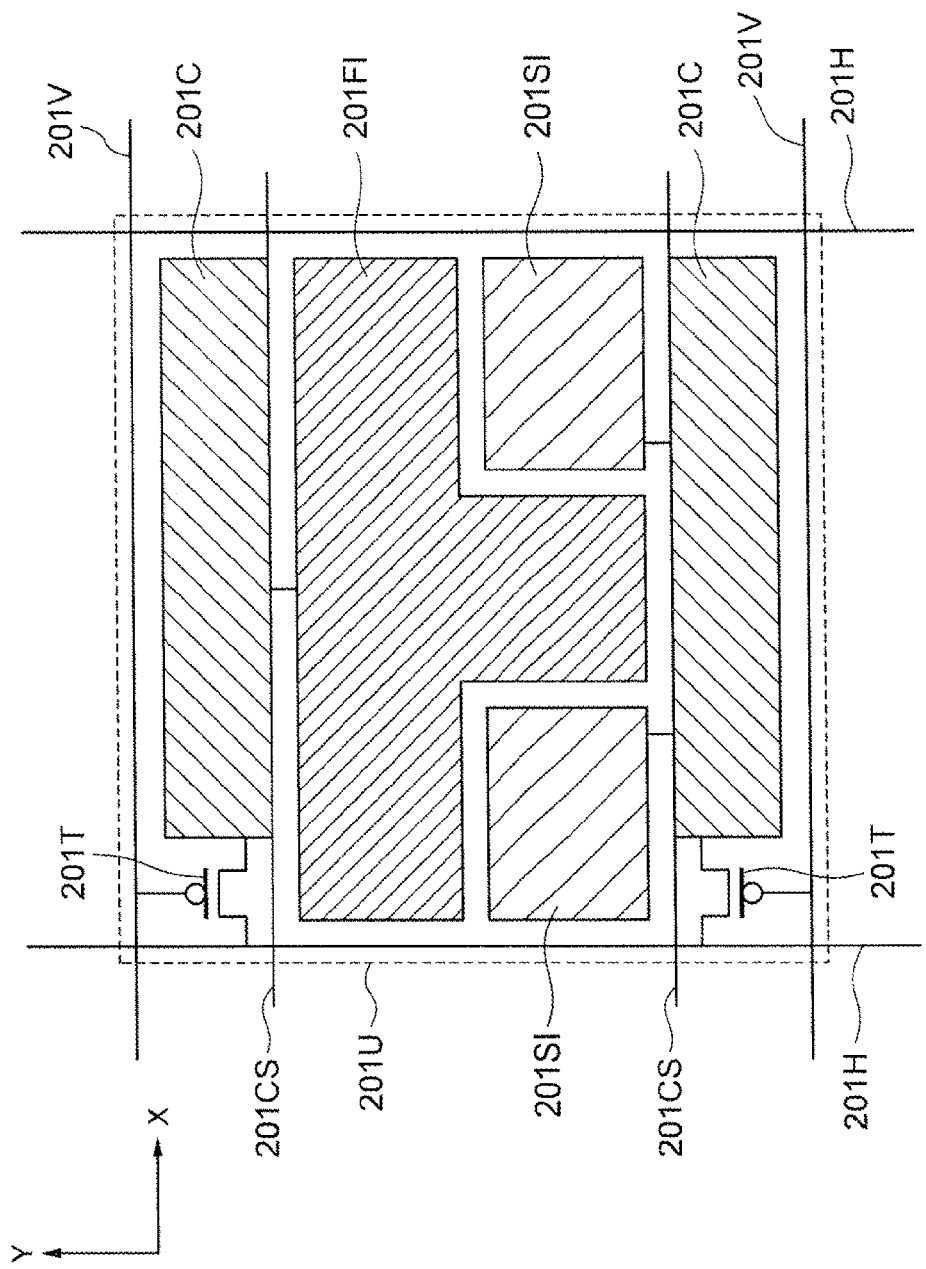
FIG. 4 is a plan view showing an example of a pixel structure of the display device according to the first exemplary embodiment of the invention.
Figure 5:
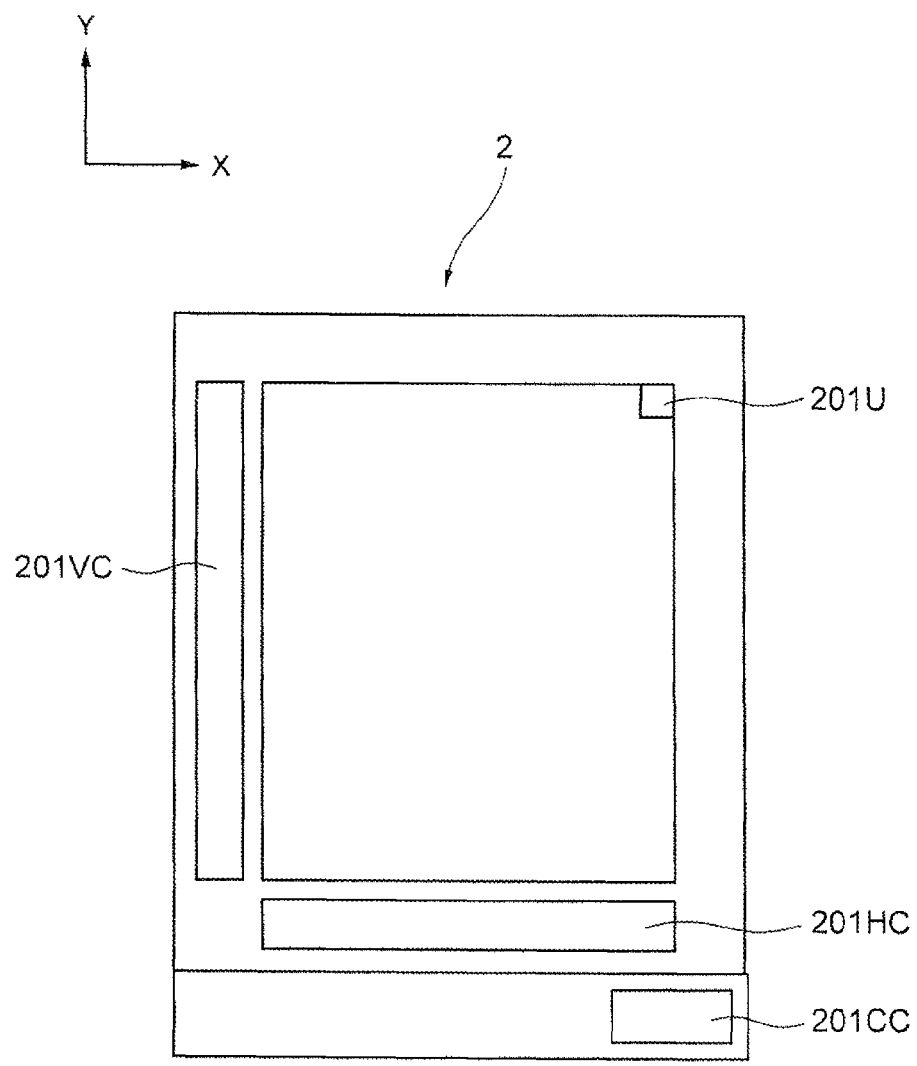
FIG. 5 is a plan view of a circuit-part layout showing layout of pixels and driving circuits of the display device according to the first exemplary embodiment of the invention.
Figure 6:
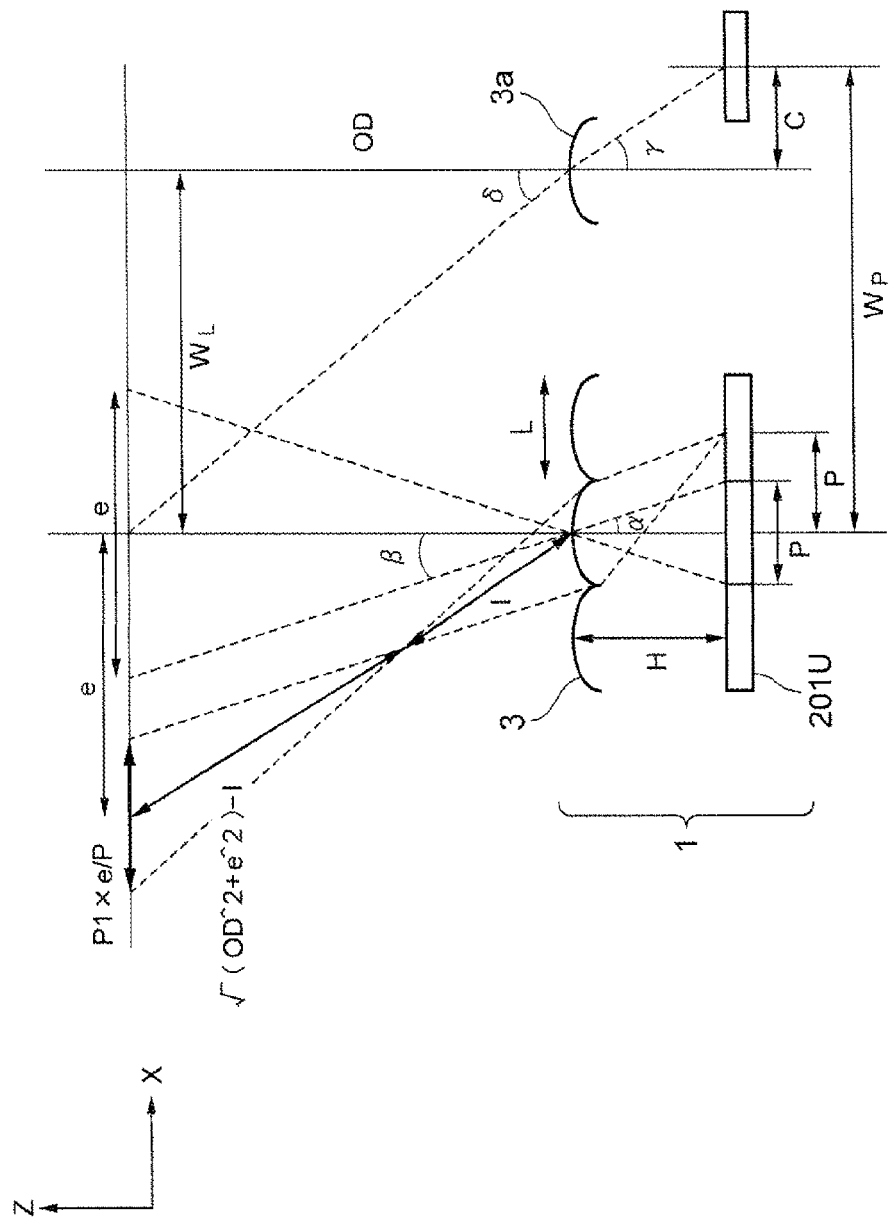
FIG. 6 is an explanatory diagram for showing an optical structure of the display device according to the first exemplary embodiment of the invention.

FIG. 1 is a perspective view showing an example of a schematic structure of the display device according to a first exemplary embodiment of the present invention. FIG. 2 is a perspective view showing an example of an overall structure of the display device according to the first exemplary embodiment of the present invention. FIG. 3 is a sectional view showing an example of a schematic structure of the display device according to the first exemplary embodiment of the present invention. FIG. 4 is a plan view showing an example of a pixel structure of the display device according to the first exemplary embodiment of the present invention. FIG. 5 is a plan view of a circuit-part layout showing layout of pixels and driving circuits of the display device according to the first exemplary embodiment of the present invention. FIG. 6 is an explanatory diagram for showing an optical structure of the display device according to the first exemplary embodiment of the present invention.

As shown in FIG. 1-FIG. 3, a display device 1 according to the first exemplary embodiment is configured with a display panel 2 as a display unit and a lenticular lens 3 as an example of the optical member.

Those are arranged in order from the lenticular lens 3 to the display panel 2 from the observer side. The display panel 2 is an active-matrix type liquid crystal display panel, for example. Further, as shown in FIG. 2, a planar light source 8 is provided as necessary on the back-face side of the display panel 2, i.e., on the reverse side of the display panel 2 when viewed from the observer side.

The lenticular lens 3 is a lens array in which a great number of cylindrical lenses 3a are arranged one-dimensionally. The direction orthogonal to the arranging direction of the cylindrical lenses 3a is the extending direction of the cylindrical lenses 3a, i.e., the longitudinal direction.

The cylindrical lens 3a exhibits no lens effect towards the extending direction but exhibits the lens effect only in the arranging direction thereof.

Thus, the lenticular lens 3 is formed as a one-dimensional lens array that exhibits the lens effect only in the arranging direction of the cylindrical lenses 3a.

The lenticular lens 3 can distribute the light making incident from the pixels of the display panel towards different directions by utilizing the one-dimensional lens effect. Further, the lenticular lens 3 can separate images displayed on the display panel.

As shown in FIG. 1, the cylindrical lens 3a has a semi-cylindrical convex part, and the shape thereof is illustrated with an emphasis put thereupon. The face of the lenticular lens 3 opposite from the face having the cylindrical lenses 3a formed thereon is a flat face having no lens face formed thereon.

This is also true for the plan views showing the cylindrical lenses of other exemplary embodiments.

For the convenience' sake, XYZ Cartesian coordinate system is set as follows in this specification. The arranging direction of the cylindrical lenses 3a in the lenticular lens 3 is defined as the X-axis direction (first direction), and the longitudinal direction of the cylindrical lenses 3a is defined as the Y-axis direction (second direction). The Y-axis direction crosses with or is orthogonal to the X-axis direction on an XY plane. The direction which crosses with or is orthogonal to both the X-axis direction and the Y-axis direction is defined as the Z-axis direction (third direction).

That is, the x-axis direction is a normal direction of the XY plane. Regarding the Z-axis direction, the direction from the display panel 2 towards the lenticular lens 3 is defined as +Z direction, and the opposite direction thereof is defined as –Z direction. The +Z direction is a forward direction, i.e., the direction towards the user. The Z-axis direction is a general term for the +Z direction and the –Z direction. The +X direction is defined as the direction from the left side of the display device 1 towards the right side in FIG. 3.

Further, +Y direction is defined as a direction where the right-hand coordinate system applies. That is, when the thumb of a right hand of a person points to the +X direction and the index finger points to the +Y direction, the middle finger points to the +Z direction.

As shown in FIG. 1, the display panel 2 is provided with a pixel pair as a display unit 201U that is configured with one each of a main pixel 201F and a sub-pixel 201S, and a plurality of the display units 201U are arranged in matrix on the display panel 2.

Therefore, the lenticular lens 3 can distribute the light emitted from the plurality of display units 201U towards directions different from each other at least along the first direction.

In each of the display units 201U, the main pixel 201F has a T-letter shaped display area.

That is, in the main pixel 201F that configures each display unit 201U, the aperture area for displaying information by transmitting light from the planar light source 8 has the T-letter shape.

The T-letter shape is arranged in such a manner that the lateral-bar part thereof becomes in parallel to the X-axis direction and the longitudinal-bar part becomes in parallel to the Y-axis direction. As a result, the lateral-bar part of the T-letter shaped display area becomes in parallel to the arranging direction of the cylindrical lenses 3a, and the longitudinal-bar part becomes in parallel to the longitudinal direction.

Further, when the +X direction of the X-axis direction is arranged on the right side and the +Y direction of the Y-axis direction is arranged on the upper side, each display area of the rectangular sub-pixel 201S comes at the lower right side and lower left side (or on both sides of the longitudinal-bar part) of the T-letter shaped display area of the main pixel 201F. That is, the rectangular display areas of the sub-pixels 201S are arranged by being adjacent to the longitudinal-bar part of the T-letter shaped display area in the lens arranging direction.

The width of the rectangular display area of the sub-pixel 201S in the Y-axis direction is set to be almost equivalent to the width of the lateral-bar part of the T-letter shaped display area of the main pixel 201F in the Y-axis direction.

Thereby, the display unit 201U can be sectioned into a first display area AR1 in which the main pixel 201F and the sub-pixel 201S are formed in the second direction and into a second display area AR2 in which only the main pixel 201F is formed in the second direction.

Further, each of the display units 201U is formed in a square. That is, the arranging pitch of each display unit in the X-axis direction and the arranging pitch in the Y-axis direction are designed to be equivalent. Further, while two rectangular display areas configuring the sub-pixel 201S are separated into two areas optically, those are electrically connected so that a same signal is to be transmitted thereto.

A first feature of the first exemplary embodiment is the pixel structure in the display unit. That is, it is a significant point that the main pixel 201F has the T-letter shaped display area, and the display area of the sub-pixel 201S is sectioned into two rectangular areas to be disposed on the lower left side and lower right side of the T-letter shape.

In other words, this structure can be expressed that when a virtual segment extending in the Y-axis direction crosses with the sub-pixel 201S, it also crosses with the main pixel 201F. That is, this structure is provided with a one-dimensional image separating part such as a lenticular lens, and each pixel is arranged in such a manner that the image separating part does not separate and display only the sub-pixel.

The length of the longitudinal-bar part of the T-letter shaped display area of the main pixel 201F in the Y-axis direction is formed so as to be substantially the same as the sum of the length of the rectangular display areas of the sub-pixels in the Y-axis direction. Further, the rectangular display areas of the sub-pixel 201S are arranged so as not to be projected towards the outer side than the T-letter shaped display area of the main pixel 201F.

That is, the end part of the lateral-bar part of the T-letter shaped display area of the main pixel 201F in the +X direction is arranged to come almost at the same position on the X-axis direction as the end part of the rectangular display areas of the sub-pixel 201S in the +X direction.

This is also the same for the −X direction.

Further, a light-shielding area 201BM is formed between the display area of the main pixel 201F and the display area of the sub-pixel 201S. The light-shielding area 201BM is disposed in order to prevent the displays of the neighboring pixels from influencing with each other and to secure a space for providing a wiring used for transmitting display signals to the pixels.

As described above, it can also be said that the display unit can be formed in such a manner that the length of the main pixel in the second direction in the first display area becomes equivalent to the length of the sub-pixel in the second direction.

Further, the display unit can be formed in such a manner that the total value of the length of the main pixel in the second direction in the first display area and the length of the sub-pixel in the second direction becomes equivalent to the length of the main pixel in the second direction in the second display area.

Furthermore, it can be also said that the display unit has a structure in which the main pixel is formed in a flat T-letter shape having the longitudinal-bar part extending in the second direction and the sub-pixel is separately arranged on both sides of the longitudinal-bar part.

As shown in FIG. 3, two glass substrates and a liquid crystal layer 4 sandwiched between the glass substrates are provided to the display panel 2. In the present invention, the substrate disposed on the −Z direction side out of the two glass substrates is called a TFT substrate 201GT, and the substrate disposed on the +Z direction side is called a counter substrate 201GC.

A pixel electrode for driving the pixel, a thin film transistor for controlling the pixel electrode, a wiring, and the like are formed on the TFT substrate 201GT.

As the pixel electrode, there are a main pixel electrode 201FI and a sub-pixel electrode 201SI, which are used depending on the types of the pixels. Further, a common electrode 201COM for applying voltages to the liquid crystal layer by making a pair with the pixel electrode and the light-shielding area 201BM are formed on the counter substrate 201GC.

Note here that the size and the scale of each feature element are being changed as necessary in FIG. 3 in order to secure the visibility of the drawing.

As shown in FIG. 4, the main pixel electrode 201FI is connected either to a source electrode or to a drain electrode of an MOS-type thin film transistor 201T. Further, the other electrode of the thin film transistor 201T is connected to a wiring that supplies video data, i.e., a signal line 201H as a data line.

In the present invention, it is so defined that the electrode to which the pixel electrode is connected is called a source electrode, and the electrode connected to the signal line is called a drain electrode. Further, the gate electrode of the thin film transistor 201T is connected to a scanning line 201V.

The signal line 201H is formed to extend substantially towards the Y-axis direction, and the scanning line 201V is formed to extend substantially towards the X-axis direction.

Furthermore, a storage capacitance 201C for keeping video signals supplied to the pixel electrode is provided to each pixel. Regarding this storage capacitance 201C, a capacitance is formed in a part having an equivalent potential as that of the pixel electrode, such as in a part between the pixel electrode and a storage capacitance line 201CS, for example. The storage capacitance 201CS is formed to extend substantially towards the X-axis direction, as in the case of the scanning line 201V.

As shown in FIG. 5, the signal line 201H is connected to a signal line driving circuit 201HC in a frame area of the display panel 2. Further, the scanning line 201V is also connected to a scanning line driving circuit 201VC in the frame area of the display panel 2.

The storage capacitance line 201CS is electrically connected to the common electrode 201COM of the counter substrate 201GC also in the frame area of the display panel 2, and connected to a common electrode control circuit 201CC.

The structure of the sub-pixel 201S is basically the same as that of the main pixel 201F. However, while the scanning line 201V that controls the thin film transistor 201T connected to the main pixel electrode 201FI is disposed on the side closer to the +Y direction than the main pixel electrode 201FT, the scanning line 201V that controls the thin film transistor 201T connected to the sub-pixel 201SI is disposed on the side closer to the −Y direction side than the sub-pixel 201SI.

That is, each display unit is disposed by being sandwiched between the two scanning lines 201V. Further, the signal line 201H for supplying the video signals to the thin film transistor 201T connected to the main pixel electrode 201FI is used in common as the signal line 201H for supplying the video signals to the thin film transistor 201T connected to the sub-pixel electrode 201SI. That is, this exemplary embodiment is configured to have the so-called 2G-1D structure in which two scanning lines and one signal line correspond to each display unit.

Within the display units arranged in matrix according to this exemplary embodiment, among the scanning lines connected to the display unit on the first row and the first column, the scanning line connected to the gate electrode of the thin film transistor of the main pixel is called "201V1", the scanning line connected to the gate electrode of the thin film transistor of the sub-pixel is called "201V2", and the signal line connected to the drain electrodes of the thin film transistors of the main pixel and the sub-pixel is called "201H1".

Similarly, in the display unit on the second row and the first column, the scanning line connected to the gate electrode of the thin film transistor of the main pixel is called "201V3", the scanning line connected to the gate electrode of the thin film transistor of the sub-pixel is called "201V4", and the signal line connected to the drain electrodes of the thin film transistors of the main pixel and the sub-pixel is called "201H1".

A polysilicon thin film transistor using polycrystalline silicon as a semiconductor is used for the thin film transistor 201T. As a way of example, the polycrystalline silicon is a P-type semiconductor containing a small amount of boron.

That is, the thin film transistor 201T is the so-called a PMOS-type thin film transistor in which the source electrode and the drain electrode become conductive when the potential of the gate electrode becomes lower than the level of the potential of the source electrode or the drain electrode.

As a way of example, the polysilicon thin film transistor is made by forming an amorphous silicon layer after forming a silicon oxide film on the TFT substrate 201GT, and then performing poly-crystallization of the amorphous silicon layer.

As a way of performing the poly-crystallization, heat annealing or laser annealing is used. Particularly, the laser annealing using a laser such as an excimer laser can heat and poly-crystallize only the silicon layer by suppressing the increase in the temperature of the glass substrate to the minimum, so that it is possible to use a non-alkali glass and the like whose melting point is low.

This makes it possible to lower the cost, so that it is used often as a low-temperature silicon. It is also possible to form an amorphous silicon thin film transistor by omitting the annealing step.

Next, a silicon oxide layer as a gate insulating layer is formed on the silicon layer, and patterning is performed as necessary. In this process, it is preferable to dope ions to the area of the silicon thin film other than the part used as the semiconductor layer to give conductivity. As a method of patterning, it is possible to employ an optical patterning that uses a photosensitive resist.

As a way of example, after spin-coating the photosensitive resist, light is partially irradiated by an exposure machine such as a stepper. After going through a development step, the film of the photosensitive resist is remained only on the part that is to have the pattern remained. Thereafter, the silicon layer in the area having no remaining photosensitive resist is eliminated by dry etching or the like, and the film of the photosensitive resist is exfoliated at last.

Next, an amorphous silicon layer and a tungsten silicide layer to be the gate electrode are deposited to form the gate electrode and the like. At this time, the scanning line to which the gate electrode is connected and the storage capacitance may also be formed in the same manner. Then, a silicon oxide layer and a silicon nitride layer are formed, and patterning is performed as necessary. Thereafter, an aluminum layer and a titanium layer are deposited to form the source electrode and the drain electrode. At this time, the signal line may be formed simultaneously.

Then, a silicon nitride layer is formed, and patterning is performed as necessary. Thereafter, a transparent electrode such as ITO is deposited and patterning is performed so as to form the pixel electrode. Thereby, the pixel structure having the thin film transistor is formed. By using the thin film transistor, the scanning line driving circuit 201VC and the signal line driving circuit 201HC can also be formed simultaneously.

(Circuit Structure)

As shown in FIG. 5, the scanning line driving circuit 201VC, the signal line driving circuit 201HC, and the common electrode control circuit 201CC are formed in the periphery of the display face that is an aggregation of the display units 201U. The scanning line driving circuit 201VC is the so-called shift register, and it is capable of setting the scanning lines to on-state in order. There are various circuit forms in the signal line driving circuit 201HC. Particularly, when the circuit is formed by using the thin film transistor on the TFT substrate 201GT, such circuits can be classified into several types according to the circuit scale to be achieved.

For example, there is a type that has a DAC (digital-analog converter) as the signal line driving circuit 201HC, and digital signals are inputted directly. In this first exemplary embodiment, used is a minimum circuit structure in which a switch circuit using a thin film transistor is loaded between an analog signal input part and a data line.

This switch circuit is provided one each for one signal line for controlling the signals supplied to the signal line at a desired timing.

The circuit for supplying the analog signals to the switch circuit can be achieved by a data driver IC formed on a silicon wafer, and it is mounted on the TFT substrate through COG (chip-on-glass).

Note here that a "control unit" can be configured with the scanning line driving circuit 201VC, the signal line driving circuit 201HC, the common electrode control circuit 201CC, other circuits, and other controllers. The "control unit" can perform display controls by switching a display angle limited mode which displays images where the second image is different from the first image, and a normal display mode which displays images where the second image is the same image as the first image. Further, each mode can be set by a mode setting part that is not shown.

As shown in FIG. 6, in the lenticular lens 3 disposed on the +Z direction side of the display panel 2, the cylindrical lens 3a is arranged by corresponding to each display unit 201U. That is, the arranging cycle of the display units in the X-axis direction is almost equivalent to the arranging cycle of the cylindrical lenses.

In this X-axis direction, a line of the display units 201U disposed in the Y-axis direction corresponds to a single cylindrical lens 3a.

A second feature of the first exemplary embodiment is the setting of the lens condition. That is, the lens condition is so set that images are formed to the front-face direction and that the separating performance is deteriorated by a blurring effect for oblique direction. This makes it possible to prevent peeping attempts from the oblique directions.

(Optical Relation Between Lenticular Lens and Display Unit)

Hereinafter, the optical layout of the lenticular lens and the display unit according to the exemplary embodiment will be described quantitatively by using FIG. 6.

It is defined here that distance between the pixel and the principal point (i.e., the vertex point) of the cylindrical lens 3a configuring the lenticular lens 3 is H, the refractive index of the lenticular lens 3 is n, and the lens pitch is L.

Further, it is so defined that the pitch of the display units 201U each configured with the main pixel 201F and the sub-pixel 201S along the X-axis direction is P, and the width of the longitudinal-bar part of the T-letter shaped display area of the main pixel 201F in the X-axis direction is P1. In the explanations below, it is assumed that the position of the longitudinal-bar part of the T-letter shaped display area of the main pixel in the X-axis direction comes at the center of each display unit.

Further, the distance between the lenticular lens 3 and an observer is defined as an optimum observing distance OD, a cycle of enlarged projection image of the pixel at the distance OD, i.e., a cycle of the width of the projection images of the display unit on a virtual plane that is in parallel to the lens and is away from the lens by the distance OD, is defined as e.

Further, the distance from the center of the cylindrical lens 3a located at the center of the lenticular lens 3 to the center of the cylindrical lens 3a located at the end of the lenticular lens 3 in the X-axis direction is defined as WL, and the distance between the center of the display unit 201U located in the center of the display panel 2 and the center of the display unit 201U located at the end of the display panel 2 in the X-axis direction is defined as WP.

Furthermore, considering the cylindrical lens 3a located in the center of the lenticular lens 3 and the display unit located in the center of the display panel 2, the light incident angle of the light emitted from the end (in the +X direction) of the display unit located in the center and making incident on the principal point of the cylindrical lens 3a located in the center is defined as α, and the exit angle when this light is emitted from the cylindrical lens 3a is defined as β.

Similarly, the light incident angle and the light exit angle of the cylindrical lens 31a located at the end of the lenticular lens 31 in the X-axis direction are defined as γ and δ, respectively.

Further, the difference between the distance WL and the distance WP is defined as C, and the number of pixels contained in the area of distance WP is defined as m.

FIG. 6 illustrates a case where the width of the projection image of the display unit can be considered as e because the blurring amount of the lens is small. Even though the width of the projection image of the display unit in a case with a large blurring amount becomes wider, the cycle of the projection image remains as e since only the overlapping part of the neighboring projection images becomes larger.

There is a mutual relationship between the arranging pitch L of the cylindrical lenses 3a and the arranging pitch P of the display units. Thus, one of the pitches is determined depending on the other. Normally, the arranging pitch P of the display units 201U is taken as the constant, since the lenticular lens is designed in accordance with the display panel in many cases.

Further, the refractive index n is determined depending on the selection of the material for the lenticular lens 3. Strictly speaking, the refractive index n is the refractive index of the constituent that forms the part between the pixel and the principal point of the cylindrical lens 3a. Thus, since there is the counter substrate 201GC as the constituent in addition to the lenticular lens 3 in the above-described structure, it is necessary to consider a difference between the refractive indexes of the both.

However, when the lenticular lens 3 is formed with a transparent material such as a glass material or a plastic material, it is considered as having the refractive index of about 1.5 which is almost the same refractive index of the counter substrate 201GC. Thus, it is called the refractive index of the lens by representing the both. If there is a large difference between the refractive indexes of the lens and the counter substrate, the difference can be corrected as necessary by using an already-known technique.

Further, when an optical film such as a polarizing plate is disposed between the counter substrate 201GC and the lenticular lens 3a, the difference may be corrected by considering the refractive index and the thickness. However, normally, there may be no such significant difference between the refractive index of the optical film and that of the lens and the counter substrate. Even if there is, the thickness of the optical film is very thin so that it can be simply considered as the refractive index of the lens in most cases.

Then, desired values are set for the observing distance OD between the lens and the observer, and the cycle e of the pixel enlarged projection images at the observing distance OD. Particularly, feedback to be described later is necessary for the setting of the cycle e.

The distance H between the lens vertex and the pixel as well as the lens pitch L is determined by using those values.

Following Expressions 1-6 apply, according to Snell's law and geometrical relations. Further, following Expressions 7-9 apply as well.

$$n \times \sin \alpha = \sin \beta \qquad \text{(Expression 1)}$$

$$OD \times \tan \beta = e/2 \qquad \text{(Expression 2)}$$

$$H \times \tan \alpha = P/2 \qquad \text{(Expression 3)}$$

$$n \times \sin \gamma = \sin \delta \qquad \text{(Expression 4)}$$

$$H \times \tan \gamma = C \qquad \text{(Expression 5)}$$

$$OD \times \tan \delta = WL \qquad \text{(Expression 6)}$$

$$WP - WL = C \qquad \text{(Expression 7)}$$

$$WP = m \times P \qquad \text{(Expression 8)}$$

$$WL = m \times L \qquad \text{(Expression 9)}$$

In the first exemplary embodiment of the present invention, the distance H between the vertex of the lenticular lens and the pixel is set to be equal to the focal distance f of the cylindrical lens that configures the lenticular lens. With this, Expression 10 in the following applies.

$$f = H \qquad \text{(Expression 10)}$$

Further, assuming that the image point in Abbe's invariable is I, the object point distance becomes H. Thus, Expression 11 in the following applies.

$$n/H - 1/I = (n-1)/r \qquad \text{(Expression 11)}$$

As in Expression 10, the distance H and the focal distance f are set to be equal, so that the image point distance I becomes infinite. Therefore, assuming that the curvature radius of the lens is r, the curvature radius r is obtained from Expression 12 in the followings.

$$r = H \times (n-1)/n \quad \text{(Expression 12)}$$

Note here that the lateral magnification of the cylindrical lens that configures the lenticular lens can be considered a value that is obtained by dividing the enlarged projection image cycle of the display units with the cycle of the display unit. Thus, it can be expressed as "e/P".

Therefore, the width of the longitudinal-bar part (width P1) of the T-letter shaped display area on the observing plane can be expressed as "P1×e/P". In the first exemplary embodiment, both eyes of the observer need to visually recognize the enlarged projection image of the width P1, so that it is necessary to set the value of "P1×e/P" to be equal to or larger than the distance between the both eyes of the observer.

Normally, the average value of the distances between both eyes of adult males is 65 mm and the standard deviation is ±3.7 mm, while the average value of the distances between both eyes of adult females is 62 mm and the standard deviation is ±3.6 mm (Neil A Dodgson, "Variation and extrema of human interpupillary distance", Proc. SPIE vol. 5291).

Therefore, it is appropriate to set the value of "P1×e/P" to be equal to or larger than 65 mm so as to be equal to or larger than the average value of the distances between both eyes of adult males. More preferably, through setting it to be equal to or more than 75 mm by adding a value that is almost three times the standard deviation, it becomes possible to deal not only with the adult males but also with 99.7% or more of males and females of all ages.

Through the above-described method, the width "P1×e/P" that is the width P1 of the longitudinal-bar part on the observing plane can be determined, and the relation between P1 and e needs to be determined at last.

As described above, the arranging pitch P of the display units is normally determined in advance based on the definition and the like required from the display device in many cases, and it is taken as a constant. Thus, the value of "P1×e" becomes a constant.

However, it is necessary to determine the combination of the values of "P1" and "e", and the structure built according to the determined combination is a significant feature of the first exemplary embodiment.

As described above, the image point distance I becomes infinite in the first exemplary embodiment, since the distance H between the vertex point of the lenticular lens and the pixel is set to be equivalent to the focal distance f of the cylindrical lens that configures the lenticular lens. In a strict sense, however, this applies for the front-face direction. The image point distance I for the oblique directions takes a different value from that of the front-face direction.

Normally, the image point distance I for the oblique directions can be calculated by setting the distance between the vertex point of the lens and the pixels larger in Expression 11 that is the above-described Abbe's invariable expression, and the image point distance is changed from an infinite value to a finite value.

Further, as the angle of the oblique direction increase, the image point distance becomes smaller. Particularly, when the lateral magnification of the lens is large, the blurring effect of the lens caused due to a decrease in the image point distance, i.e., the defocus effect on the observing plane, becomes greater.

The first exemplary embodiment pays attention to side robes for effectively preventing peeping attempts from the oblique directions. The side robe is an antonym of the main robe. Thus, the main robe will be described first.

As described above, each display unit is disposed by corresponding to the cylindrical lens. The light emitted from the pixel configuring the display unit travels towards various directions of the observer side, and makes incident on the lenticular lens. Then, a part of the light passes through the cylindrical lens that is arranged by corresponding to the pixel.

Normally, the light that has passed through the corresponding cylindrical lens is called a main robe that forms an image on the observing plane. That is, the main robe means an image of the light that has emitted each display unit and passed through the cylindrical lens that corresponds to the respective display unit.

In the meantime, the side robe normally means images of other than the main robe. That is, it means an image formed by the light that has emitted from each display unit and passed through the cylindrical lenses other than the cylindrical lens that correspond to the respective display unit. Further, an image of the light that has passed through the cylindrical lens that is neighboring to the corresponding cylindrical lens is called a primary side robe.

Furthermore, an image of the light that has passed through the cylindrical lens next to the neighboring cylindrical lens is called a secondary side robe. When the main robe is set to the front-face direction of the display device, the primary side robe is to exist in the directions that are oblique from the front-face direction along the arranging direction of the cylindrical lenses.

As shown in FIG. 6, the cylindrical lens located in the center of the display area is taken into consideration, and the light passing through this cylindrical lens (particularly the primary side robe formed by the light emitted from the display unit neighboring in the +X direction) is looked into in particular.

Regarding the light emitted from the center of the display unit that is neighboring in the +X direction to the display unit located in the center of the display area (it is also the light emitted from the longitudinal-bar part of the T-letter shaped display area), the image point distance I can be calculated from Expression 11 that is mentioned above.

With Expression 11, the distance between the principal point of the lens and the pixels becomes a root of $(H^2+P^2)$, i.e., $(H^2+P^2)^{0.5}$, so that the image point distance I is calculated as in following Expression 13. Note here that while "√(root)" may sometimes be written as "^ 0.5" in the present invention for clarifying Expressions, the both are the same.

$$I = 1/(n/(H^2+P^2)^{0.5} - (n-1)/r) \quad \text{(Expression 13)}$$

The light converged once at the position of the image point reaches the observing plane while being spread this time. As shown in FIG. 6, the light emitted from the cylindrical lens, which forms an image at the position of the image point and travels towards the observing plane forms triangles that are in a similarity relation before and after the image point. One of the triangles is formed before the light reaches the image point, and it is a triangle having the pitch of the cylindrical lens as the base and having the distance between the middle point of the base and the image point as the image point distance I.

Further, the other triangle is formed after reaching the image point, and it is a triangle having the spread width on the observing plane as the base and having the distance between the middle point of the base and the image point as "√(OD^2+e^2)−I". With the latter triangle, the value of the X coordinate of the middle point of the base is e. This is evident because the cycle of the enlarged projection images of the display unit is e.

The spread width of the light passed through the image point on the observing plane depends on the lens condition. For the longitudinal-bar part not to be separated and visually recognized in the primary side robe, this spread width is preferable to be set as equal to or larger than the width "P1×e/P" that is the width on the observing plane in the front-face direction of the width P1 of the longitudinal-bar part. It is because the light from sub-pixel is not separated from the light from the longitudinal-bar part of the main pixel.

Considering now about the condition of the border line at which the spread width of the light that has passed the image point on the observing plane becomes equivalent to "P1×e/P", following Expression 14 applies. By solving Expression 14 for P1 by considering an inequality, following Expression 15 can be obtained.

$$L:I=P1\times e/P:(OD^2+e^2)^0.5-I \qquad \text{(Expression 14)}$$

$$P1 \le (P\times L/e/I)\times((OD^2+e^2)0.5-I) \qquad \text{(Expression 15)}$$

With Expression 15, the relational expression between P1 and e can be established. Thereby, together with the above-described condition, the values of P1 and e can be defined.

In an example, assuming that the pitch P of the display units in the X-axis direction is 0.174 mm, the optimum observing distance OD is 350 mm, the refractive index n of the lenticular lens is 1.53, the number m of the display units is 120, the radius curvature of the cylindrical lens that configures the lenticular lens is 0.088 mm, the lens pitch is 0.1739 mm, and the distance H between the principal point of the cylindrical lens and the pixel is 0.254 mm, the image point distance I becomes 0.946 mm and the width P1 of the longitudinal-bar part of the T-letter shaped display area of the main pixel in the X-axis direction becomes 0.0642 mm when the cycle e of the projection images of the display units is 200 mm. Thus, the width "P1×e/P" of the image projected on the observing plane by the longitudinal-bar part of the width P1 of the T-letter shaped display area in the main robe is calculated as 74 mm.

As described above, there are two feature points in terms of the structure of the first exemplary embodiment. In summary, the first feature point out of the two feature points of the structure is the pixel structure in the display unit, and the second feature point is the lens condition.

In the pixel structure as the first feature point, the one-dimensional image separating part such as the lenticular lens is disposed in such a manner that it does not separate and display only the sub-pixel but separate and display only the main pixel.

That is, assuming that the image separating direction of the lenticular lens is the first direction, a segment extending in the second direction that is orthogonal to the first direction also crosses with the main pixel when it crosses with the sub-pixel. In the meantime, there are also cases where the segment crosses only with the main pixel. As an example, the main pixel has a T-letter shaped display area, and the rectangular display area of the sub-pixel is sectioned into two rectangles to be disposed on the lower left and lower right sides of the T-letter shaped display area.

It is a case where the segment longitudinally sections the rectangular display area of the sub-pixel, when the segment extending in the second direction crosses with the sub-pixel as well as the main pixel. It is a case where the segment longitudinally cuts the longitudinal-bar part of the T-letter shaped display area of the main pixel, when the segment only crosses with the main pixel.

Further, the lens condition as the second feature point is so set that the cylindrical lens configuring the lenticular lens separates the light from the main pixel and the light from the sub-pixel only in the area that is in the vicinity of the front-face direction (area of a specific viewing angle).

That is, the lens condition is so set that images are formed for the front-face direction and the separating performance is deteriorated by the blurring effect for the oblique directions. By combining the first feature point and the second feature point, it is possible to improve the separating performance for the front-face direction and the non-separating performance for the oblique directions, respectively.

Figure 7:
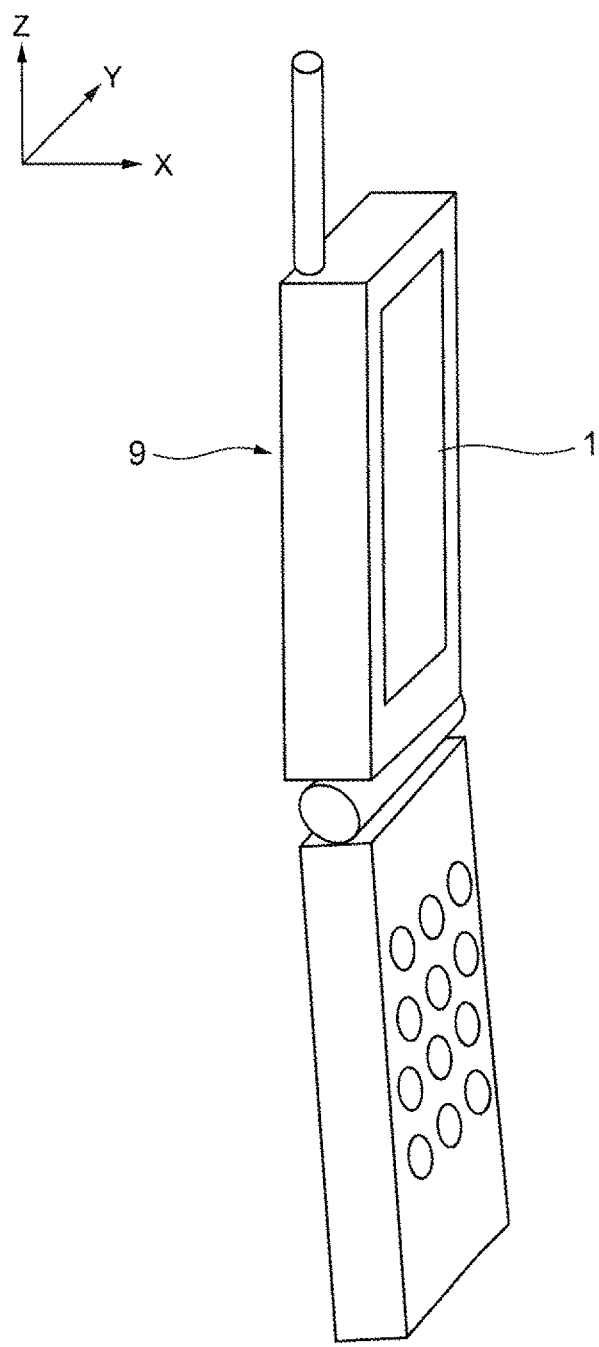
FIG. 7 is a perspective view showing an example of a terminal device which includes the display device according to the first exemplary embodiment of the invention.

As shown in FIG. 7, the display device 1 according to the first exemplary embodiment 1 is loaded to the display unit of a portable telephone 9 as an example of electronic appliances. That is, the portable telephone 9 as the terminal device according to this exemplary embodiment includes the above-described display device 1. The Y-axis direction that is the longitudinal direction of the cylindrical lens 3a shown in FIG. 1 is the longitudinal direction of the screen of the portable telephone 9 (i.e., the vertical direction), and the X-axis direction that is the arranging direction of the cylindrical lenses 3a is the lateral direction of the screen (i.e., the horizontal direction).

(Regarding Control Method for Driving Display Panel)

Figure 8:
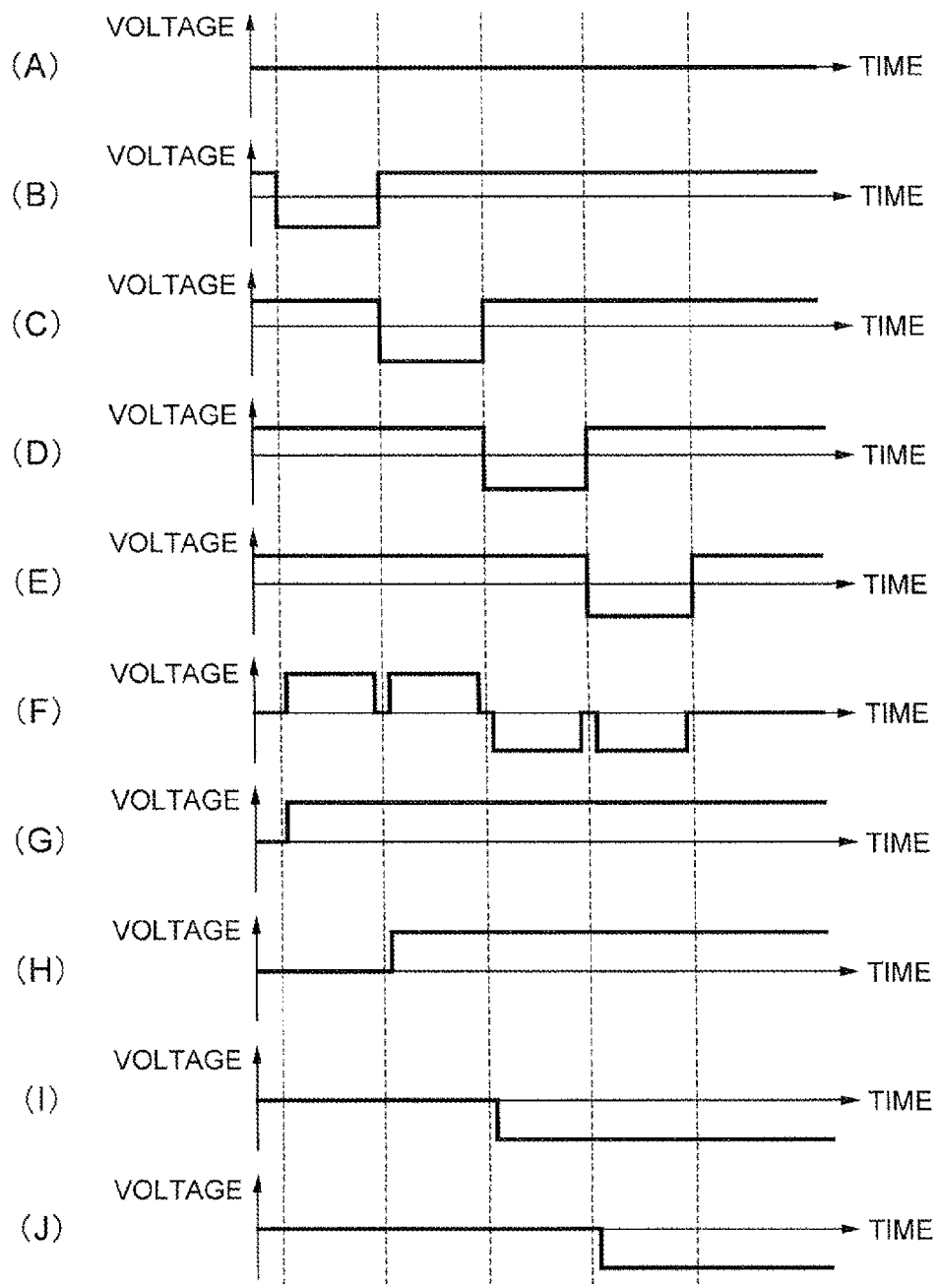

The processing of each part of the display device having the above-described structure can be achieved also as a method. Various kinds of processing procedures as the driving control method of the display panel will be described by referring to FIG. 8.

The driving control method of the display panel according to the exemplary embodiment is targeted at a display panel in which a plurality of display units each including the main pixel for displaying a first image and the sub-pixel for displaying a second image are arranged in matrix in the first direction and in the second direction that crosses with the first direction.

The display unit can have a first display area in which the main pixel and the sub-pixel are formed in the second direction and a second display area in which only the main pixel is formed in the second direction.

As the basic structure, this driving control method of the display panel can drive to execute polarity inversions of each of the pixels so that the main pixel and the sub-pixel come to be in a same polarity so as to display the first image and the second image in the first display area and to display the first image in the second display area.

More detailed operations of the display device will be described hereinafter. First, a method for displaying image data on the display panel will be described.

FIGS. 8A-8J are timing charts showing an example of display operations performed in the display device according to the exemplary embodiment, in which: FIG. 8A shows a case where the lateral axis is time and the longitudinal axis is output voltage of a common electrode control circuit to a common electrode and storage capacity line; FIG. 8B shows a case where the lateral axis is time and the longitudinal axis is output voltage to a scanning line that is connected to a main pixel of a display unit positioned in the first row and the first column; FIG. 8C shows a case where the lateral axis is time and the longitudinal axis is output voltage to a scanning line that is connected to a sub-pixel of the display unit positioned in the first row and the first column; FIG. 8D shows a case where the lateral axis is time and the longitudinal axis is output voltage to a scanning line that is connected to a main pixel of a display unit positioned in the second row and the first column; FIG. 8E shows a case where the lateral axis is time and the longitudinal axis is output voltage to a scanning line that is connected to a sub-pixel of the display unit positioned in the second row and the first column; FIG. 8F shows a case where the lateral axis is time and the longitudinal axis is output voltage to a first-row signal line of a signal line driving circuit; FIG. 8G shows a case where the lateral axis is time and the longitudinal axis is voltage of a pixel electrode for a common electrode in the main pixel of the display unit positioned in the first row and the first column; FIG. 8H shows a case where the lateral axis is time and the longitudinal axis is voltage of a pixel electrode for a common electrode in the sub-pixel of the display unit positioned in the first row and the first column; FIG. 8I shows a case where the lateral axis is time and the longitudinal axis is voltage of a pixel electrode for a common electrode in the main pixel of the display unit positioned in the second row and the first column; and FIG. 8J shows a case where the lateral axis is time and the longitudinal axis is voltage of a pixel electrode for a common electrode in the sub-pixel of the display unit positioned in the second row and the first column.

Figure 9:
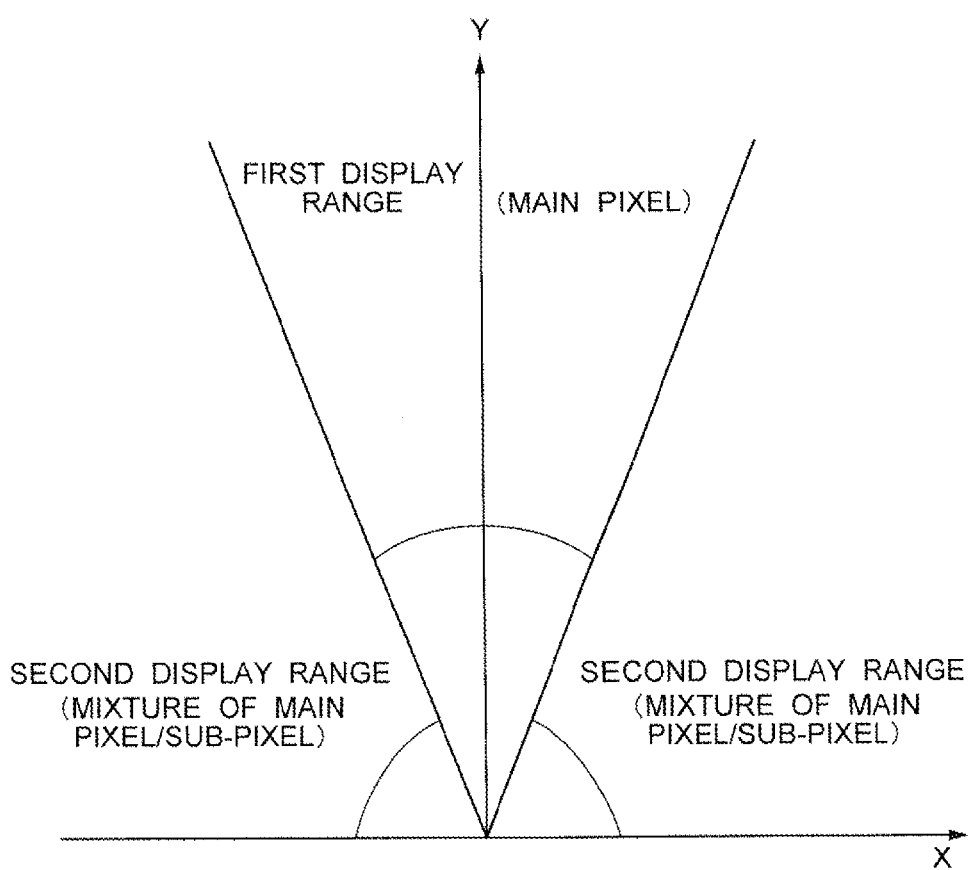
FIG. 9 is a graph showing a distribution of the images displayed on the main pixels and the sub-pixels, when the lateral axis is the coordinates of the X-axis direction and the longitudinal axis is luminous intensity taken on an observing plane of the display device according to the first exemplary embodiment of the invention.

FIG. 9 is a graph showing a distribution of the images displayed with the main pixels and the sub-pixels, when the lateral axis is the coordinates of the X-axis direction and the longitudinal axis is luminous intensity taken on an observing plane that is away from the display surface by the optimum observing distance OD.

A third feature point of this exemplary embodiment is the driving control method of the display panel. That is, the pixels configuring each display unit are driven to have the same polarity.

Furthermore, the neighboring display units are driven to have different polarities. The pixels configuring each display unit are driven to have the same polarity so as to achieve a high picture quality, and the neighboring display units are driven to have different polarities so as to decrease flickers on the screen caused due to a polarity inverting action.

The timing charts shown in FIGS. 8A-8J are made by paying attention particularly on the display unit located at the first row and the first column and the display unit located on the second row and the second column for the sake of explanation, which particularly shows a writing operation of a specific frame.

Definitions of the frames vary depending on the display types such as a progressive type and an interlace type. In the present invention, the number of writing operations executed per second when paying attention to each pixel is called a frame number. In a typical liquid crystal display device, the writing operations are executed sixty times per second. That is, the frame number per second is "60", the frame frequency is 60 Hz, and one frame period is about 16 ms.

Further, liquid crystal molecules in the typical liquid crystal display device are driven by an AC electric field. This is because it is not preferable to apply a DC electric field that generates a phenomenon such as ghosting. In order to drive the liquid crystal molecules by the AC electric field, it is necessary to invert the polarity of the pixel electrode with respect to the common electrode at a specific interval. As a method for inverting the polarity, various methods are proposed. The display panel 2 according to the first exemplary embodiment in particular is driven by 2-line dot inversion.

That is, as described above, two scanning lines are connected to one display unit for controlling the main pixel and the sub-pixel. When the two scanning lines are being selected, display data is supplied to the signal line so that the main pixel and the sub-pixel come to be in a same polarity. "To be in a same polarity" means that the voltage polarity of the pixel electrode is the same as that of the common electrode.

Thereby, the main pixel and the sub-pixel in a same frame come to be in a same polarity. Considering it in terms of the display units, the display units neighboring to each other in the X-axis direction and the Y-axis direction have the polarities of different signs (positive and negative).

In a dot inversion operation of this exemplary embodiment, a DC current of a prescribed value is applied to the common electrode and a signal voltage supplied to the pixel electrode is so supplied that it exhibits positive/negative polarity with respect to the common electrode, as in the case of the typical dot inversion operation.

Therefore, as shown in FIG. 8A, the voltage supplied to the common electrode 201COM and the storage capacitance line 201CS of the common electrode control circuit 201CC is a specific DC current itself, which in this case is fixed to 0 V. That is, the common electrode opposing to the pixel electrode is fixed to a specific value of 0 V in all the pixels.

As shown in FIG. 8B, when the first-row scanning line 201V1 becomes a low-level in a corresponding horizontal period, the P-type thin film transistor 201T in the main pixel 201F to which the scanning line 201V1 is connected turns into on-state.

Then, the switch to which the signal line 201H1 in the signal line driving circuit 201HV is connected turns into on-state and, as shown in FIG. 8F, a voltage of the signal that is to be displayed on the main pixel in the display unit of the first row and the first column is supplied to the signal line 201H1. As a result, as shown in FIG. 8G, the voltage of the signal line 201H1 is transferred to the pixel electrode of the main pixel of the first row and the first column via the thin film transistor 201T so that the voltage of the pixel electrode for the common electrode is set to a prescribed value.

As an example, this voltage is +5 V. Similarly, for the main pixel in other display unit on the first row, prescribed voltages according to the display contents are set via the corresponding signals.

However, since this embodiment employs 2-line dot inversion, voltages of different signs (positive and negative) with respect to the potential of the common electrode are supplied to the main pixels of the neighboring display units. For example, a voltage value of the pixel electrode for the common electrode of the main pixel for the display unit at the first row and the second column is −5 V.

Next, as shown in FIG. 8C and FIG. 8F, a voltage is also supplied to the sub-pixel of the first row and the first column in the same manner. However, this exemplary embodiment employs 2-line dot inversion, so that a voltage of the same polarity as that of the main pixel that forms the display unit is supplied as in FIG. 8H. For example, the voltage of the pixel electrode of the sub-pixel at the first row and the first column is +5 V.

Further, as shown in FIG. 8D and FIG. 8F, a voltage is also supplied to the main pixel in the second row and the first column in the same manner. However, as shown in FIG. 8I, the polarity thereof is different from the pixel of the first row and the first column. For example, it is −3 V.

Furthermore, as shown in FIG. 8E and FIG. 8F, a voltage is also supplied to the sub-pixel in the second row and the first column in the same manner. As shown in FIG. 8J, this is a voltage of the same polarity as that of the main pixel that forms the display unit, and it is −3 V, for example. In this manner, image data is written to the display panel 2 in order.

For example, when there are one thousand scanning lines, one scanning period becomes 16 µs since the one-frame period is 16 ms as described above.

In the meantime, response time of the liquid crystal molecules is several ms, so that it is impossible for the liquid crystal molecules of the pixels to which writing is done to complete the response in the writing period.

If the liquid crystal molecules respond after completing the writing, voltage fluctuation is to occur. This is because the pixel capacitance changes when the alignment of the liquid crystal molecules changes by the written voltage, since there are liquid crystal molecules between the common electrode and the pixel electrode and the liquid crystal molecules have anisotropy for the dielectric constant, while the written voltage is accumulated in the pixel capacitance between the common electrode and the pixel electrode at the time of writing.

To decrease this influence, the storage capacitance 201C is provided. That is, the written voltage is held not only in the pixel capacitance but also in the storage capacitance.

Further, when the corresponding scanning period ends for each pixel, the voltage of the scanning line changes to high-level. At this time, voltage shift called "field through" occurs due to a coupled capacitance between the gate and the source of the thin film transistor. This voltage shift can be decreased by increasing the capacitance value of the storage capacitance 201C. Furthermore, there is a small leak current flown in the thin film transistor even under off-state. Providing the storage capacitance 201C is also effective for decreasing the influence of this leak current.

The written voltage is kept until the scanning line becomes low-level again in a next frame and the thin film transistor of the pixel turns into on-state. In the next frame, the voltage polarity of the pixel electrode is inverted with respect to that of the previous frame.

That is, the 2-line dot inversion is employed on the assumption that it is sued together with frame inversion in which the polarity is inverted by frame. In this manner, image data is written to the display panel 2 in order, and the alignment of the liquid crystal molecules in each pixel changes according to the written voltages, thereby displaying images.

(Image Separating Action by Lens)

Next, the image separating action by the lens will be described. FIG. 9 is a graph showing a distribution of the images displayed on the main pixel and the sub-pixel, when the lateral axis is the coordinates of the X-axis direction and the longitudinal axis is luminous intensity taken on an observing plane.

As described above, an image of the longitudinal-bar part of the T-letter shaped display area in the main pixel is disposed to be in the front-face direction, and the cylindrical lens is formed to separate the front-face direction. Further, the main pixel displays a main image and the sub-pixel displays a sub-image.

As a result, only the main image is observed in a first display range in the vicinity of the front-face direction, while the main image and the sub-image are observed in a mixed manner in a second display range that is the range of the other angles. In the second display range where the mixed display is observed (particularly, at angles close to the first display range), the mixed display is provided with the layout of the lateral-bar part of the T-letter shaped display area of the main pixel and the rectangular display area of the sub-pixel.

With the ranges of the larger angles, the mixed display can be provided by the above-described lens condition, i.e., by the lens structure which deteriorates the separating performance for the oblique directions of large angles.

Further, it is possible with the present invention to achieve the mixed display not only for the angle range that is tilted to the X-axis direction from the front-face direction but also in the angle range that is tilted to the Y-axis direction.

This is because the optical path length between the lens and the pixel of the light emitted to the direction that is tilted to the Y-axis direction from the front-face direction becomes longer as the tilt angle increases, which results in generating the defocus effect. That is, deterioration in the separating performance of the lens generated when the tilt angle increases in the case where the light is emitted to the direction tilted to the X-axis direction also occurs with the case of the tilt in the Y-axis direction.

However, the cylindrical lens is extended in the Y-axis direction, so that it exhibits no separating action in the Y-axis direction. Further, the display units have no sub-pixel in the Y-axis direction. Therefore, the mixed display cannot be achieved by the pixel layout.

Achieved is only the mixed display that simply utilizes the deterioration in the separating performance of the lens. Thus, the effect of the case tilted in the Y-axis direction is lower than that of the case tilted in the X-axis direction. However, it is effective since the two-dimensional effect can be achieved by utilizing a simple image separating part of one-dimensional layout.

Next, images to be displayed will be described. With this exemplary embodiment, the images to be displayed vary depending on the two modes, i.e., a display angle limited mode in which displayed information cannot be visually recognized from directions other than a specific direction, and a normal display mode in which the display can be visually recognized from a wide angle range.

In the normal display mode, same images are displayed on the main pixel and the sub-pixel of each display unit. Thereby, the same images can be displayed not only in the first display range in the vicinity of the front face but also in the second display range, i.e., in the angle range of the oblique directions where the first display and the second display are displayed without being separated.

In the display angle limited mode where the display angle range is limited, the sub-pixel displays inverted information of that of the main pixel. "Inverted information" herein means information where the gradations thereof are inverted. With this, the same display as that of the normal display can be achieved in the first display range in the vicinity of the front face, while the normal display and the inverted image thereof are displayed in the second display range in a mixed manner without being separated. As a result, the entire display surface turns into gray in the second display range, so that the displayed information cannot be visually recognized.

The use of the inverted image and the display angle limited mode achieved thereby are the fourth feature point of the first exemplary embodiment.

Figure 10A:
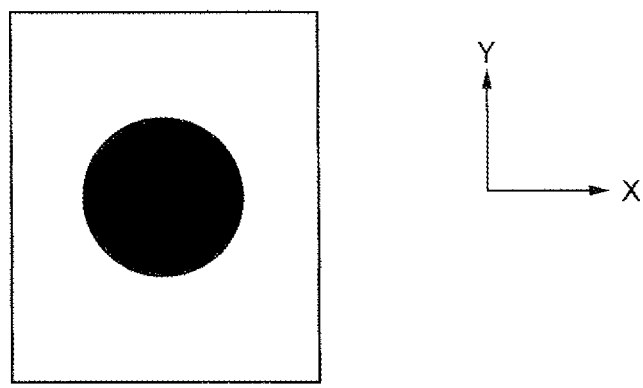
Figure 10B:
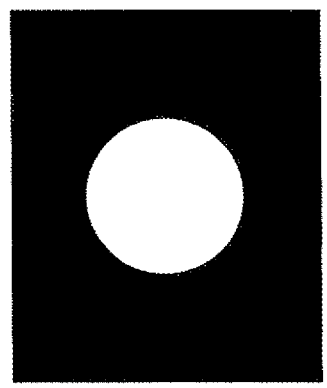
Figure 10C:
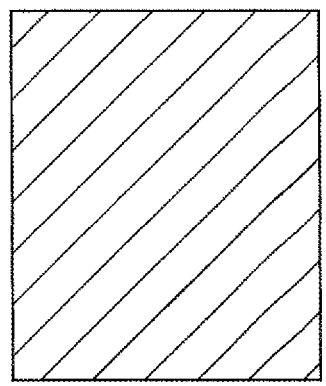

A case where the entire display surface grays out in the second display range with the display angle limited mode will be described in detail by using the drawings. FIG. 10A is an example of the image displayed on the main pixels in the display angle limited mode, FIG. 10B is an example of the image displayed on the sub-pixels, and FIG. 10C is an example of the image observed from oblique directions. FIG. 10B is an inverted image of FIG. 10A. For example, when this image information is expressed with digital values of 0-255, inside a black circle of FIG. 10A takes a value "0", while the other area takes a value "255". Thus, inside a black circle of FIG. 10B takes a value "255", while the other area takes a value "0".

In the example of observation shown in FIG. 10C, inside the black circle takes a mean value of the value "0" of the main pixel and the value "255" of the sub-pixel. The other area takes a mean value of the value "255" of the main pixel and the value "0" of the sub-pixel. That is, same values are observed whether it is inside or the outside the black circle.

With this, the black circle becomes unobservable from the oblique directions, so that it becomes possible to limit the display angle range. Further, the display angle range can be limited not only in the case of displaying the simple black circle as in the above-described case but also in the case of displaying confidential information such as character information and image information, so that it is possible to keep confidentiality.

In FIGS. 10A-10C, described is the case of switching the display angle limited mode and the normal display mode on the entire display screen. As it is evident from the explanation, it is possible with the present invention to switch the modes in each display unit. That is, the both modes can be switched by simply changing the displayed data. It is therefore also easy to change the part that is specifically desired to be concealed among the displayed image (the part with high confidentiality) to the display angle limited mode.

(Effects)

Next, the effects of the first exemplary embodiment will be described.

With the first exemplary embodiment, it is possible to switch the display angle limited mode in which the display contents can be visually recognized only by the user located in the front-face direction and the normal display mode in which the display contents can be visually recognized from a wide angle range by using a single lenticular lens and a display panel and by simply changing the display contents. Further, this switching can be achieved by each display unit.

Further, the lenticular lens is an optical element in which the cylindrical lenses are arranged one-dimensionally, so that the structure thereof is simple. Therefore, it is easy to be manufactured, and the cost can be decreased. With this exemplary embodiment, a single lenticular lens is simply used as the image-separating optical element, so that the thickness of the display device can be reduced and the cost can be decreased as well. Further, the structure is simple, so that the manufacture thereof is easy. As a result, the reliability can be improved as well.

Furthermore, the lenticular lens only refracts the transmission light but absorbs almost no light. Therefore, it is possible to provide bright displays with no optical loss.

Further, with the present invention, it is possible to achieve a two-dimensional display mode switching effect by using this optical element of one-dimensional layout. That is, the switching effect can be achieved not only in the arranging direction of the cylindrical lenses but also in the orthogonal direction thereof on the display surface.

The image displayed on the main pixel can always be displayed by itself for a specific direction. Further, the image displayed on the sub-pixel can always be displayed by being superimposed on the image displayed on the main pixel in the angle range other than the specific direction. Specifically, the use of the sub-pixel makes it possible to: display the first image and the second image as different images; prevent the display of the main pixel from being visually recognized from the directions other than the specific direction; deteriorate the visibility of displayed information in the directions other than the specific direction while avoiding a troublesome work of wearing special eyeglass; and sufficiently keep the confidentiality for the directions other than the specific direction. Furthermore, it is possible to switch to the normal display by making the first image and the second image as the same image.

As described above, the use of sub-pixels can achieve the display angle limited mode which can prevent the display of the main pixel from being visually recognized from the directions other than the specific direction.

Further, the sub-pixels are disposed by corresponding to the main pixels, so that it is possible to achieve the normal display mode in which the display can be visually recognized from a wide angle range, by simply making the display contents of the sub-pixels be the same as the display contents of the main pixels.

Furthermore, as the image of the sub-pixel that is displayed by being superimposed in the image displayed on the main pixel, it is possible in the display angle limited mode to display the image of the same definition as that of the image displayed on the main pixel. This makes it possible to deteriorate the visibility of the displayed information from the directions other than the specific direction, so that the performance of the display angle limited mode can be improved. Further, it is possible to provide sub-pixels that are independent of the main pixels, so that it is possible with the use of the sub-pixels to display moving images and the like which attract attentions. Thereby, peeping attempts from the directions other than the specific direction can be prevented effectively.

Further, since the optical member capable of spatially distributing the light from the pixels is used, it is unnecessary to wear special eyeglasses. Thus, there is no such troublesome work required.

(Summary of Feature Points)

The feature points of the exemplary embodiment will be summarized here. As described in detail heretofore, the essential structural element of the present invention is the first feature point of the present invention. That is, in the separating direction of the image separating part, the sub-pixel is disposed so as not to be observed by being separated from the main pixel. In the meantime, it is so structured that only the main pixel is separated and observed. This makes it possible to achieve the display angle limited mode that is the effect of the present invention.

Further, as depicted in this exemplary embodiment, the main pixel has the T-letter shaped display area, and the sub-pixel has the rectangular display area. Therefore, wiring to each pixel can be done easily, which makes it possible to have a high effect with a simple structure.

Further, the width of the rectangular display area of the sub-pixel in the Y-axis direction is set to be almost equivalent to the width of the T-letter shaped display area of the main pixel in the Y-axis direction. With this, the effect of deteriorating the visibility of the main pixel by the sub-pixel can be improved, so that the confidentiality can be kept in an excellent manner.

Furthermore, the length of the longitudinal-bar part of the T-letter shaped display area of the main pixel is set to be substantially equal to the sum of the length of the lateral-bar part of the T-letter shaped display area in the Y-axis direction and the length of the rectangular display area of the sub-pixel in the Y-axis direction. With this, the luminance in the front-face direction and that of the oblique directions can be made equal, so that an uncomfortable feeling felt by the user particularly in the normal display mode can be eased.

The above is the essential structural element of the present invention, and the performance thereof can be improved drastically by using the second feature point of the present invention together. That is, the image separating part as the second feature point of the present invention is the lenticular lens having the one-dimensional image separating effect, and the cylindrical lenses that configure the lenticular lens separate the light from the main pixel and the light from the sub-pixel only in the vicinity of the front-face direction. That is, the lens condition is so set that images are formed for the front-face direction and the separating performance is deteriorated for the oblique directions by the blurring effect. By combining the first feature point and the second feature point, the non-separating performance for the front-ace direction and the non-separating performance for the oblique directions can be improved, respectively.

Furthermore, as described as the third feature point of the present invention, the polarities of the pixels configuring each display unit are the same in the display panel of the present invention, and the neighboring display units are driven to be in different polarities. The same effects as those of normal dot inversion drive can be achieved with the present invention by driving the neighboring display units to be in different polarities.

With this, the spatial frequency of the polarity distribution within the display surface can be increased. Therefore, flickers caused due to the polarity inversion can be decreased. Furthermore, displays for the vicinity of the front-face direction and for the range of other angles particularly in the normal display mode can be made uniform through making the polarities be the same in each display unit. This makes it possible to provide high picture qualities.

Further, when inverted information of the main pixel is to be displayed on the sub-pixel, it is possible to increase the leveling effect in the mixed display and to increase the effect for preventing peeping attempts.

This is because it is difficult to achieve the same optical performance when the polarities are different even when the voltages of the same absolute value are written, due to the influence of the field through and the like described above. While this driving condition is not the essential structural element of the present invention, the effect of the present invention can be particularly improved by employing it together.

Further, use of the inverted image, which is the fourth feature point of the present invention, is not the essential structural element. For example, a checkered pattern or a completely different image (a monochrome image, for example) can also be used for the sub-pixel. However, when an image other than the inverted image is used, it is simply observed by being superimposed on the display contents of the main pixel from the oblique directions.

It is to be noted, however, that the effect for preventing peeping attempts in the display angle limited mode can be more increased than the conventional method, i.e., the method which superimposes a rougher pattern than the pixels on the displayed image.

This is because the present invention makes it possible to superimpose also a fine pattern that is equivalent to the pixels on the displayed image. When an inverted image is used in particular, the display contents of the main pixels can be cancelled completely. Therefore, the effect for preventing the peeping attempts and the effect for keeping the confidentiality can be increased dramatically.

When an image other than the inverted image is used, it is preferable for the image to change chronologically. This makes it possible to increase the degree of attention drawn to the sub-pixel so as to decrease the visibility of the main image.

As described above, the essential structural element of the present invention is the first feature point. It is possible to use the first feature point alone, and to employ it in combination with each of the second to fourth feature points. Particularly, the maximum effect can be obtained when using the first to fourth feature points in combination.

Now, differences between the present invention and a display device according to a related technique using a lenticular lens will be discussed. As an example of such display device, there is a stereoscopic image display device. The stereoscopic image display device has pixels for displaying images for the left eye and pixels for displaying image for the right eye, and each image is separated by using an image separating part such as a lenticular lens. That is, each viewpoint is equivalent, and pixels for each viewpoint (for left eye and right eye) are configured in the same manner.

In the meantime, the present invention uses the main pixel and the sub-pixel in different shapes, as described above. That is, each pixel is not formed equivalently. Further, while it is the target to separate the displays for each viewpoint with the conventional stereoscopic image display device, the present invention does not separate the displays for the directions other then the vicinity of the front-face direction and actively achieve mixed displays for the oblique directions. As mentioned, there is a large difference between the concepts of the both techniques.

When achieving the display angle limited mode as in the present invention by utilizing the concept of the stereoscopic image display device of the related technique, it is necessary to increase the magnification of each viewpoint, i.e., to increase the separating angle.

This cannot be achieved only with the normal lenticular lens. Therefore, there is also proposed a case where an image separating part that is configured with a polarization control liquid crystal cell, a lenticular lens, and a patterned retardation film is provided on the back-face side of a display panel.

As described, normally, it is necessary to employ a complicated optical system for the image separating part in order to achieve the large separating angle.

Meanwhile, the present invention can achieve a high performance with a simple structure by changing the way of thinking, that is, to utilize the mixed display actively.

(Others)

Further, provided that an image formed on the observing plane by the first light among the light emitted from each of the display units, which passes through the part corresponding to each of the display units and exits therefrom, is the main robe and an image formed on the observing plane by another light (second light) is the side robe, the optical member can separate the light from the main pixel to form either the main robe or the side robe.

Further, the optical member can be formed with a lenticular lens in which cylindrical lenses are disposed by corresponding to each of the display units arranged along at least in the first direction.

Further, the display part displays the first image in the first display range that takes a specific viewing angle as the range, and displays a synthesized image of the first image and the second image in the second display range that is other than the first display range.

In this exemplary embodiment, the driving control method of the liquid crystal display panel can employ not only the above-described thin film transistor system but also the active matrix system such as TFD (Thin Film Diode) system.

Further, a passive matrix system such as STN (Super Twisted Nematic Liquid Crystal) may also be used.

Furthermore, any systems such as normally-white and normally-black may be used in the cases of the liquid crystal display panel.

Furthermore, the display panel is not limited to the liquid crystal display panel. For example, an organic electroluminescence display panel, a plasma display panel, a CRT (Cathode-Ray Tube), an LED (Light Emitting Diode) display panel, a field emission display panel, a PALC (Plasma Address Liquid Crystal) display panel, a display panel called an electronic paper, or a display panel similar to those may be used as well.

Further, it has been described in the exemplary embodiment that the display unit is configured with two kinds of pixels (i.e., the main pixel and the sub-pixel). However, the present invention is not limited to such case. The display unit may be configured with three kinds of pixels or more.

Further, it has been described that the main pixel has the T-letter shaped display area and the sub-pixel has the rectangular display area. However, other shapes may be employed as well, as long as those are arranged in such a manner that the sub-pixel is not observed by being separated from the main pixel. For example, a shape obtained by inverting the T-letter shape vertically, a cross shape formed by superimposing the inverted shape and the T-letter shape, or a Y-letter shape may be used.

Further, it is also possible to employ a shape obtained by arranging a plurality of T-letter shapes in parallel in the vertical direction. Furthermore, the shape of the sub-pixel is not limited to the rectangular shape but may also be other polygons such as a triangle or may be a circular shape. The important point is that it has the shapes and the layout with which the sub-pixel is not observed by being separated from the main pixel.

Further, it is possible with this exemplary embodiment to achieve color displays by using a color filter. Furthermore, it is also possible to display color images without using a color filter through lighting up a plurality of color light sources in a time division manner. When a color filter is disposed, it is desirable for the pixels in each of the display unit to be in a same color.

This makes it possible to ease the demand for micronization of the color filter. Further, if each of the display units is not configured with the same-color pixels, it is necessary to set the layout in such a manner that the colors are compensated by using the neighboring display units. For example, when the main pixel of a given display unit is red and the sub-pixel is green, the main pixel of the neighboring display unit is set as green and the sub-pixel is set as blue, and the main pixel of the next display unit of the neighboring display unit is set as green and the sub-pixel is set as red.

Further, when using a stripe-type color filter, it is preferable for the color filter to have a stripe layout in which the color layout direction is the Y-axis direction, i.e., a lateral stripe layout. That is, it is preferable to arrange the colors to be orthogonal to the image separating direction of the one-dimensional optical element. This makes it possible to prevent the colors from being separated by the image-separating optical device.

Furthermore, when an inverted image is to be displayed on the sub-pixel, it is necessary to generate the inverted image. At a stage where image information is held in digital values, image information can be easily generated by performing NOT operation. While such image generating operation can be executed in a terminal device, it is also possible to execute the image generating operation easily by a display device, particularly by a circuit disposed on a display panel. In that case, it is preferable to provide a signal line for controlling whether to display the same information as that of the main pixel on the sub-pixel or to display inverted information, and to control the signal line.

This makes it possible to control the display mode easily. Further, changes in other parts than the display panel can be suppressed to the minimum.

Further, while the lens condition in this exemplary embodiment is set for a perfect case where there is no side robe image of the main pixel, the present invention is not limited only to such case.

For example, there is also an influence of aberration and the like, so that it is possible to achieve the effect also with a blurring amount of about a half, as in following Expression 16. In this case, "P1" can be obtained from following Expression 17.

$$L:I=P1\times e/P2:(OD^2+e^2)^{0.5}-I \qquad \text{(Expression 16)}$$

$$P1=(2\times P\times L/e/I\times((OD^2+e^2)^{0.5}-I) \qquad \text{(Expression 17)}$$

Furthermore, it has been described in the exemplary embodiment that an inverted image of the main pixel is used as the image of the sub-pixel. However, the image of the sub-pixel does not necessarily have to be a perfect inverted image.

This makes it possible to deteriorate the contrast greatly when viewed from the oblique directions, so that it is effective for keeping the confidentiality. Furthermore, it is also possible to superimpose another image on the inverted image.

This makes it possible not only to deteriorate the contrast greatly when viewed from the oblique directions but also to draw attentions of the observers located in the oblique directions to the other image, so that it is effective for keeping the confidentiality.

Further, when black is displayed on the sub-pixel, the transmittance for the oblique directions can be deteriorated largely compared to that for the vicinity of the front-face direction.

This is because the dub-pixel displays black, while the image of the main pixel and the image of the sub-pixel are visually recognized in a mixed manner from the oblique directions. Similarly, when white is displayed on the sub-pixel, the contrast for the oblique directions can be deteriorated compared to that for the vicinity of the front-face direction.

Furthermore, when the exemplary embodiment is structured to be capable of displaying color images, an image in which only a specific color is inverted may be used as the inverted image. For example, there is a method which only inverts information of green.

The visibility of green is higher than that of other colors, so that it is possible to achieve a confidentiality keeping effect to some extent.

To invert only a specific color as described above is very effective for reducing inversion processing. Further, it is effective, since the green pixel can display the inverted information and pixels of other colors can display different images.

With the present invention, the image displayed on the main pixel can always be displayed by itself for a specific direction. Further, the image displayed on the sub-pixel can always be displayed by being superimposed on the image displayed on the main pixel in the angle range other than the specific direction. Therefore, it is possible to provide the excellent display device, electronic appliance, optical member, display panel, controller, display panel driving control method, and control program, which cannot be achieved by the related techniques. Those that can be provide by the present invention can display the first image and the second image as different images by using the sub-pixel so as to prevent the display of the main pixel from being visually recognized from the directions other than the specific direction; deteriorate the visibility of displayed information from the directions other than the specific direction while avoiding a troublesome work of wearing special eyeglass. Furthermore, it is possible to switch to the normal display by making the first image and the second image as the same image.

Second Exemplary Embodiment

Figure 11:
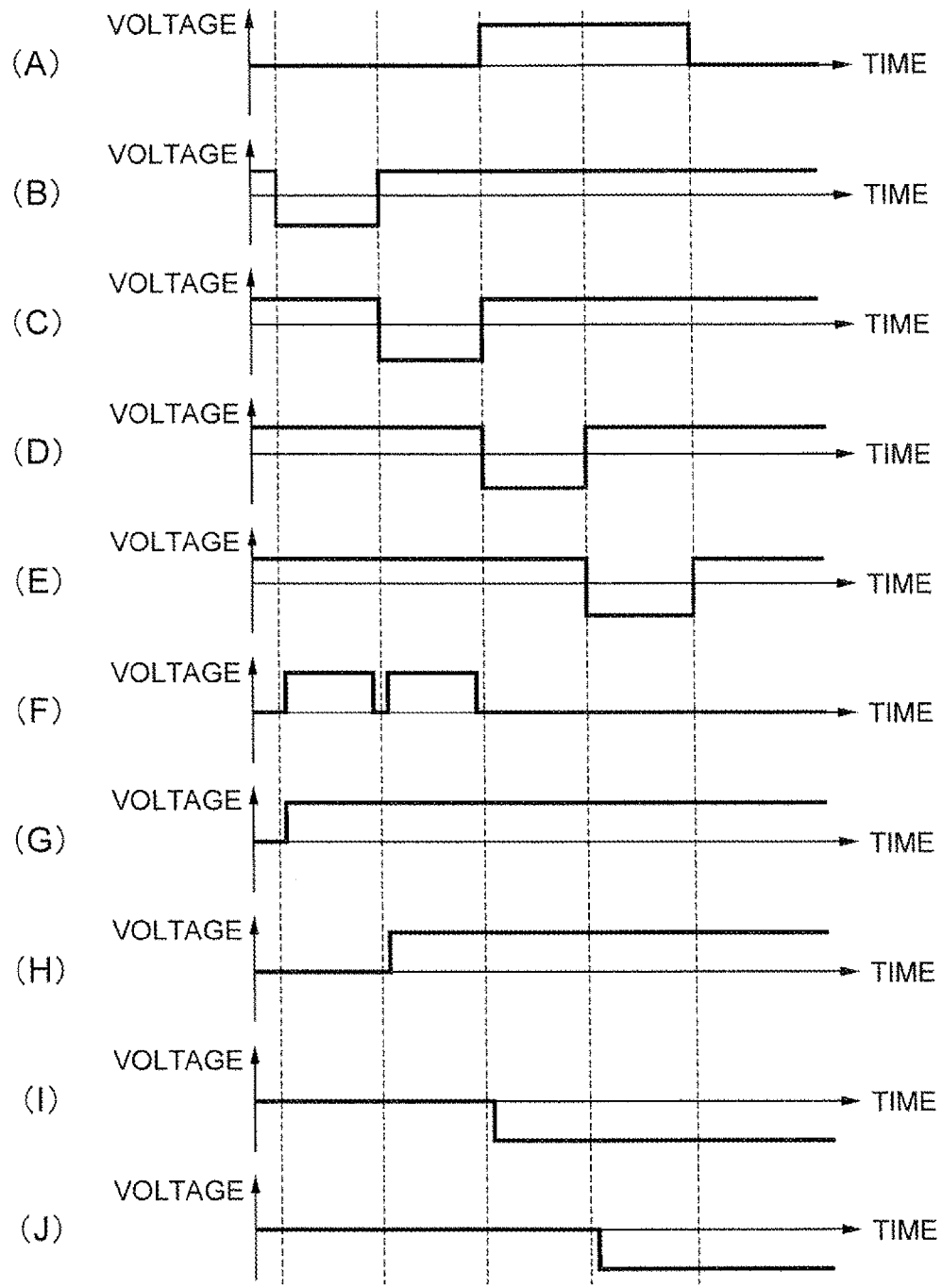
Figure 12:
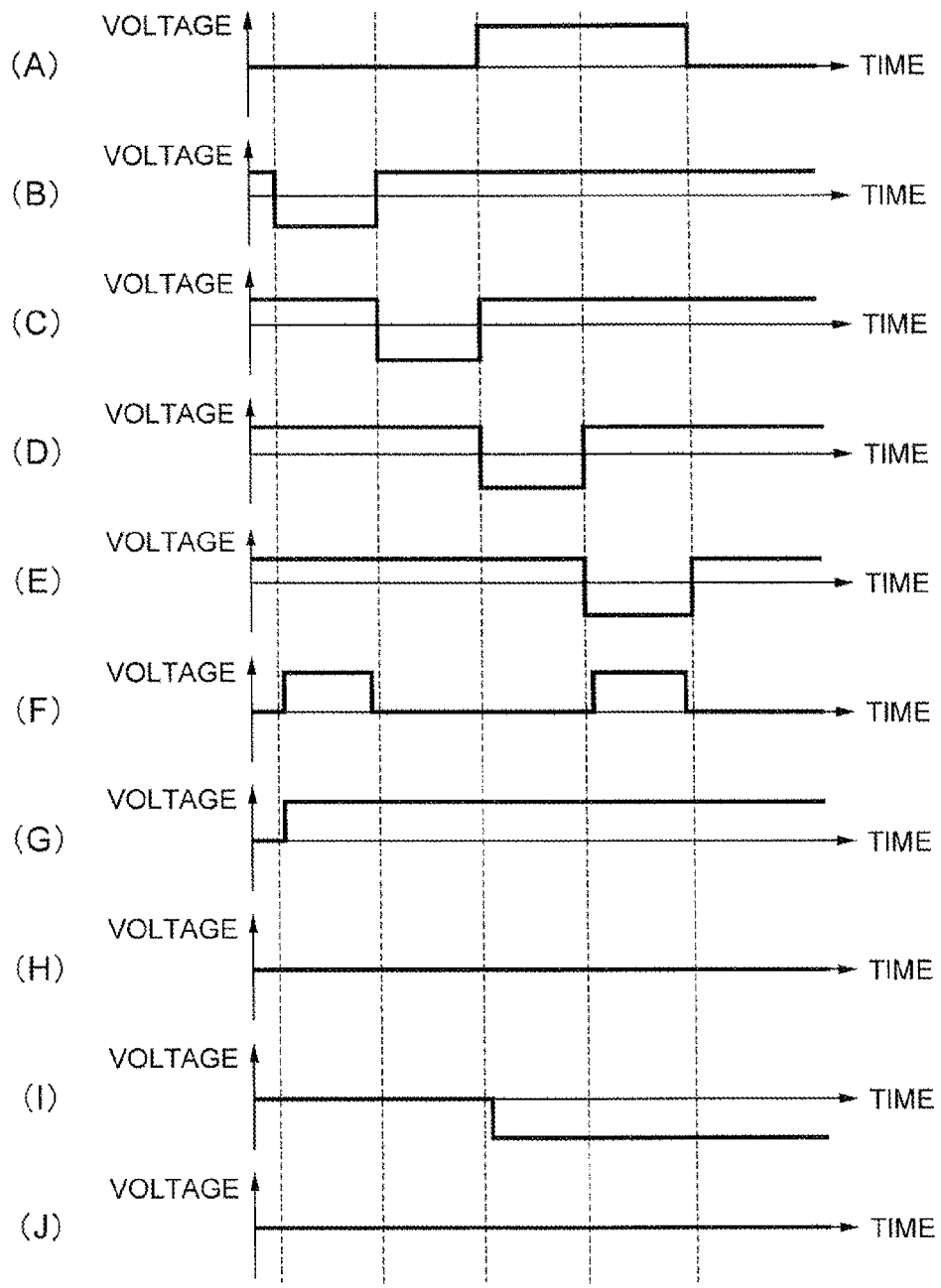

Next, a second exemplary embodiment of the present invention will be described by referring to FIG. 11 and FIG. 12. Hereinafter, the structure that is substantially the same as that of the first exemplary embodiment is omitted, and only the different points are described. FIG. 11 is a timing chart showing examples of display operations of a display device according to the second exemplary embodiment of the present invention in a normal display mode. FIG. 12 is a timing chart showing examples of display operations of the display device according to the second exemplary embodiment of the present invention in a display angle limited mode.

In the above-described first exemplary embodiment, dot inversion is employed as the base, and polarity inversion operations are executed by every two scanning lines. In the meantime, the second exemplary embodiment is largely different in respect that it employs line inversion as the base. It is a prominent feature point of the second exemplary embodiment to generate inverted images by utilizing the line inversion drive without providing a special circuit.

A display panel driving control method according to this exemplary embodiment is targeted at a display panel in which a plurality of display units each containing a main pixel for displaying a first image and a sub-pixel for displaying a second image are arranged in matrix in a first direction and a second direction that crosses with the first direction.

The display unit may have a first display area in which the main pixel and the sub-pixel are formed in the second direction, and a second display area in which only the main pixel is formed in the second direction.

Further, the display unit can contain: a main pixel electrode that configures the main pixel; a sub-pixel electrode that configures the sub-pixel; a common electrode that opposes the main pixel electrode and the sub-pixel electrode; a first switching element for transmitting video signals to the main pixel electrode; a second switching element for transmitting video signals to the sub-pixel electrode; a first scanning line for controlling the first switching element; a second scanning line for controlling the second switching element; and a signal line for supplying the video signals.

As the basic structure, this display panel driving control method performs drive control to invert either the potential of the video signal in the sub-pixel or the potential of the common electrode so as to display the first image and the second image in the first display area and to display the first image in the second display area, while displaying the second image whose gradation is inverted from that of the first image on the sub-pixel.

More detailed operations of the display device will be described hereinafter.

(Normal Display Mode)

First, the display operations of the normal display mode will be described by referring to FIGS. 11A-11J. FIGS. 11A-11J show examples of display operations in the normal display mode, in which: FIG. 11A shows a case where the lateral axis is time and the longitudinal axis is output voltage of a common electrode control circuit to a common electrode and storage capacity line; FIG. 11B shows a case where the lateral axis is time and the longitudinal axis is output voltage to a scanning line that is connected to a main pixel of a display unit positioned in the first row and the first column; FIG. 11C shows a case where the lateral axis is time and the longitudinal axis is output voltage to a scanning line that is connected to a sub-pixel of the display unit positioned in the first row and the first column; FIG. 11D shows a case where the lateral axis is time and the longitudinal axis is output voltage to a scanning line that is connected to a main pixel of a display unit positioned in the second row and the first column; FIG. 11E shows a case where the lateral axis is time and the longitudinal axis is output voltage to a scanning line that is connected to a sub-pixel of the display unit positioned in the second row and the first column; FIG. 11F shows a case where the lateral axis is time and the longitudinal axis is output voltage to a first-row signal line of a signal line driving circuit; FIG. 11G shows a case where the lateral axis is time and the longitudinal axis is voltage of a pixel electrode for a common electrode in the main pixel of the display unit positioned in the first row and the first column; FIG. 11H shows a case where the lateral axis is time and the longitudinal axis is voltage of a pixel electrode for a common electrode in the sub-pixel of the display unit positioned in the first row and the first column; FIG. 11I shows a case where the lateral axis is time and the longitudinal axis is voltage of a pixel electrode for a common electrode in the main pixel of the display unit positioned in the second row and the first column; and FIG. 11J shows a case where the lateral axis is time and the longitudinal axis is voltage of a pixel electrode for a common electrode in the sub-pixel of the display unit positioned in the second row and the first column.

Since this exemplary embodiment employs the line inversion as the base, the voltage supplied to a common electrode 201COM and a storage capacitance line 201CS of a common electrode control circuit 201CC is in a square wave, as shown in FIG. 11A. It is assumed that the amplitude is 5 V in this exemplary embodiment. The line inversion operations are executed by every two scanning lines in this exemplary embodiment.

First, a writing operation for the main pixel positioned in the first row and the first column will be described. The voltage supplied to the common electrode 201C and the storage capacity line 201CS at this time is 0 V.

As shown in FIG. 11B, when the scanning line 201V1 turns to low level in a corresponding horizontal period, the P-type thin film transistor 201T in the main pixel 201F that is connected to the scanning line 201V turns to on-state.

Then, the switch to which the signal line 201H1 of the signal line driving circuit 201HV turns to on-state and, as shown in FIG. 11F, the voltage of the signal that is to be displayed on the main pixel in the first row and the first column is supplied to the signal line 201H1.

It is assumed here that the voltage is 5 V. As a result, as shown in FIG. 11G, the voltage of the signal line 201H1 is transferred to the pixel electrode of the main pixel in the first row and the first column via the thin film transistor 201T. The voltage of the pixel electrode for the common electrode is set to +5 V.

Then, a writing operation for the sub-pixel positioned in the first row and the first column is executed. Since the 2-line inversion drive is executed as described above, the voltage of the common electrode 210COM and the storage capacitance line 201CS remains as 0 V, as shown in FIG. 11A.

The same voltage as that of the main pixel is written to the sub-pixel in the normal display mode, so that the voltage of the signal line 201H1 when the scanning line 201V2 turns to low level, as shown in FIG. 11C and FIG. 11F. As a result, as shown in FIG. 11H, the voltage of the pixel electrode for the common electrode is set as 5 V as in the case of the main pixel.

Then, a voltage is also supplied to the main pixel in the second row and the first column in the same manner, and the polarity is inverted here. That is, as shown in FIG. 11A, the voltage of the common electrode changes to 5 V. Then, the voltage of the signal line 201H1 when the scanning line 201V3 turns to low level is 0 V. As a result, the voltage of the pixel electrode for the common electrode is set to −5V.

Further, the sub-pixel in the second row and the first column is driven in the same manner. Image data is written in order in this manner.

(Display Angle Limited Mode)

Next, display operations of the display angle limited mode will be described by referring to FIGS. 12A-12J. FIGS. 12A-12J show examples of display operations in the display angle limited mode performed in the display device, in which: FIG. 12A shows a case where the lateral axis is time and the longitudinal axis is output voltage of a common electrode control circuit to a common electrode and storage capacity line; FIG. 12B shows a case where the lateral axis is time and the longitudinal axis is output voltage to a scanning line that is connected to a main pixel of a display unit positioned in the first row and the first column; FIG. 12C shows a case where the lateral axis is time and the longitudinal axis is output voltage to a scanning line that is connected to a sub-pixel of the display unit positioned in the first row and the first column; FIG. 12D shows a case where the lateral axis is time and the longitudinal axis is output voltage to a scanning line that is connected to a main pixel of a display unit positioned in the second row and the first column; FIG. 12E shows a case where the lateral axis is time and the longitudinal axis is output voltage to a scanning line that is connected to a sub-pixel of the display unit positioned in the second row and the first column; FIG. 12F shows a case where the lateral axis is time and the longitudinal axis is output voltage to a first-row signal line of a signal line driving circuit; FIG. 12G shows a case where the lateral axis is time and the longitudinal axis is voltage of a pixel electrode for a common electrode in the main pixel of the display unit positioned in the first row and the first column; FIG. 12H shows a case where the lateral axis is time and the longitudinal axis is voltage of a pixel electrode for a common electrode in the sub-pixel of the display unit positioned in the first row and the first column; FIG. 12I shows a case where the lateral axis is time and the longitudinal axis is voltage of a pixel electrode for a common electrode in the main pixel of the display unit positioned in the second row and the first column; and FIG. 12J shows a case where the lateral axis is time and the longitudinal axis is voltage of a pixel electrode for a common electrode in the sub-pixel of the display unit positioned in the second row and the first column.

First, a writing operation for the main pixel positioned in the first row and the first column is the same as that of the normal display mode.

Then, a writing operation for the sub-pixel positioned in the first row and the first column is executed, and the voltage of the common electrode 201COM and the storage capacitance line 201CS at this time remains as 0 V, as shown in FIG. 12A.

Further, as shown in FIG. 12C and FIG. 12F, the voltage of the signal line 201H1 when the scanning line 201V2 turns to low level is set to 0 V. That is, there is no change in the voltage of the common electrode 201COM and the storage capacitance line 201CS, while the voltage of the signal line 201H1 changes as in the case where the polarity is inverted.

As a result, the voltage of the pixel electrode for the common electrode is set as 0 V as shown in FIG. 12H. This is the inversion of the voltage of the main pixel. Similarly, as shown in FIG. 12J, the voltage of the sub-pixel positioned in the second row and the first column is the inversion of the voltage of the main pixel positioned in the second row and the first column.

Normally, an inversion circuit for executing polarity inversion operations is built-in to a common electrode control circuit and a signal line driving circuit. When executing line inversion drive, the signal line driving circuit alternately outputs input information and inverted information thereof.

Normally, output of the common electrode control circuit and output of the signal line driving circuit are switched synchronously. In this exemplary embodiment, however, this timing is shifted from each other to utilize the inverting function of the signal line driving circuit so as to generate an inverted image. This makes it possible to achieve the display angle limited mode without preparing a special circuit.

Image data is written in order in this manner. The operations executed for the pixel in the second row and the first column and the pixels thereafter are the same, so that the explanations thereof are omitted.

As described above, it is possible with this exemplary embodiment to achieve the display angle limited mode without preparing a special circuit, while achieving the same operational effects as the case of the first exemplary embodiment. Thus, the circuit scale can be simplified and reduced.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Third Exemplary Embodiment

Figure 13:
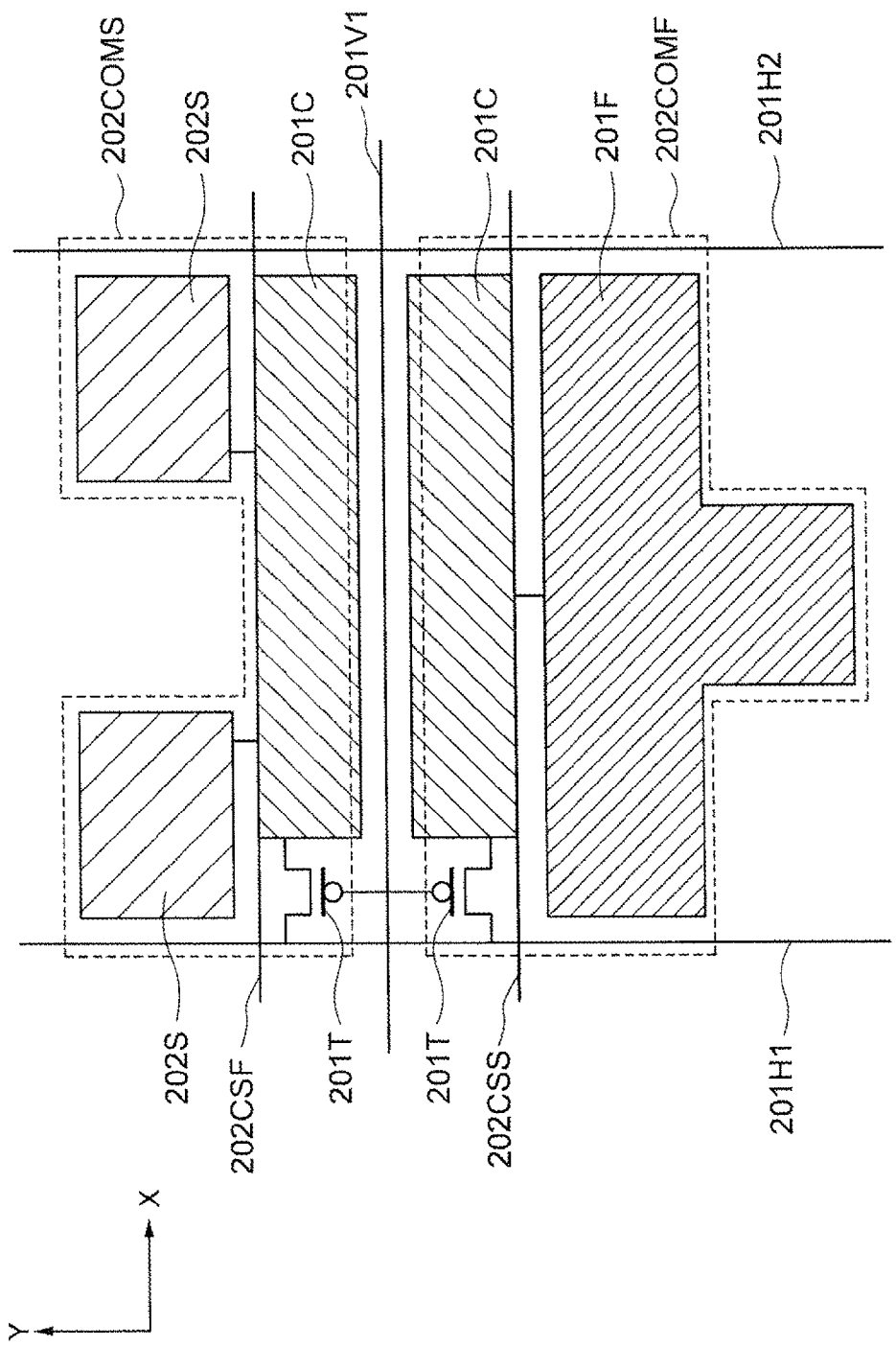
FIG. 13 is a circuit diagram showing an example of an electrically connected relation of the pixels of the display device according to a third exemplary embodiment of the invention.

Next, a third exemplary embodiment of the present invention will be described by referring to FIG. 13. Explanations of the structures that are substantially the same as those of the first exemplary embodiment are omitted, and only different points are described. FIG. 13 is a circuit diagram showing an example of an electrically connected relation of the pixels of the display device according to the third exemplary embodiment of the present invention.

A feature point of the structure of the display device according to the third exemplary embodiment compared to the display device of the above-described first exemplary embodiment is that the thin film transistors of the main pixel and the sub-pixel are connected to a common scanning line and a common signal line.

Specifically, as shown in FIG. 13, it is a feature of the structure of a display device 11 and a display panel 21 according to this exemplary embodiment that thin film transistors 201T of a main pixel 202F and a sub-pixel 202S for configuring each display unit 202U are connected to a common scanning line and a common signal line. That is, the feature point of this exemplary embodiment is the so-called 1G-1D structure in which a single scanning line and a single signal line correspond to each display unit.

Further, the voltage of the common electrode and the voltage of the storage capacitance line are same in each pixel. When generating an inverted image, the potential of the common electrode in the main pixel is inverted from that of the sub-pixel.

This makes it possible to invert the potentials of the pixel electrodes when same data is written to the main pixel and the sub-pixel.

The structure of the display panel will be described in detail by referring to FIG. 13.

The main pixel 202S has the thin film transistor 201T. The gate electrode thereof is connected to the scanning line 201V1, and the drain electrode is connected to the signal line 201H1. Further, the storage capacitance 201C is connected to a storage capacitance line 202CSF.

The common electrode of the main pixel 202F is 202COMF.

Similarly, the sub-pixel 202S has the thin film transistor 201T. The gate electrode thereof is connected to the scanning line 201V1, and the drain electrode is connected to the signal line 201H1. Further, the storage capacitance 201C is connected to a storage capacitance line 202CSS.

Note here that the common electrode of the sub-pixel 202S is 202COMS. In this manner, the main pixel 202F and the sub-pixel 202S in each display unit are connected to the same scanning line and the same signal line, while the storage capacitances are connected to different storage capacitance lines.

Further, the common electrodes are also different. This exemplary embodiment employs the 1G-1D structure, so that the scanning line 201V1 is disposed between the main pixel 202F and the sub-pixel 202S. The structures of this exemplary embodiment other than those described above are the same as those of the above-described first exemplary embodiment.
(Regarding Display Panel Driving Control Method)

Figure 14:
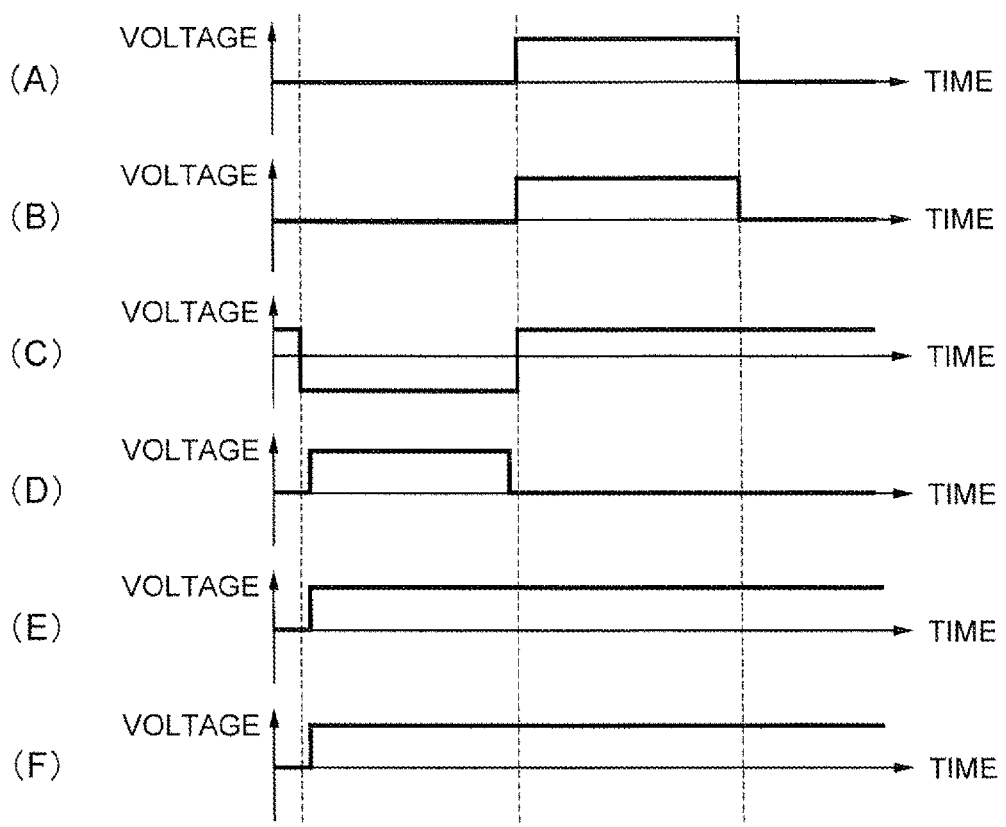
Figure 15:
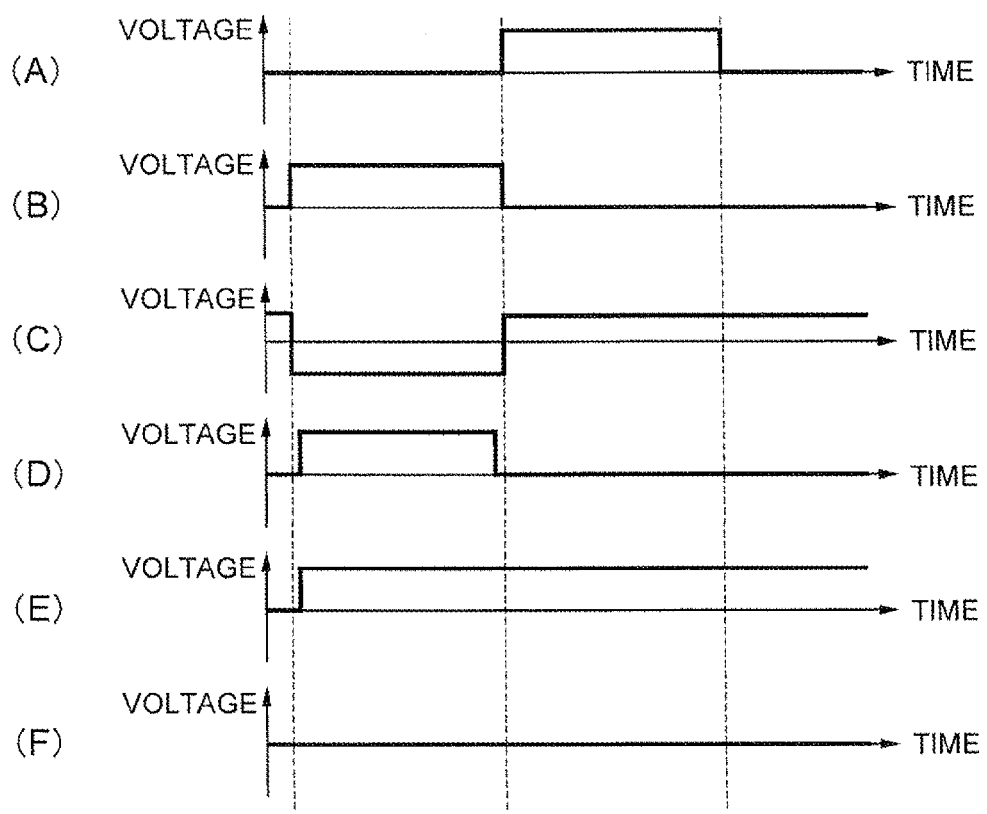

Next, each processing of the display device having the structures described above can also be achieved as a method. Procedures of various kinds of processing as the display panel driving control method will be described by referring to FIG. 14 and FIG. 15.

The display panel driving control method according to this exemplary embodiment is targeted at a display panel in which a plurality of display units each containing a main pixel for displaying a first image and a sub-pixel for displaying a second image are arranged in matrix in a first direction and a second direction that crosses with the first direction.

The display unit may have a first display area in which the main pixel and the sub-pixel are formed in the second direction, and a second display area in which only the main pixel is formed in the second direction.

Further, the display unit can contain: a main pixel electrode that configures the main pixel; a sub-pixel electrode that configures the sub-pixel; a first common electrode that corresponds to the main pixel electrode; a second common electrode that corresponds to the sub-pixel electrode; a first switching element for transmitting video signals to the main pixel electrode; a second switching element for transmitting video signals to the sub-pixel electrode; a scanning line for controlling the first switching element and the second switching element; and a signal line for supplying the video signals.

As the basic structure, this display panel driving control method performs drive control to invert the polarity of the first common electrode of the main pixel and the polarity of the second common electrode of the sub-pixel so as to display the first image and the second image in the first display area and display the first image in the second display area, while displaying the second image whose gradation is inverted from that of the first image on the sub-pixel.

More detailed operations of the display device will be described hereinafter.

FIGS. 14A-14F are timing charts showing examples of display operations in a normal display mode performed in the display device according to this exemplary embodiment, in which: FIG. 14A shows a case where the lateral axis is time and the longitudinal axis is output voltage of a common electrode control circuit to a common electrode and storage capacity line of the main pixel; FIG. 14B shows a case where the lateral axis is time and the longitudinal axis is output voltage of a common electrode control circuit to a common electrode and storage capacity line of a sub-pixel; FIG. 14C shows a case where the lateral axis is time and the longitudinal axis is output voltage to a scanning line that is connected to a main pixel of a display unit positioned in the first row and the first column; FIG. 14D shows a case where the lateral axis is time and the longitudinal axis is output voltage to a signal line that is connected to a main pixel of a display unit positioned in the first row and the first column; FIG. 14E shows a case where the lateral axis is time and the longitudinal axis is voltage of a pixel electrode for a common electrode in the main pixel of the display unit positioned in the first row and the first column; and FIG. 14F shows a case where the lateral axis is time and the longitudinal axis is voltage of a pixel electrode for a common electrode in the sub-pixel of the display unit positioned in the first row and the first column.

Similarly, FIGS. 15A-15F are timing charts showing examples of display operations in a display angle limited mode performed in the display device according to this exemplary embodiment of the present invention, in which: FIG. 15A shows a case where the lateral axis is time and the longitudinal axis is output voltage of a common electrode control circuit to a common electrode and storage capacity line of a main pixel; FIG. 15B shows a case where the lateral axis is time and the longitudinal axis is output voltage of a common electrode control circuit to a common electrode and storage capacity line of a sub-pixel; FIG. 15C shows a case where the lateral axis is time and the longitudinal axis is output voltage to a scanning line that is connected to a main pixel of a display unit positioned in the first row and the first column; FIG. 15D shows a case where the lateral axis is time and the longitudinal axis is output voltage to a signal line that is connected to a main pixel of a display unit positioned in the first row and the first column; FIG. 15E shows a case where the lateral axis is time and the longitudinal axis is voltage of a pixel electrode for a common electrode in the main pixel of the display unit positioned in the first row and the first column; and FIG. 15F shows a case where the lateral axis is time and the longitudinal axis is voltage of a pixel electrode for a common electrode in the sub-pixel of the display unit positioned in the first row and the first column.

As described above, there are two different-system common electrodes for the main pixel and the sub-pixel. In the normal display mode, a same voltage is applied for the two-system common electrodes. Meanwhile, in the display angle limited mode, voltages inverted from each other are applied for the two-system common electrodes. This operation for the common electrodes is the feature point of this exemplary embodiment. This exemplary embodiment employs line inversion drive.

First, a display operation of the normal display mode will be described by referring to FIGS. 14A-14F, and a writing operation for the main pixel positioned in the first row and the first column will be described here.

As shown in FIG. 14A, the voltage supplied to the common electrode 202COMF and the storage capacity line 202CSF of the main pixel 202F is 0 V.

Similarly, as shown in FIG. 14B, the voltage supplied to the common electrode 202COMS and the storage capacity line 202CSS of the sub-pixel 202S is also 0 V.

As shown in FIG. 14C, when the scanning line 201V1 turns to low level in a corresponding horizontal period, the P-type thin film transistor 201T in the main pixel 202F that is connected to the scanning line 201V turns to on-state. Further, the P-type thin film transistor 201T in the sub-pixel 202S turns to on-state as well.

Then, the switch to which the signal line 201H1 of the signal line driving circuit 201HV turns to on-state, and the signal voltage for the display unit in the first row and the first column is supplied to the signal line 201H1.

It is assumed here that the voltage is 5 V. As a result, the voltage of the signal line 201H1 is transferred to the pixel electrode of the main pixel via the thin film transistor 201T. As shown in FIG. 14E, the voltage of the pixel electrode for the common electrode is set to +5 V. Similarly, the voltage of the pixel electrode for the common electrode is set to +5 V as shown in FIG. 14F.

In this manner, the same voltage is written to the main pixel and the sub-pixel of each display unit, and normal display can be achieved.

Next, a display operation of the display angle limited mode will be described by referring to FIGS. 15A-15F. When a writing operation for the display unit positioned in the first row and the first column is executed, the voltage supplied to the common electrode 202COMF and the storage capacity line 202CSF of the main pixel 202F is 0 V, as shown in FIG. 15A.

Further, as shown in FIG. 15B, the voltage supplied to the common electrode 202COMS and the storage capacitance 202CSS of the sub-pixel 202S is 5 V. That is, provided that the voltage supplied to the common electrode and the storage capacitance line is either 0 V or 5 V, different voltages are used for the main pixel and the sub-pixel in the display angle limited mode.

As shown in FIG. 15C, when the scanning line 201V1 turns to low level in a corresponding horizontal period, the thin film transistors 201T both in the main pixel 202F and in the sub-pixel 202S turn to on-state.

Further, as shown in FIG. 15D, the voltage of the signal line 201H1 is transferred to the pixel electrodes of each pixel. It is assumed here that this voltage is 5 V.

With this, as shown in FIG. 15E, the voltage of the pixel electrode for the common electrode in the main pixel is set as +5 V. Further, as shown in FIG. 15F, the voltage of the pixel electrode for the common electrode in the sub-pixel is set as 0V. In this manner, the inversion operation is executed.

As described above, it is possible with the third exemplary embodiment to achieve the same operational effects as those of the first exemplary embodiment, without having any special circuit for inverting image information as in the case of the above-described second exemplary embodiment.

Further, it is possible to change the normal display mode to the display angle limited mode by a simple operation such as inverting the common electrode.

Furthermore, compared to the first and the second exemplary embodiments described above, each of the display units can be controlled by a pair of scanning line/signal line.

This makes it possible to reduce the number of scanning lines so that the writing time in each scanning line can be secured. Moreover, this is also effective when increasing the number of display units. The operations and effects of the third exemplary embodiment other than those described above are the same as those of the above-described first exemplary embodiment.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Fourth Exemplary Embodiment

Figure 16:
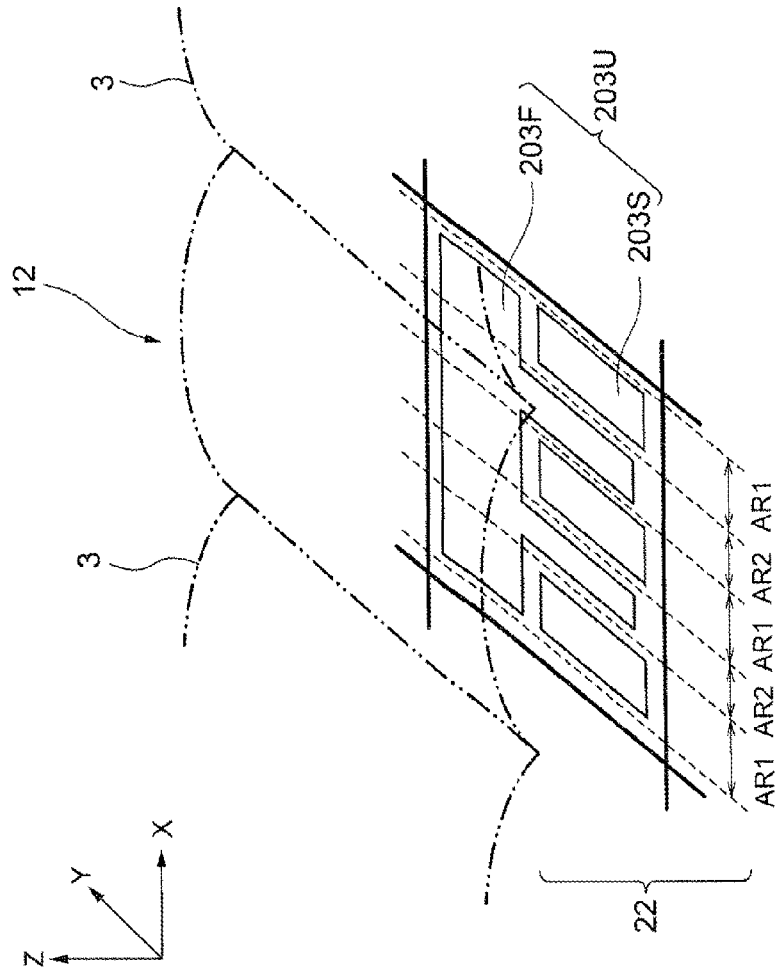
FIG. 16 is a perspective view showing an example of a schematic structure of a display device according to a fourth exemplary embodiment of the invention.
Figure 17:
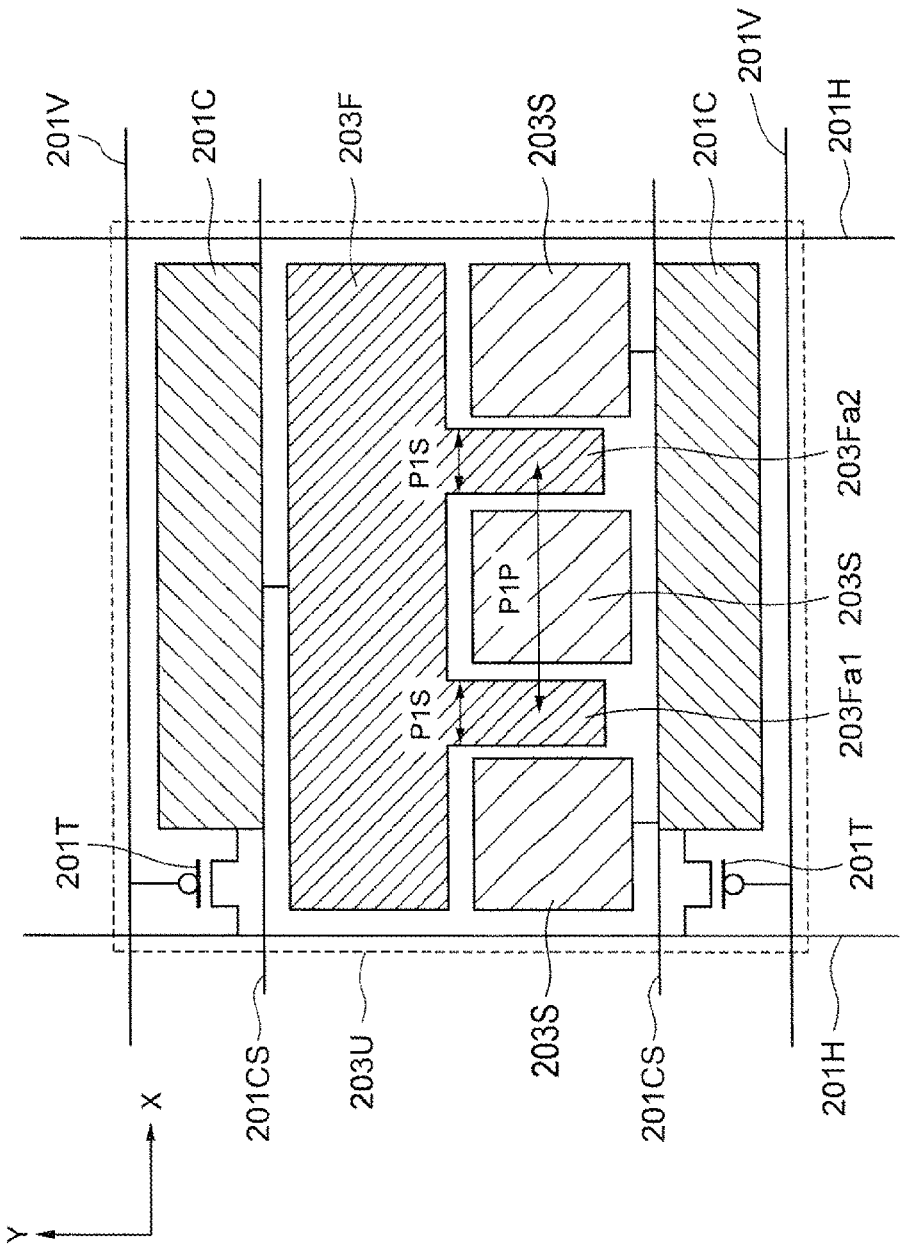
FIG. 17 is a perspective view showing an example of a pixel structure of the display device according to the fourth exemplary embodiment of the invention.

Next, a fourth exemplary embodiment of the present invention will be described by referring to FIG. 16 and FIG. 17. Explanations of the structures that are substantially the same as those of the first exemplary embodiment are omitted, and only different points are described. FIG. 16 is a perspective view showing an example of a schematic structure of a display device according to the fourth exemplary embodiment of the present invention. FIG. 17 is a perspective view showing an example of a pixel structure of the display device according to the fourth exemplary embodiment of the present invention.

The main pixel is structured in substantially a flat T-letter shape in the above-described first exemplary embodiment. However, the main pixel is structured in substantially a flat "Π" shape in the fourth exemplary embodiment.

Specifically, as shown in FIG. 16 and FIG. 17, a display device 12 and a display panel 22 according to the fourth exemplary embodiment use a main pixel 203F and a sub-pixel 203F in a display unit 203U, unlike the case of the display device 1 and the display panel 2 according to the first exemplary embodiment.

That is, the main pixel 203F has a display area formed by disposing two T-letter shaped display areas side by side along the X-axis direction. In the present invention, this shape formed by two T-letter shapes is called "Π" shape. A rectangular-shaped display area of the sub-pixel 203F is disposed respectively on both sides of the two longitudinal-bar parts of the "Π" shaped display area.

That is, the display area of the sub-pixel 203S is formed with three rectangular areas. While the display area is optically separated into three areas, those are connected electrically so that same signals are transmitted thereto.

As described above, a first feature point of the fourth exemplary embodiment is the pixel structure which has a combination of the "Π" shaped display area and the rectangular display areas. This pixel structure makes it easier to make a combination with the lens.

The display unit 203U can be sectioned into a first display area AR1 in which the main pixel 203F and the sub-pixel 203S are formed in the second direction and into a second display area AR2 in which only the main pixel 203F is formed in the second direction.

Further, it is possible with this pixel structure to ease the lens condition, when setting the lens condition in such a manner that an image is formed for the front-face direction and the separating performance is deteriorated for the oblique directions. As described, a second feature point of the fourth exemplary embodiment is the lens condition when using the lens by combining it with the "Π" shaped display area. Therefore, this lens condition will be described in detail.

As shown in FIG. 17, it is so defined that the width of the longitudinal-bar part of the "Π" shaped display area is P1S and the pitch of the longitudinal-bar part is P1P. As described above, the lateral magnification of the cylindrical lens can be expressed as "e/P" by using the pixel pitch P and the cycle e of the enlarged projection images of the display units at the optimum observing distance OD.

With this, the width of the enlarged projection image of the longitudinal-bar part of the "Π" shaped display area on the observing plane becomes "P1S×e/P". Similarly, the pitch of the enlarged projection image of the longitudinal-bar part of the "Π" shaped display area on the observing plane becomes "P1P×e/P".

Further, in this exemplary embodiment, the pitch of the enlarged projection image of the longitudinal-bar part is set as the distance between the both eyes of the observer. This makes it possible to project the enlarged projection image of the longitudinal-bar parts of the "Π" shaped display area by being set for the both eyes of the observer.

However, the distance between both eyes varies for each individual. It is possible to deal with the individual differences of the distances between both eyes by giving a margin to the width of the enlarged projection image of the longitudinal-bar part.

For example, by setting the enlarged projection image pitch "P1P×e/P" of the longitudinal-bar part as 65 mm and setting the enlarged projection image width "P1S×e/P" of the longitudinal-bar part as 16 mm, it becomes possible to deal with the distance of 39 mm-81 mm between both eyes.

As described, it is preferable for the width P1S of the longitudinal-bar part to be larger for corresponding to the individual differences of the distances between both eyes. However, in order to prevent peeping attempts from the oblique direction effectively, it is necessary that the image of the longitudinal-bar part of the "Π" shaped display area in the side robe does not exist by itself. Depending on this condition, the optical condition of the lens is determined.

Figure 18:
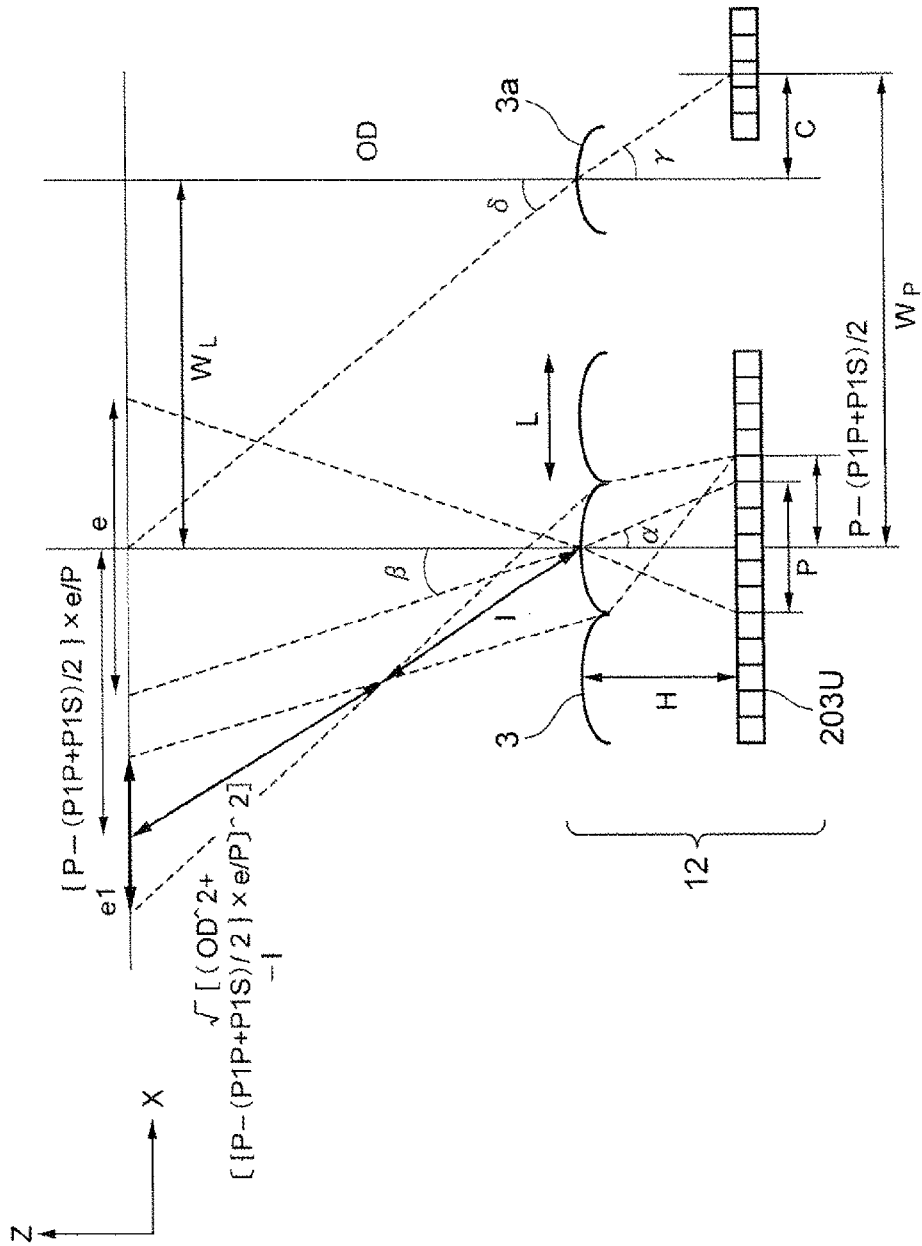
FIG. 18 is an explanatory diagram for showing an optical structure of the display device according to the fourth exemplary embodiment of the invention.

FIG. 18 is an explanatory diagram for showing an optical structure of the display device according to the fourth exemplary embodiment of the present invention. As shown in FIG. 18, the lens positioned in the vicinity of the center of the display area and the pixels that emit light to be the side robes for this lens will be considered.

That is, considered is the pixel (called side-robe pixel) neighboring in the X-axis direction to the pixel (called a main-robe pixel herein) which emits light as the main robe by corresponding to the lens.

In this side-robe pixel, the end part of the main-robe side pixel in the longitudinal-bar part positioned on the main-robe pixel side of the "Π" shaped display area is away from the center of the main-robe pixel by "P−(P1P+P1S)/2".

Therefore, the end part of the image of the longitudinal-bar part on the observing plane is to be away from the center of the image of the main-robe pixel by "P−(P1P+P1S)/2)×e/P".

The image point distance I of the light emitted from the center of the longitudinal-bar part can be obtained from following Expression 18.

$$I = 1/(n/(H^2+(P-(P1P+P1S)/2)^2)^{0.5}-(n-1)/r) \quad \text{(Expression 18)}$$

The light converged once at the position of the image point reaches the observing plane while being spread this time. As shown in FIG. 18, the light emitted from the cylindrical lens, which forms an image at the position of the image point and travels towards the observing plane, forms triangles that are in a similarity relation before and after the image point. That is, one of the triangles is formed before the light reaches the image point, and it is a triangle having the pitch of the cylindrical lens as the base and having the distance between the middle point of the base and the image point as the image point distance I.

Further, the other triangle is formed after reaching the image point, and it is a triangle having the spread width on the observing plane as the base and having the distance between the middle point of the base and the image point as "√(OD^2+((P−(P1P+P1S)/2)×e/P)^2)−I".

The value of the coordinate of the center point of the base in the X-axis direction is "(P−(P1P+P1S)/2)×e/P".

Since the two triangles are in a similarity relation, following Expression 19 applies. Further, by solving Expression 19 for "e1", following Expression 20 can be obtained.

$$L:I = e1:(OD^2+((P-(P1P+P1S)/2)\times e/P)^2)^{0.5}-I \quad \text{(Expression 19)}$$

$$e1 = (L/I)\times((OD^2+((P-(P1P+P1S)/2)\times e/P)^2)^{0.5}-I) \quad \text{(Expression 20)}$$

While the spread width e1 of the light passed through the image point on the observing plane basically depends on the lens condition, it is preferable for the spread width e1 to be set as equal to or more than the width "P1S×e/P" of the enlarged projection image of the width P1S in the front-face direction at the optimum observing distance OD. This is the condition where the image of the width P1S in the side robe is not observed by being separated.

Therefore, it is necessary that following Expression 21 applies.

$$P1S\times e/P \leq (L/I)\times((OD^2+((P-(P1P+P1S)/2)\times e/P)^2)^{0.5}-I) \quad \text{(Expression 21)}$$

As an example for satisfying those conditions, when the pitch P of the display units in the X-axis direction is 0.174 mm, the optimum observing distance OD is 380 mm, the refractive index n of the lenticular lens is 1.53, the number m of the display units is 120, the radius curvature of the cylindrical lens that configures the lenticular lens is 0.116 mm, the lens pitch is 0.1739 mm, the distance H between the principal point of the cylindrical lens and the pixel is 0.332 mm, the width P1S of the enlarged projection image of the longitudinal-bar part of the "Π" shaped display area is 0.017 mm, and the pitch P1P of the longitudinal-bar part is 0.071 mm, the width "P1S×e/P" of the enlarged projection image of the longitudinal-bar part becomes 16 mm, the pitch "P1P×e/P" of the enlarged projection image of the longitudinal-bar part becomes 65 mm, and the cycle e of the projection image of the display unit becomes 160 mm.

Further, the image point distance I becomes 3.4 mm, and the spread width e1 when the light from the longitudinal-bar part is projected on the observing plane as the side robe is calculated as 20 mm.

This is larger than the width "P1S×e/P", 16 mm, which is the enlarged projection image of the longitudinal-bar part projected on the observing plane as the main robe.

With this, it is guaranteed that the longitudinal-bar part is not observed by itself from the oblique directions. That is, the image of the main pixel is not observed by itself from the oblique directions, so that it is possible to limit the display angle range.

As described above, a second feature point of this exemplary embodiment is the lens condition, and it is so set that an image of the longitudinal-bar parts of the "Π" shaped display area is formed for the front-face direction, while the image is not formed for the oblique directions so that the main pixel is not observed by itself from the oblique directions. The structures of the fourth exemplary embodiment other than those described above are the same as those of the above-described first exemplary embodiment.

The operations and effects of the normal display mode with the fourth exemplary embodiment are the same as those of the above-described first exemplary embodiment.

In the display angle limited mode, it is so structured that the images of the longitudinal-bar parts of the "Π" shaped display area of the main pixel are set for both eyes of the user located in the front-face direction.

With this, the user in the front-face direction can separately observe only the image of the main pixel. The main pixel and the sub-pixel are observed in a mixed manner from the places other than the positions of the both eyes of the user, so that the displayed information cannot be visually recognized.

In this manner, the display angle range can be limited.

As described above, it is possible with the fourth exemplary embodiment to display the information by corresponding to the positions of the both eyes of the user, while achieving the same operational effects as those of the first exemplary embodiment. Therefore, peeping attempts can be prevented in a more complete manner compared to the case of the first exemplary embodiment.

This is because the range where the main pixel can be observed is 75 mm in the first exemplary embodiment, whereas it is set as the value of 2×16 mm in the fourth exemplary embodiment. That is, the range where the main image can be visually recognized is set to be equal to or less than half, so that the probability of having peeping attempts can be decreased.

Further, in this exemplary embodiment, the area where the main image can be observed is set in accordance with the left and right eyes of the observer, and there is a margin given to the width of the area. This makes it possible to correspond to the differences of the distances between both eyes for each individual. Therefore, it is possible to improve the visibility, while decreasing the probability of having the peeping attempts. The operations and effects of the fourth exemplary embodiment other than those described above are the same as those of the above-described first exemplary embodiment.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Fifth Exemplary Embodiment

Figure 19:
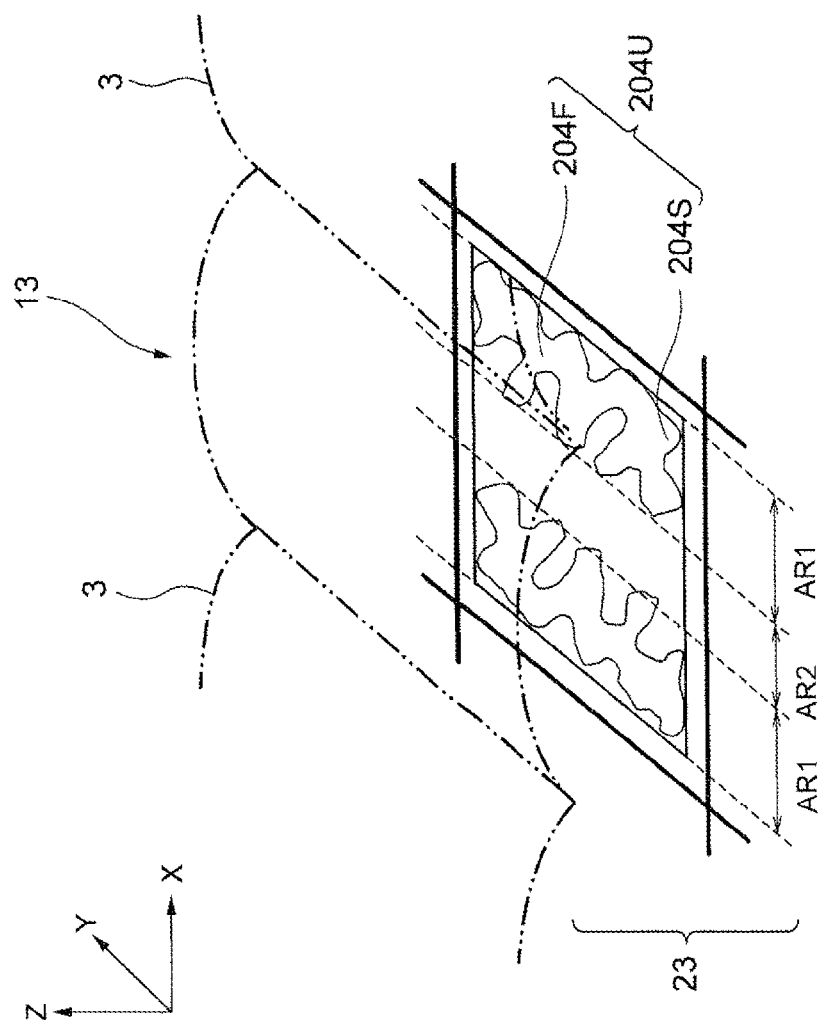
FIG. 19 is a perspective view showing an example of a schematic structure of a display device according to a fifth exemplary embodiment of the invention.
Figure 20:
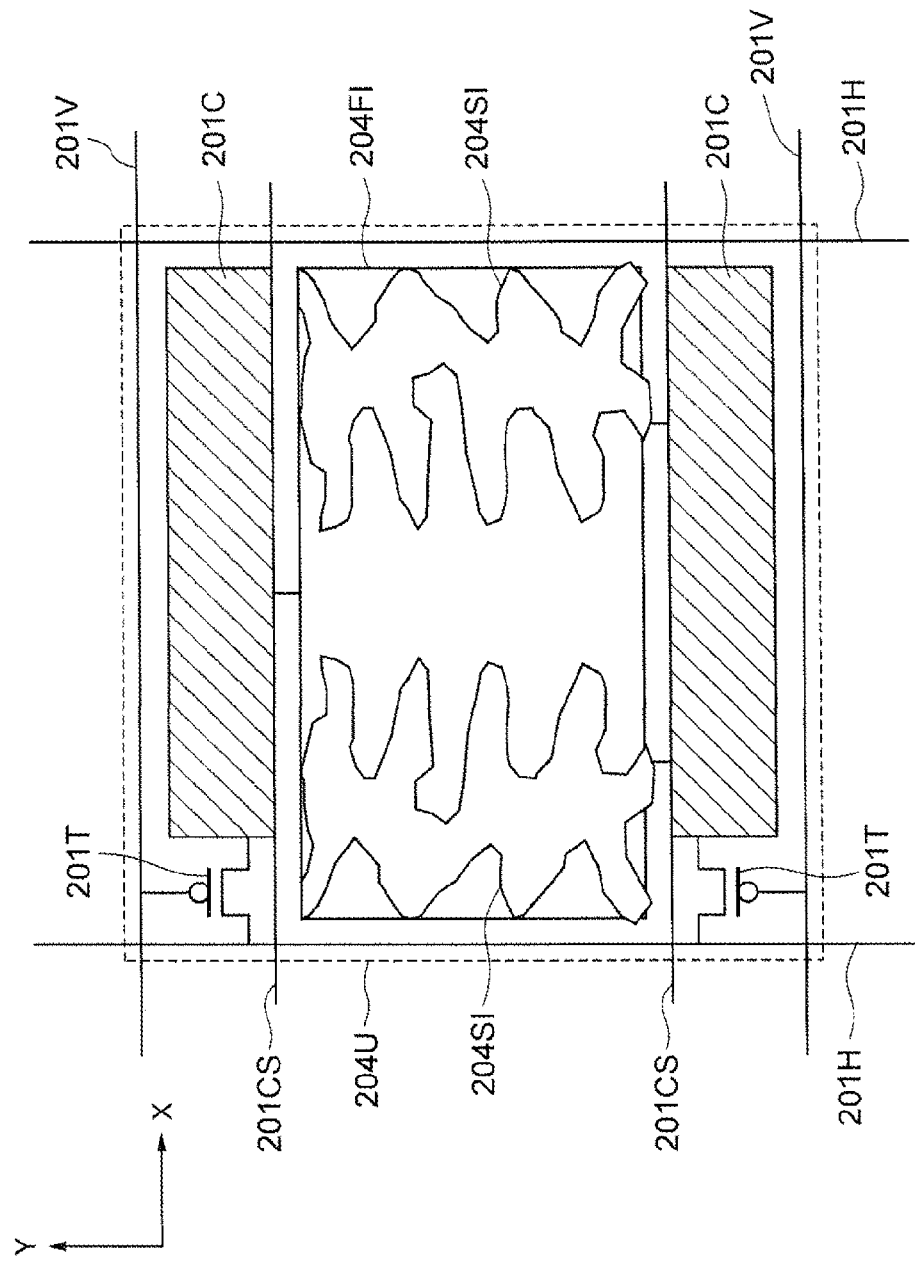
FIG. 20 is a perspective view showing an example of a pixel structure of the display device according to the fifth exemplary embodiment of the invention.

Next, a fifth exemplary embodiment of the present invention will be described by referring to FIG. 19 and FIG. 20. Explanations of the structures that are substantially the same as those of the first exemplary embodiment are omitted, and only different points are described. FIG. 19 is a perspective view showing an example of a schematic structure of a display device according to the fifth exemplary embodiment of the present invention. FIG. 20 is a perspective view showing an example of a pixel structure of the display device according to the fifth exemplary embodiment of the present invention.

(Structure of Display Device)

This exemplary embodiment employs a structure in which the main pixel and the sub-pixel overlap with each other partially.

Specifically, as shown in FIG. 19 and FIG. 20, a display device 13 and a display panel 23 according to the fifth exemplary embodiment use a main pixel 204F and a sub-pixel 204F in a display unit 204U, unlike the case of the display device 1 and the display panel 2 according to the first exemplary embodiment.

The main pixel 204F has a main-pixel electrode 204FI that covers the entire face of the display unit. For example, when the display unit is in a rectangular shape, the main-pixel electrode 204FI is also formed in a rectangular shape.

Further, the sub-pixel 204S has a sub-pixel electrode 204SI that is formed with a great number of worm bores, i.e., formed in a wormhole figure.

The sub-pixel electrode 204SI is stacked on the main-pixel electrode via an insulating layer. There is an area with no sub-pixel electrode 204SI formed in the vicinity of the center in the X-axis direction of the display unit.

The width of this area in the X-axis direction is P1, and it is set to be the same width as that of the longitudinal-bar part of the T-letter shaped display area of the main pixel 201F of the first exemplary embodiment described above.

That is, the sub-pixel electrode 204SI formed in a wormhole figure is sectioned into two with a space P1 provided in the X-axis direction.

The wormholes are so provided in each of the sectioned part that there is no electrical disconnection occurred.

As described, a feature point of the fifth exemplary embodiment is the pixel structure. In this structure, the main pixel from which the longitudinal-bar part is eliminated and the rectangular part of the sub-pixel of the first exemplary embodiment are mixed in a fine manner. This makes it easy to correspond to high definition.

It is the wormhole-type electrode of the sub-pixel that makes it possible to achieve the mixture. Further, by stacking each pixel electrode, mixed layout of each of the pixel electrodes can be easily achieved. If the pixel electrodes are not stacked, the shapes of the both pixel electrodes need to be formed in complicated shapes, which requires highly precise alignment. Further, it is necessary to separate each of the pixel electrodes electrically. Thus, there are many issues in such case. Other structures of this exemplary embodiment are the same as those of the first exemplary embodiment described above.

The display unit 204U can be sectioned into a first display area AR1 in which the main pixel 204F and the sub-pixel 204S are formed in the second direction and into a second display area AR2 in which only the main pixel 204F is formed in the second direction.

(Regarding Display Panel Driving Control Method)

Figure 21:
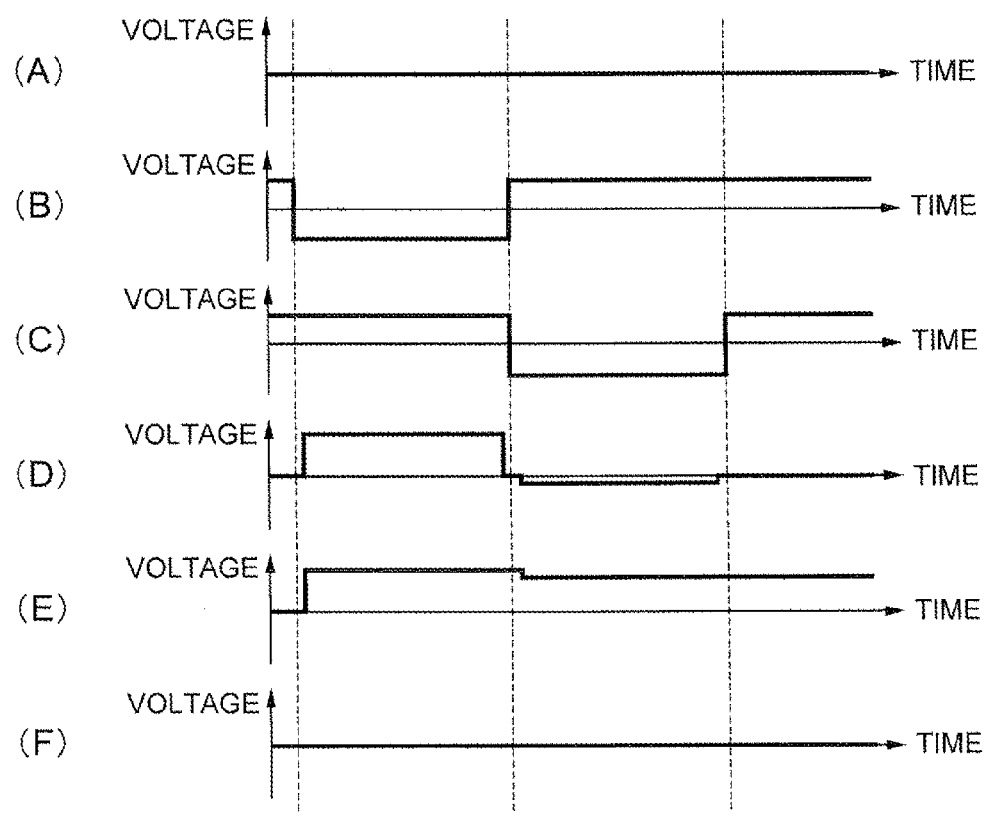

Next, each processing of the display device having the structures described above can also be achieved as a method. Procedures of various kinds of processing as the display panel driving control method will be described by referring to FIG. 21.

The display panel driving control method according to this exemplary embodiment is targeted at a display panel in which a plurality of display units each containing a main pixel for displaying a first image and a sub-pixel for displaying a second image are arranged in matrix in a first direction and a second direction that crosses with the first direction.

The display unit may have a first display area in which the main pixel and the sub-pixel are formed in the second direction, and a second display area in which only the main pixel is formed in the second direction.

Further, the display unit may have a structure in which the pixel electrode of the main pixel and the pixel electrode of the sub-pixel are stacked at least partially.

As the basic structure, this display panel driving control method performs drive control to invert the polarity of each pixel so that the main pixel and the sub-pixel come to have different polarities so as to display the first image and the second image in the first display area and to display the first image in the second display area.

Hereinafter, more detailed operations of the display device, i.e., the display device driving control method of this exemplary embodiment, will be described.

In this exemplary embodiment, the display device is driven in such a manner that the polarities of the main pixel and the sub-pixel configuring the display unit become different. Further, the display device is driven in such a manner that the polarities of the main pixels in the neighboring display units become different, and the polarities of the sub-pixels thereof also become different. That is, this exemplary embodiment executes dot inversion drive in the whole pixels, i.e., in all the main pixels and the sub-pixels.

This exemplary embodiment executes the drive in such a manner that the polarities of the pixels configuring each display unit become different so as to correct coupling between the pixel electrode of the main pixel and the pixel electrode of the sub-pixel, which are disposed by being stacked.

FIGS. 21A-21F are timing charts showing examples of display operations in a display angle limited mode performed in the display device according to the fifth exemplary embodiment of the present invention, in which: FIG. 21A shows a case where the lateral axis is time and the longitudinal axis is output voltage of a common electrode control circuit to a common electrode and storage capacity line; FIG. 21B shows a case where the lateral axis is time and the longitudinal axis is output voltage to a scanning line that is connected to a main pixel of a display unit positioned in the first row and the first column; FIG. 21C shows a case where the lateral axis is time and the longitudinal axis is output voltage to a scanning line that is connected to a sub-pixel of the display unit positioned in the first row and the first column; FIG. 21D shows a case where the lateral axis is time and the longitudinal axis is output voltage to a first-row signal line of a signal line driving circuit; FIG. 21E shows a case where the lateral axis is time and the longitudinal axis is voltage of a pixel electrode for a common electrode in the main pixel of the display unit positioned in the first row and the first column; and FIG. 21F shows a case where the lateral axis is time and the longitudinal axis is voltage of a pixel electrode for a common electrode in the sub-pixel of the display unit positioned in the first row and the first column.

This exemplary embodiment employs the dot inversion drive, so that the voltage supplied to the common electrode and the storage capacitance line of the common electrode control circuit remains as a specific DC voltage. In this case, it is fixed to 0 V.

First, a writing operation for the main pixel positioned in the first row and the first column will be described. As shown in FIG. 21B, when the scanning line 201V1 in the first row turns to low level in a corresponding horizontal period, the voltage of the signal line 201H1 is written to the main pixel 204F that is connected to the scanning line 201V1. As shown in FIG. 21D, the voltage of the signal line 201H1 is set as 5.5 V. As a result, as shown in FIG. 21E, the voltage of the signal line 201H1 is transferred to the pixel electrode of the main pixel in the first row and the first column, so that the voltage of the pixel electrode for the common electrode is set to +5.5 V.

Next, a writing operation for the sub-pixel positioned in the first row and the first column will be described. As shown in FIG. 21C, when the scanning line 201V2 in the second row turns to low level in a corresponding horizontal period, the voltage of the signal line 201H1 is written to the sub-pixel 204S that is connected to the scanning line 201V2. As shown in FIG. 21D, the voltage of the signal line 201H1 is set as −0.5 V. The polarity of the voltage that is supplied to the sub-pixel is inverted from the voltage that is supplied to the main pixel, since the polarities are driven by the dot inversion. Then, as shown in FIG. 21F, the voltage of the signal line 201H1 is transferred to the pixel electrode of the sub-pixel in the first row and the first column, so that the voltage of the pixel electrode for the common electrode is to be set to −0.5 V.

However, note here that there is capacitance coupling between the main-pixel electrode 204FI and the sub-pixel electrode 204SI. That is, each electrode works as a capacitor with an insulating layer interposed therebetween. Thus, the voltage of the pixel electrode for the common electrode in the main pixel 204F is decreased to 5 V, and the voltage of the pixel electrode for the common electrode in the sub-pixel 204S is boosted up to 0 V. That is, the driving control method of this exemplary embodiment can execute drives with proper voltages by supplying the driving voltage while considering the coupling of each pixel in advance.

Such changes in the voltage can be done by changing the reference voltage used in circuits such as a DA converter of the signal driving circuit. A conversion map and the like may be used as well.

This exemplary embodiment drives the display device in such a manner that the polarities of the pixels configuring each display unit become different. Thereby, it is possible to deal with a case where 0 V needs to be applied between the pixel electrode and the common electrode. For example, when the display device is driven in such a manner that the pixels come to be in a same polarity, the coupling therebetween cannot be compensated. Particularly, when a normally-black mode is used, black display becomes whitened if 0 V cannot be applied. This results in deteriorating the contrast. That is, with the exemplary embodiment, the use of the above-described driving method can improve the display quality.

As described above, it is possible with this exemplary embodiment to improve the image quality in particular when the pitch of the display units is large and the resolution of the display panel is low, while achieving the same operational effects as those of the first exemplary embodiment. When the resolution is low, the separated layout becomes conspicuous when the main pixel and the sub-pixel within each display unit are separately disposed as depicted in the first exemplary embodiment. Through forming the sub-pixels in fine shapes and stacking those on the main pixels as in this exemplary embodiment, it becomes easy to correspond to high definition, thereby making it possible to improve the image quality.

Further, in this exemplary embodiment, only the sub-pixel has the pixel electrode formed in a wormhole figure, and this pixel electrode is disposed on the liquid crystal layer side. As described above, this makes it possible to manufacture the display device more easily than the case of applying wormhole processing to both pixels, and to provide a high image quality. Further, only the pixel electrode formed afterwards may need to be processed to a complicated shape, which is easier than the case of processing the pixel electrode formed first to a complicated shape.

Furthermore, while the driving control method according to this exemplary embodiment is not an essential structural element, the display quality can be improved by employing it to the structure of this exemplary embodiment.

Further, the driving control method of this exemplary embodiment can be applied not only to the case where the pixel electrodes are formed in the wormhole figure but also to the case where the pixel electrodes of the main pixel and the sub-pixel are stacked, and the above-describe effects can be achieved as well.

For example, the driving control method of this exemplary embodiment can be applied to the first exemplary embodiment and the fourth exemplary embodiment described above. The operations and effects of the fifth exemplary embodiment other than those described above are the same as those of the first exemplary embodiment described above.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Sixth Exemplary Embodiment

Figure 22:
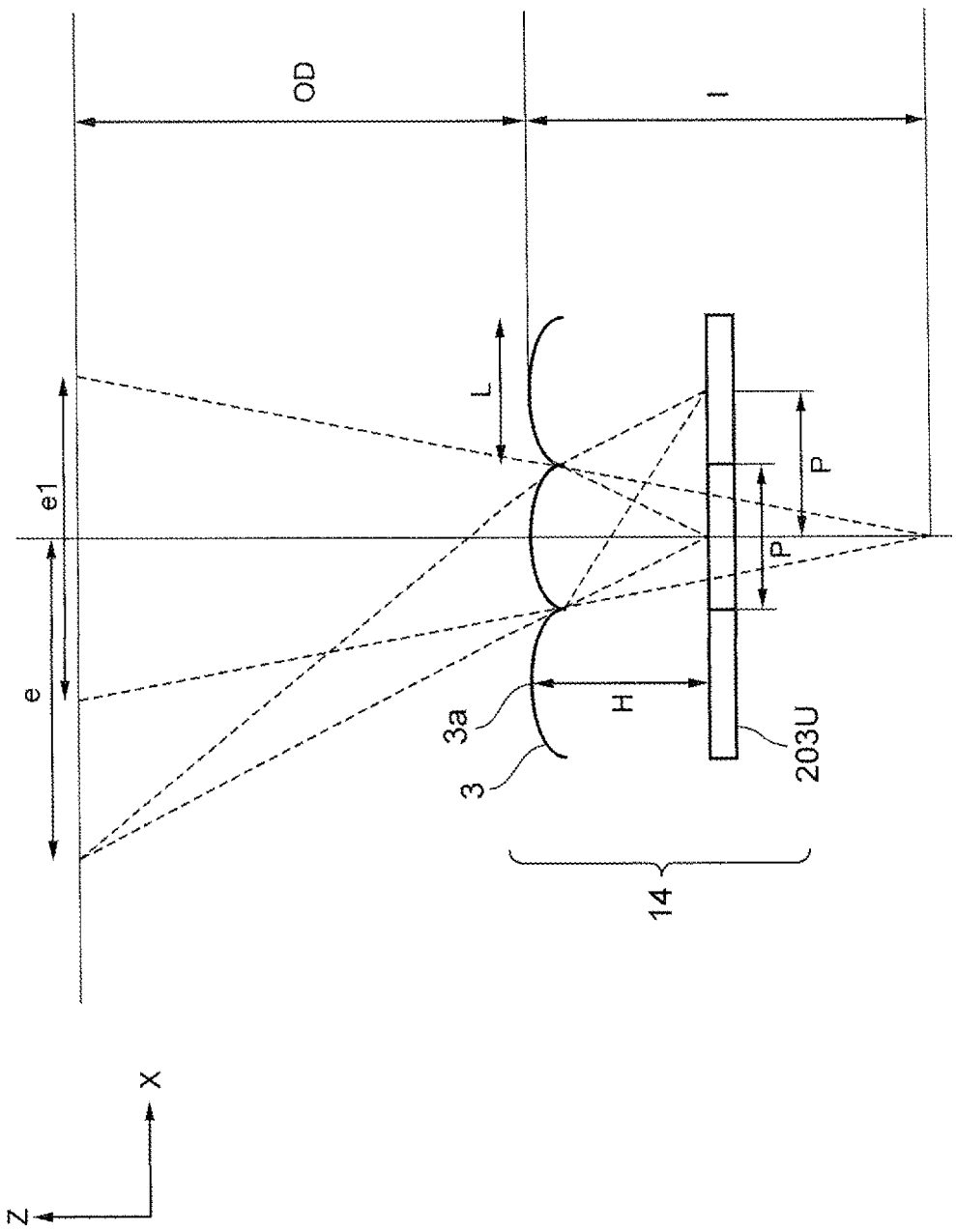
FIG. 22 is an explanatory diagram for showing an optical structure of a display device according to a sixth exemplary embodiment of the invention.

Next, a sixth exemplary embodiment of the present invention will be described by referring to FIG. 22. Explanations of the structures that are substantially the same as those of the first exemplary embodiment are omitted, and only different points are described. FIG. 22 is an explanatory diagram for showing an optical structure of the display device according to the sixth exemplary embodiment of the present invention.

With the first exemplary embodiment, the light from the main pixel can be separated and visually recognized only in the vicinity of the front-face direction in the display angle limited mode. However, it is a feature point of the sixth exemplary embodiment that this direction is set not as the vicinity of the front-face direction but as the oblique direction.

That is, this exemplary embodiment is so designed that the observer located in the vicinity of the front-face direction cannot visually recognize information that needs to be kept confidential, while the user located in the oblique direction can visually recognize the confidential information.

Specifically, structure of a display panel in a display device 14 according to this exemplary embodiment is the same as that of the above-described first exemplary embodiment, and only the condition of the cylindrical lenses that configure the lenticular lens is different. Therefore, the lens condition will be described by referring to FIG. 22.

In the above-described first exemplary embodiment, the lens condition is so defined that the light is focused in the main robe and defocused in the side robe. However, in the sixth exemplary embodiment, the lens condition is so defined that the light is focused in the side robe and defocused in the main robe so that the confidential information is visually recognized from the oblique directions.

In order for the light to focus in the side robe, it is necessary to make the distance "√(H^2+P^2)" between the vertex of the lens and the side-robe pixel be consistent with the focal distance f. The radius curvature for achieving that can be obtained from following Expression 22 by applying it to Expression 12.

$$r=((H^2+P^2)^{0.5})\times(n-1)/n \quad \text{(Expression 22)}$$

The focal distance I for the center of the main robe with the cylindrical lens having the radius curvature r defined in this manner can be obtained from following Expression 23, and following Expression 24 can be obtained by reorganizing Expression 23.

$$n/H-1/I=n/((H^2+P^2)^{0.5}) \quad \text{(Expression 23)}$$

$$I=(H\times((H^2+P^2)^{0.5})/(((H^2+P^2)^{0.5})-H)/n \quad \text{(Expression 24)}$$

However, in this exemplary embodiment, it is necessary to keep in mind that the focal distance f of the cylindrical lens is larger than the distance H between the lens and the main-robe pixel. In this case, the image point comes on the position closer to the −Z side than the pixel. That is, it is possible to consider that light exits from this image point and reaches the observing plane while spreading.

Thus, a triangle having the image point as the vertex and the width of the cylindrical lens as the base and a triangle having the image point as the vertex and the spread in the observing plane as the base will be considered here. The two triangles are in a similarity relation. The former triangle has the height of I and the base of L. The latter triangle has the height of "I+OD". When the spread width on the observing plane is defined as e1, following Expression 25 applies. Further, following Expression 26 can be obtained by reorganizing Expression 25.

$$I:L=OD+I:e1 \quad \text{(Expression 25)}$$

$$e1=L\times(OD+I)/I \quad \text{(Expression 26)}$$

It is considered that the lateral magnification of the lens is e/P. Thus, if the value of e1 is larger than "P1×e/P", the main pixel cannot be visually recognized from the front-face direction. Therefore, following Expression 27 applies, and following Expression 28 can be obtained by using Expression 26 described above.

$$e1 \le P1\times e/P \quad \text{(Expression 27)}$$

$$L\times(OD+I)/I \le P1\times e/P \quad \text{(Expression 28)}$$

Then, each parameter may be defined to satisfy Expression 24 and Expression 28. The structures of this exemplary embodiment other than those described above are the same as those of the first exemplary embodiment described above.

With this exemplary embodiment described above, the observer located in the vicinity of the front face cannot visually recognize the confidential information, and the user located in the oblique direction can visually recognize the confidential information.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Seventh Exemplary Embodiment

Figure 23:
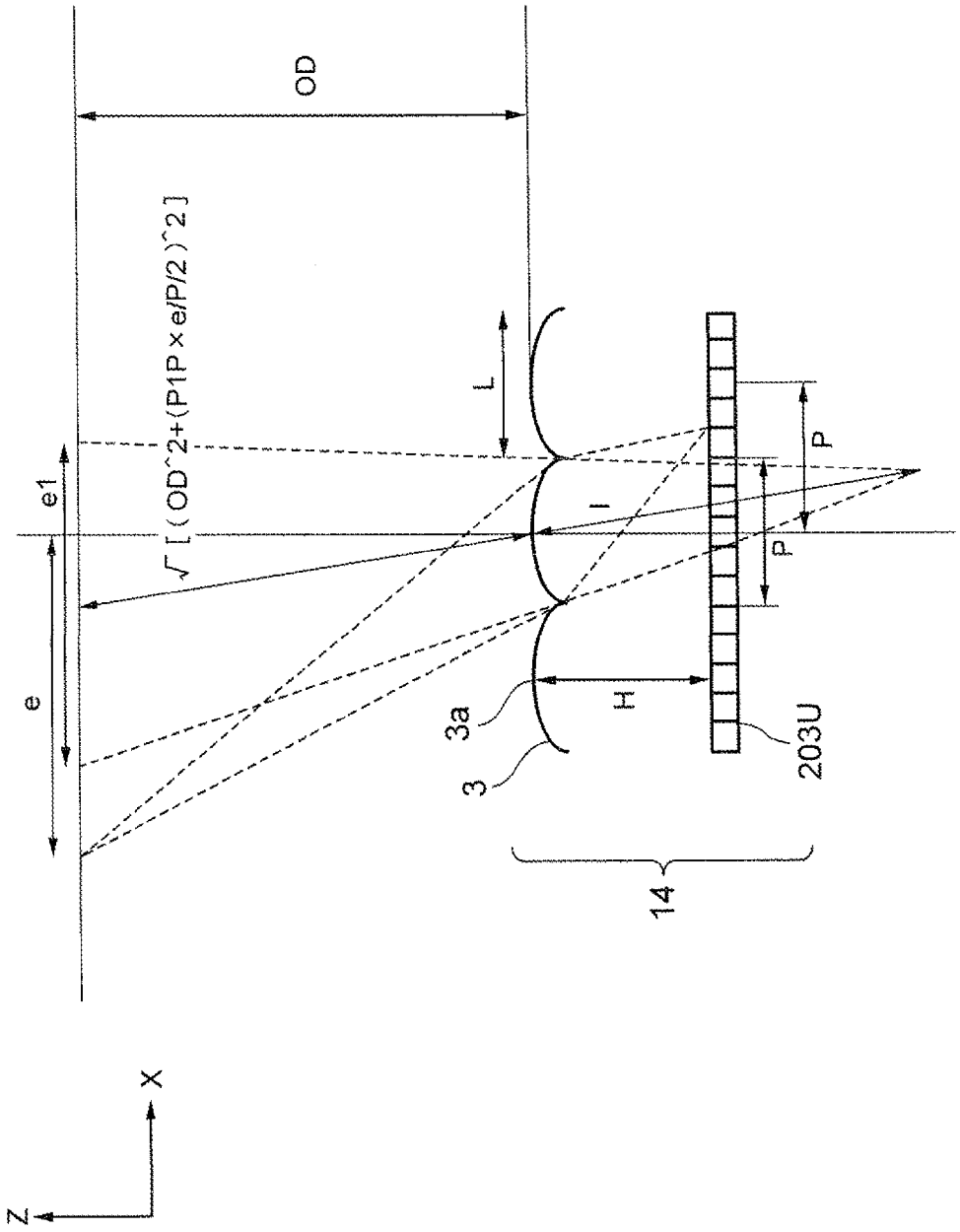
FIG. 23 is an explanatory diagram for showing an optical structure of a display device according to a seventh exemplary embodiment of the invention.

Next, a seventh exemplary embodiment of the present invention will be described by referring to FIG. 23. Explanations of the structures that are substantially the same as those of the first exemplary embodiment are omitted, and only different points are described. FIG. 23 is an explanatory diagram for showing an optical structure of the display device according to the seventh exemplary embodiment of the present invention.

The seventh exemplary embodiment is a form in which the above-described fourth exemplary embodiment is combined with the above-described sixth exemplary embodiment.

That is, it is so structured that, when the main pixel has the "Π" shaped display area, the observer located in the vicinity of the front face cannot visually recognize the confidential information but the user located in the oblique direction can visually recognize the confidential information.

The structure of a display panel in a display device 15 according to this exemplary embodiment is the same as that of the above-described fourth exemplary embodiment, and only the condition of the cylindrical lenses that configure the lenticular lens is different. Therefore, the lens condition will be described by referring to FIG. 23.

In this exemplary embodiment, the focal distance f of the lens is also defined in such a manner that the light is focused in the side robe. The display area in this exemplary embodiment is formed in the "Π" shape. It is desirable to have the same condition for both the left eye and the right eye, so that it is so set that the light is focused in the center of the "Π" shaped display area.

This condition is the same as that of the above-described sixth exemplary embodiment, so that the radius curvature r of the lens can be obtained from Expression 22 described above.

With this exemplary embodiment, it is necessary to pay attention to the longitudinal-bar parts of the "Π" shaped display area of the main-robe pixel. The position thereof is different with respect to the case of the sixth exemplary embodiment described above. Thus, the image point distance I is obtained by using following Expression 29 instead of using Expression 23.

$$n/((H^2+(P1P/2)^2)^{0.5})-1/I=n/((H^2+P^2)^{0.5}) \quad \text{(Expression 29)}$$

Then, the spread width e1 of the light emitted from this image point on the observing plane is obtained. Since there is a similarity relation between a triangle having the image point as the vertex and the width of the cylindrical lens as the base and a triangle having the image point as the vertex and the spread on the observing plane as the base, following Expression 30 applies.

$$I:L=I+(OD^2+(P1P\times e/P/2)^2)^{0.5}:e1 \qquad \text{(Expression 30)}$$

It can be set such that the main pixel cannot be recognized from the front-face direction by satisfying following Expression 31.

$$e1=P1P\times e/P \qquad \text{(Expression 31)}$$

That is, each parameter may be defined to satisfy Expression 29-Expression 31. The structures of this exemplary embodiment other than those described above are the same as those of the fourth exemplary embodiment described above.

With this exemplary embodiment described above, the observer located in the vicinity of the front face cannot visually recognize the confidential information, and the user located in the oblique direction can visually recognize the confidential information.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Eighth Exemplary Embodiment

Figure 24:
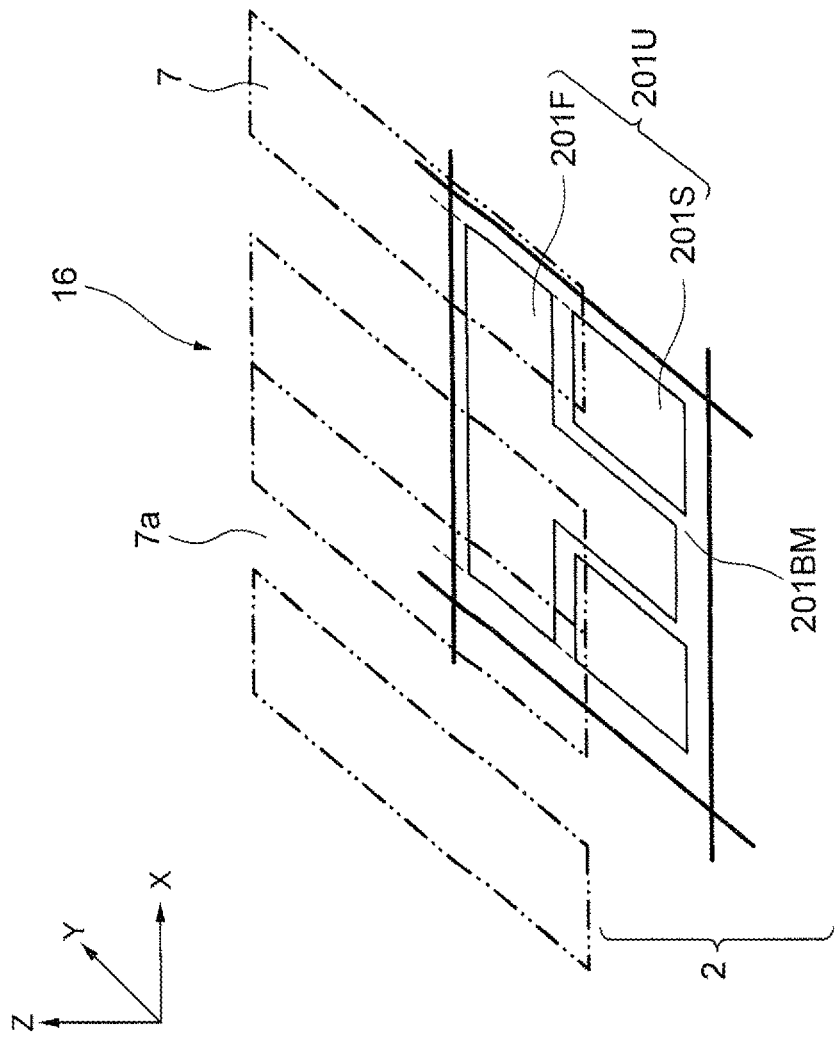
FIG. 24 is a perspective view showing an example of a schematic structure of a display device according to an eighth exemplary embodiment of the invention.
Figure 25:
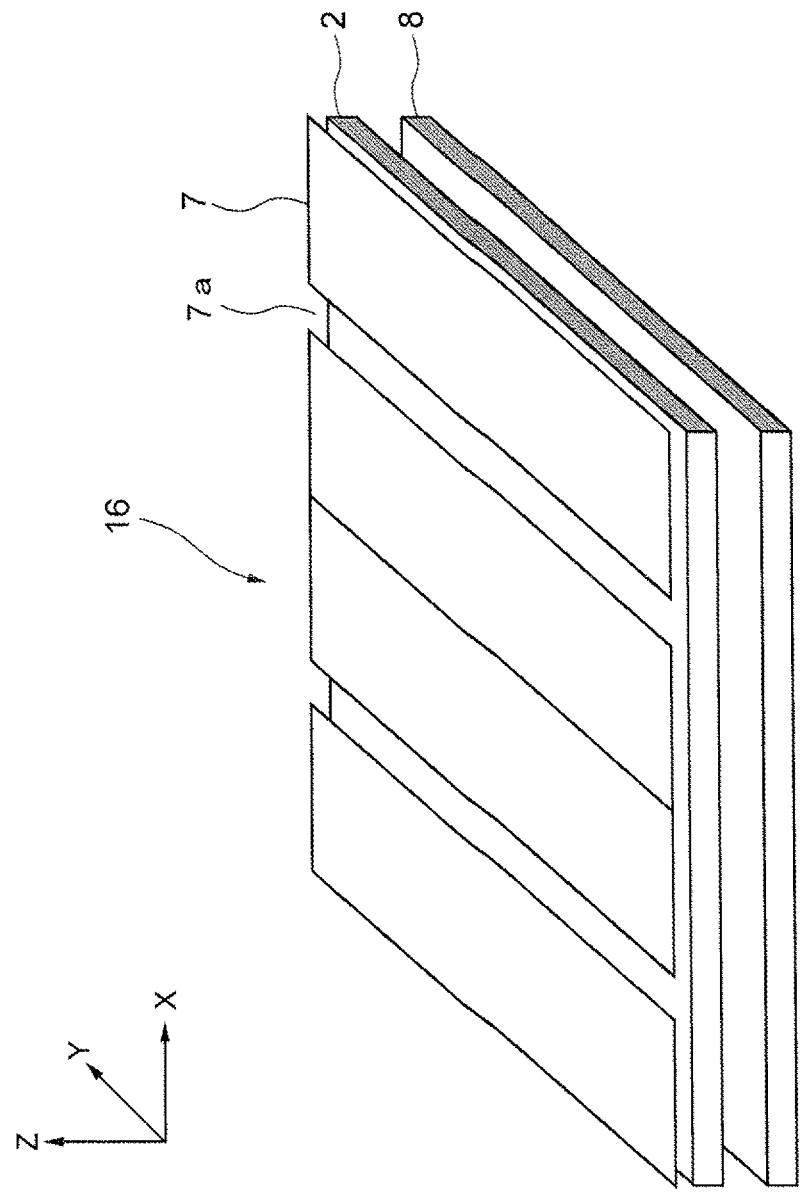
FIG. 25 is a perspective view showing an example of an overall structure of the display device according to the eighth exemplary embodiment of the invention.
Figure 26:
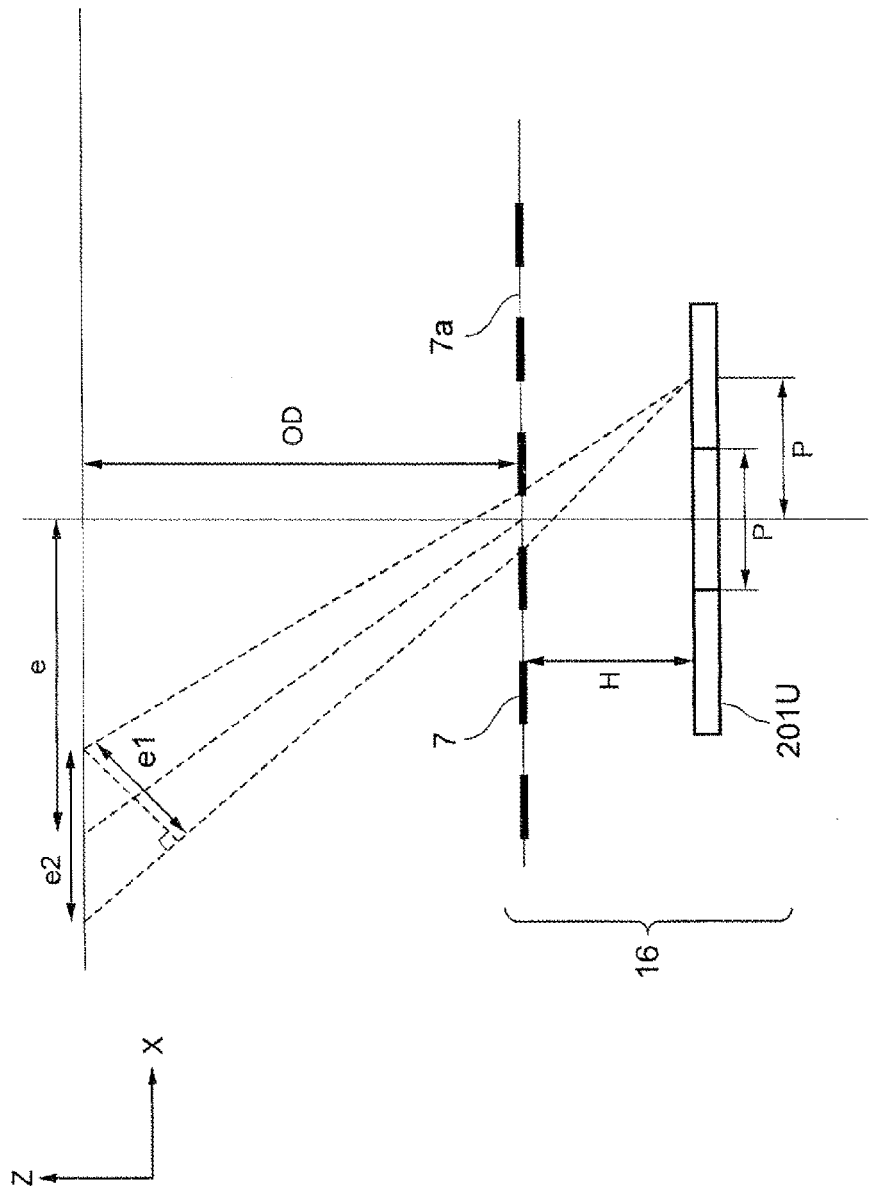
FIG. 26 is an explanatory diagram for showing an optical structure of the display device according to the eighth exemplary embodiment of the invention.
Figure 27:
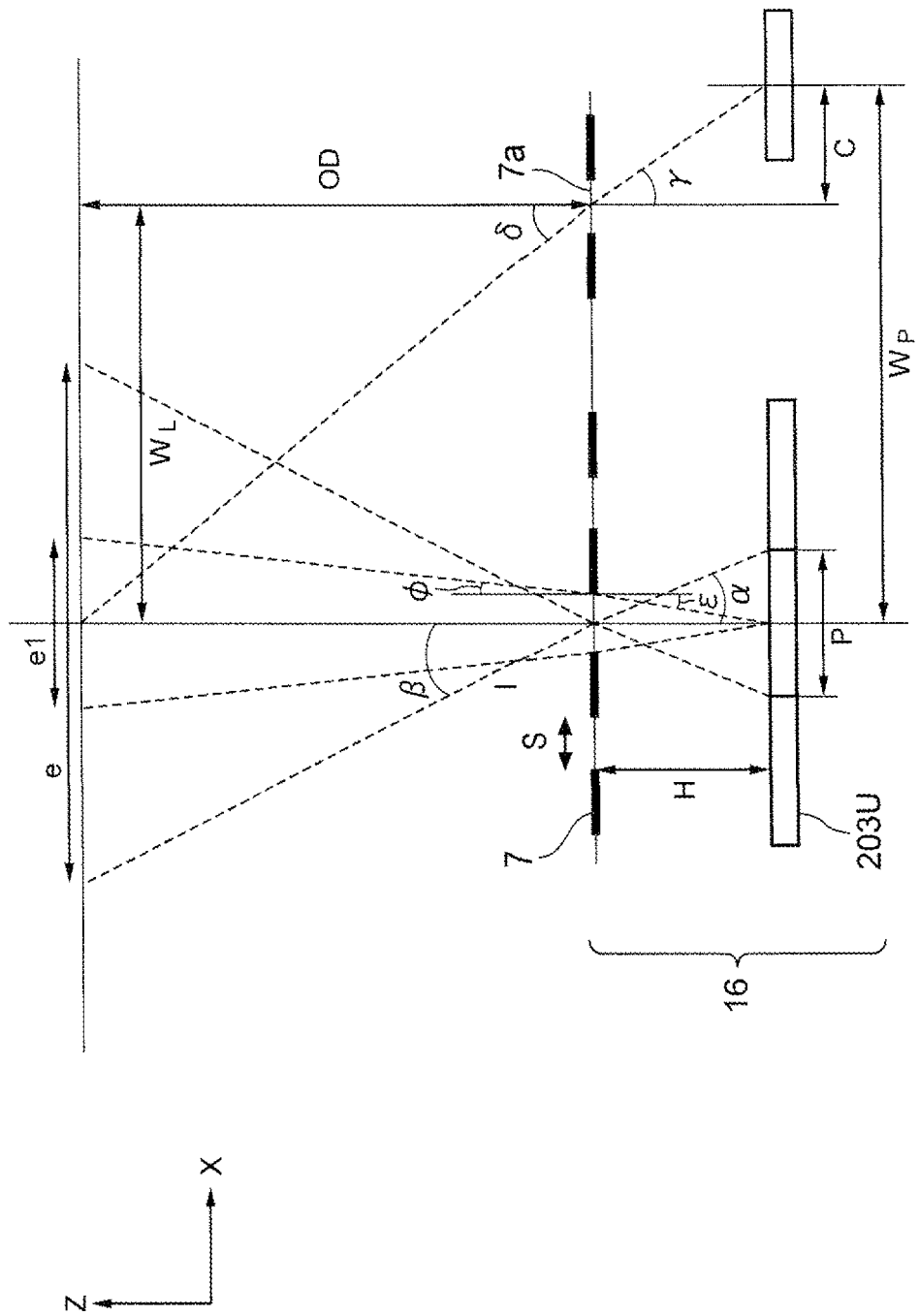
FIG. 27 is an explanatory diagram showing an example of an optical model, when a parallax barrier is used in the display device according to the eighth exemplary embodiment of the invention.

Next, an eighth exemplary embodiment of the present invention will be described by referring to FIG. 24-FIG. 27. Explanations of the structures that are substantially the same as those of the first exemplary embodiment are omitted, and only different points are described. FIG. 24 is a perspective view showing an example of a schematic structure of a display device according to the eighth exemplary embodiment of the present invention. FIG. 25 is a perspective view showing an example of an overall structure of the display device according to the eighth exemplary embodiment of the present invention. FIG. 26 is an explanatory diagram for showing an optical structure of the display device according to the eighth exemplary embodiment of the present invention. FIG. 27 is an explanatory diagram showing an example of an optical model, when a parallax barrier is used in the display device according to the eighth exemplary embodiment of the present invention.

As shown in FIG. 24-FIG. 26, a display device 16 according to the eighth exemplary embodiment is different from the display device 1 of the above-described first exemplary embodiment in respect that it uses a parallax barrier system in which a parallax barrier 7 is employed as the optical member instead of the lenticular lens 3.

As shown in FIG. 24, the parallax barrier 7 is a barrier (shielding plate) in which a large number of thin apertures, i.e., slits 7a, are arranged in the X-axis direction.

Before explaining this exemplary embodiment, the principle of the parallax barrier system will be described by referring to FIG. 27.

It is defined that the arranging pitch of the slits 71 of the parallax barrier 7 is L, and the distance between the parallax barrier 7 and the pixel is H. Further, it is defined that the distance between the parallax barrier 7 and the observer is the optimum observing distance OD.

Furthermore, the distance from the center of the slit 7a located in the center of the parallax barrier 7 to the center of the slit 7a located at the end of the parallax barrier 7 in the X-axis direction is defined as WL. Since the parallax barrier 7 itself is the shielding plate, only the light making incident on the slits 7a transmits therethrough. A substrate for supporting a barrier layer is provided, and the refractive index of this substrate is defined as n.

With such definitions, the light emitted from the slits 7a refracts according to Snell's law. Thus, the light incident angle and the light exit angle of the slit 7a located in the center of the parallax barrier 7 are defined as α and β, respectively, and the light incident angle and the light exit angle of the slit 7a located at the end of the parallax barrier in the X-axis direction are defined as γ and δ, respectively. Further, the aperture width of the slit 7a is defined as S1.

There is a mutual relationship between the arranging pitch L of the slits 7a and the arranging pitch P of the display units. Thus, one of the pitches is determined depending on the other. Normally, the arranging pitch P of the pixels is taken as the constant, since the parallax barrier is designed in accordance with the display panel in many cases. Further, the refractive index n is determined depending on the selection of the material for the supporting substrate of the barrier layer.

In the meantime, desired values are set for the observing distance OD between the parallax barrier and the observer, and the cycle e of the pixel enlarged projection images of the display units at the observing distance OD. The distance H between the barrier and the pixel as well as the lens pitch L is determined by using those values.

Following Expressions 32-37 apply, according to Snell's law and geometrical relations. Further, following Expressions 38-40 apply as well.

$$n\times\sin\alpha=\sin\beta \qquad \text{(Expression 32)}$$

$$OD\times\tan\beta=e/2 \qquad \text{(Expression 33)}$$

$$H\times\tan\alpha=P/2 \qquad \text{(Expression 34)}$$

$$n\times\sin\gamma=\sin\delta \qquad \text{(Expression 35)}$$

$$H\times\tan\gamma=C \qquad \text{(Expression 36)}$$

$$OD\times\tan\delta=WL \qquad \text{(Expression 37)}$$

$$WP-WL=C \qquad \text{(Expression 38)}$$

$$WP=m\times P \qquad \text{(Expression 39)}$$

$$WL=m\times L \qquad \text{(Expression 40)}$$

When it is considered that the parallax barrier enlarges the pixel in the same manner as the case of the lenticular lens described above, the lateral magnification of the parallax barrier can be considered as a value that is obtained through dividing the cycle of the pixel enlarged projection images by the cycle of the pixels (i.e., the pixel pitch). Thus, it can be expressed as "e/P".

Further, paying attention to the behavior of the light of the end part of the aperture of the slit 7a located in the center of the parallax barrier 7, the light incident angle and exit angle of the light that exits from the center of the display unit and makes incident on the end part of the aperture of the slit 7a are defined as ∈ and ϕ, respectively.

Assuming that the spread width when the emitted light travels the distance OD is "e1", following Expressions 41-43 apply, according to Snell's law and geometrical relations. With this, the spread width e1 can be obtained.

$$n\times\sin\in=\sin\phi \qquad \text{(Expression 41)}$$

$$OD\times\tan\phi=(e1-S1)/2 \qquad \text{(Expression 42)}$$

$$H\times\tan\in=S1/2 \qquad \text{(Expression 43)}$$

The above is the relation between the slit and the pixel that forms the main robe. For the side robe, the spread width "e2" of the light on the observing plane that is away by the distance OD can be obtained by following Expression 44.

This is because a right triangle having "e" as the base and "OD" as the height and a right triangle having "e1" as the height and "e2" as the hypotenuse are in a similarity relation.

$$e2 = e1 \times (1+(OD/e)^2)^{0.5}$$  (Expression 44)

Then, in order for the main pixel not to be visually recognized by itself in the side robe as in the case of the above-described first exemplary embodiment, it is necessary to set "e2" to become larger than "P1×e/P". Therefore, following Expression 45 applies.

$$e2 \leq P1 \times e/P$$  (Expression 45)

As described above, it is possible with this exemplary embodiment to achieve separation of the images for the front-face direction and mixture thereof for the oblique directions by the use of the parallax barrier that is configured to satisfy Expression 45 so as to achieve the display angle limited mode, while achieving the same operational effects as those of the first exemplary embodiment.

Compared to the lenticular lens system, the parallax barrier system faces absorption loss by the light-shielding part other than the slits. Thus, the transmittance and the reflectance are deteriorated. However, the structure thereof is plane, and it can be manufactured easily by using a photolithography technique. Therefore, the cost can be lowered. The operations and effects of the third exemplary embodiment other than those described above are the same as those of the above-described first exemplary embodiment.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Ninth Exemplary Embodiment

Figure 28:
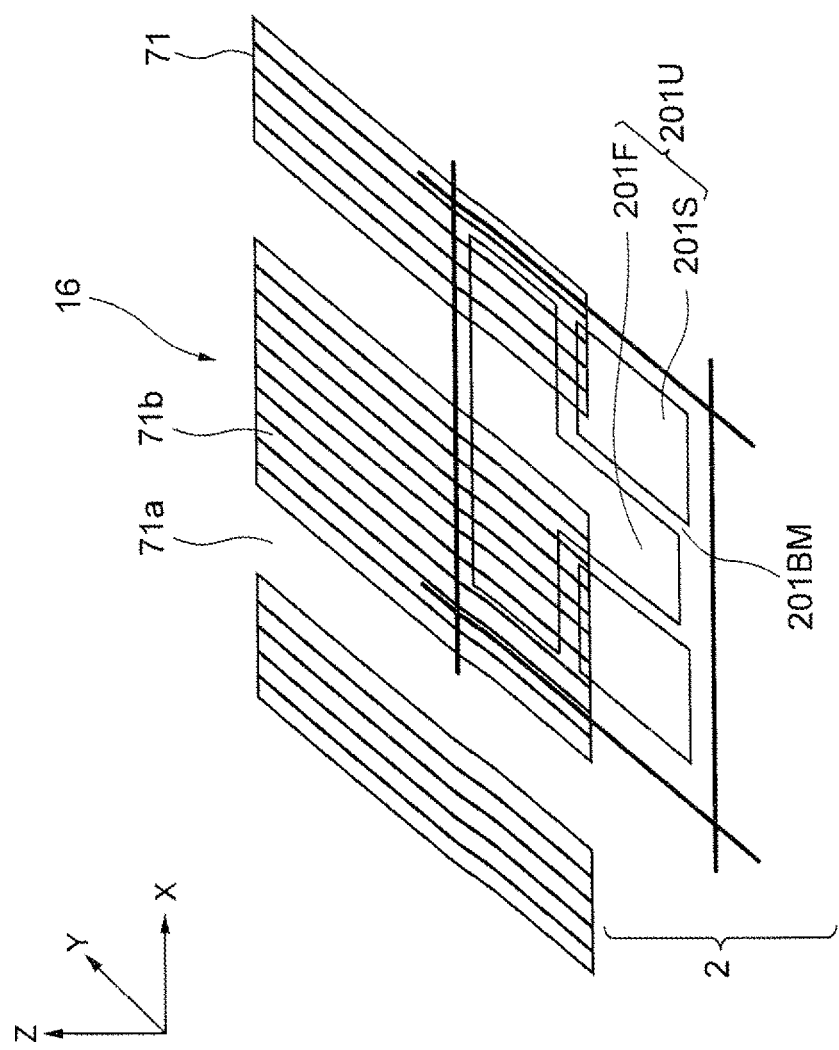
FIG. 28 is a perspective view showing an example of a schematic structure of a display device according to a ninth exemplary embodiment of the invention.
Figure 29:
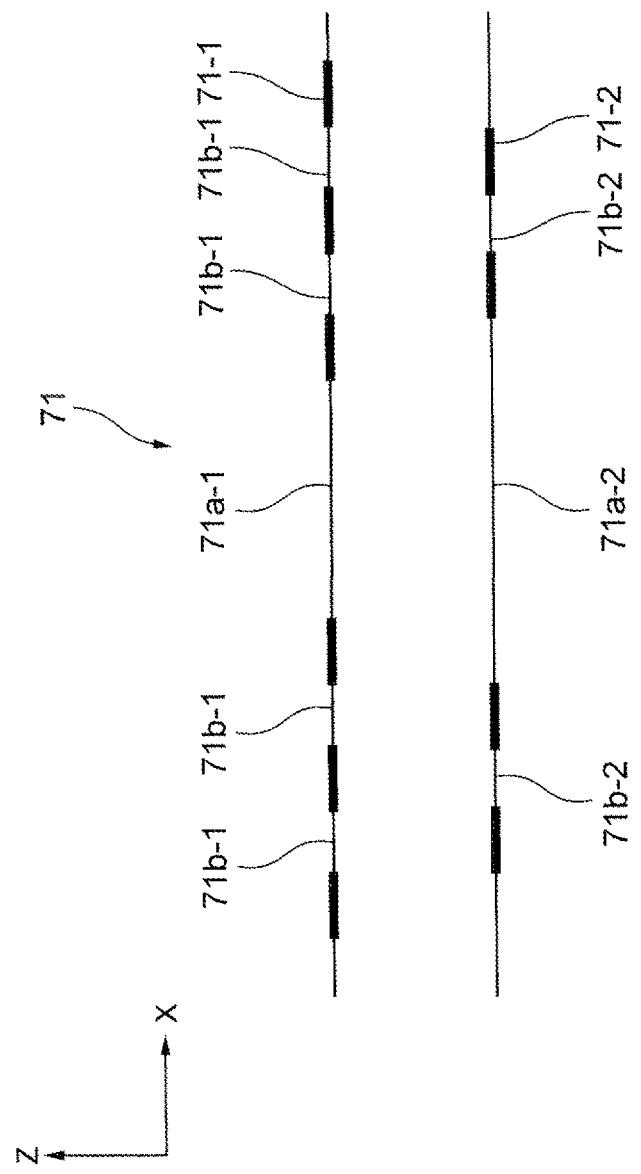
FIG. 29 is a sectional view showing an example of the parallax barrier of the display device according to the ninth exemplary embodiment of the invention.

Next, a ninth exemplary embodiment of the present invention will be described by referring to FIG. 28 and FIG. 29. Explanations of the structures that are substantially the same as those of the first exemplary embodiment are omitted, and only different points are described. FIG. 28 is a perspective view showing an example of a schematic structure of a display device according to the ninth exemplary embodiment of the present invention. FIG. 29 is a sectional view showing an example of the parallax barrier of the display device according to the ninth exemplary embodiment of the present invention.

As shown in FIG. 28, compared to the above-described eighth exemplary embodiment, it is a feature point of the ninth exemplary embodiment that a display device 17 has a parallax barrier 71.

Note here that the optical member is disposed by opposing the display panel. The optical member can have a plurality of stacked parallax barriers in which a large number of apertures are formed all over the counter face and a large number of slits are provided between the apertures.

Each parallax barrier is stacked in such a manner that the layout positions of the apertures of a given parallax barrier match the layout positions of other parallax barriers, and that layout positions of the slits of the given parallax barrier match the layout positions of the slits of the other parallax barriers.

As shown in FIG. 29, the parallax barrier 71 according to this exemplary embodiment has the light-shielding plates that are stacked in two layers in the Z direction. Other than slits 71a, there are slits 71b formed on the light-shielding plates. The slits 71b are provided at different positions of the two layers of the light-shielding plates in the X-axis direction.

That is, there is no slit 71b formed in the light-shielding plate disposed on the −Z side in a part where the slits 71b are formed in the light-shielding plate disposed on the +Z side. Therefore, when viewed from the front-face direction, the parts of the parallax barrier 71, which transmit the light, are only the slits 71a.

When viewed from the oblique directions, the light transmits not only through the slits 71a but also through the slits 71b. That is, the parallax barrier 71 of this exemplary embodiment can provide an image separating effect for the front-face direction and decrease the image separating effect for the oblique directions.

Further, the slits 71a work to distribute the light emitted from the pixels, and the slits 71b work to deteriorate the separating effect for the oblique directions. The amount of decrease in the image separating effect can be determined by the space between the two layers of light-shielding plates and the width of the slit 71b. The structures of the ninth exemplary embodiment other than those described above are the same as those of the eighth exemplary embodiment.

Compared to the above-described eighth exemplary embodiment, it is possible with the ninth exemplary embodiment as described above to decrease the image separating effect further and to increase the effect for keeping the confidentiality achieved by the present invention, while achieving the same operational effects as those of the above-described first exemplary embodiment.

Even though it is necessary to stack the parallax barriers, the parallax itself can be manufactured easily by using the photolithography technique as described above.

Further, since the structure is flat, the parallax barriers can be stacked easily. That is, a secured-type display device can be formed at a low cost with a simple structure. The structures of the ninth exemplary embodiment other than those described above are the same as those of the eighth exemplary embodiment described above.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Tenth Exemplary Embodiment

Figure 30:
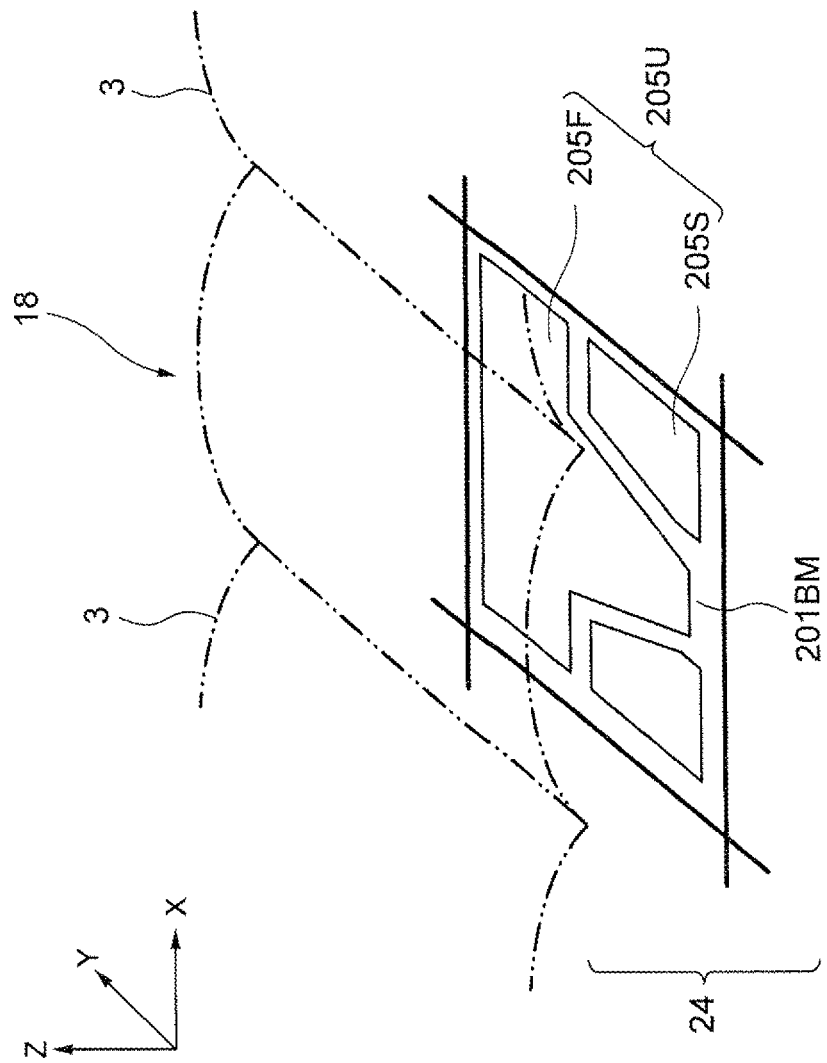
FIG. 30 is a perspective view showing an example of a schematic structure of a display device according to a tenth exemplary embodiment of the invention.

Next, a tenth exemplary embodiment of the present invention will be described by referring to FIG. 30. Explanations of the structures that are substantially the same as those of the first exemplary embodiment are omitted, and only different points are described. FIG. 30 is a perspective view showing an example of a schematic structure of a display device according to the tenth exemplary embodiment of the present invention.

As shown in FIG. 30, a display device 18 according to the tenth exemplary embodiment is different from that of the above-described first exemplary embodiment in terms of a main pixel 205F and a sub-pixel 205S, which configure each display unit 205U of a display panel 24.

That is, in the above-described first exemplary embodiment, the main pixel has the T-letter shaped display area and the sub-pixel has the rectangular display area. In the meantime, it is a feature point of the main pixel 205F of the tenth exemplary embodiment that the longitudinal-bar part configuring the T-letter shaped display area is tilted from the Y-axis direction.

Furthermore, a part of the sides configuring the sub-pixel 205S is also tilted from the Y-axis direction. The structures of the tenth exemplary embodiment other than those described above are the same as those of the first exemplary embodiment.

As described above, it is possible with the tenth exemplary embodiment to gradually change the boundary between the first display range and the second display range through having the sides configuring the display areas of the main pixel and the sub-pixel tilted with respect to the Y-axis direction (i.e., the direction orthogonal to the arranging direction of the lens), while achieving the same operational effects as those of the above-described first exemplary embodiment.

This makes it possible to reduce the sense of discomfort felt by the user in the display angle limited mode.

Further, it is also possible to improve the quality of display between the first display range and the second display range even in the normal display mode. The structures of the tenth exemplary embodiment other than those described above are the same as those of the above-described first exemplary embodiment.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

(Other Various Modification Examples)

Further, while the device and the method according to the present invention have been described according to some of the specific exemplary embodiments, it is to be understood that various modifications of the exemplary embodiments depicted in the texts of the present invention are possible without departing from the technical spirit and the scope of the present invention.

For example, the layout of the main pixel and the sub-pixel in the display unit is not limited to the cases described in each of the exemplary embodiments. For example, various kinds of layout such as those shown in FIG. 31-FIG. 34 may be employed as well.

Figure 31:
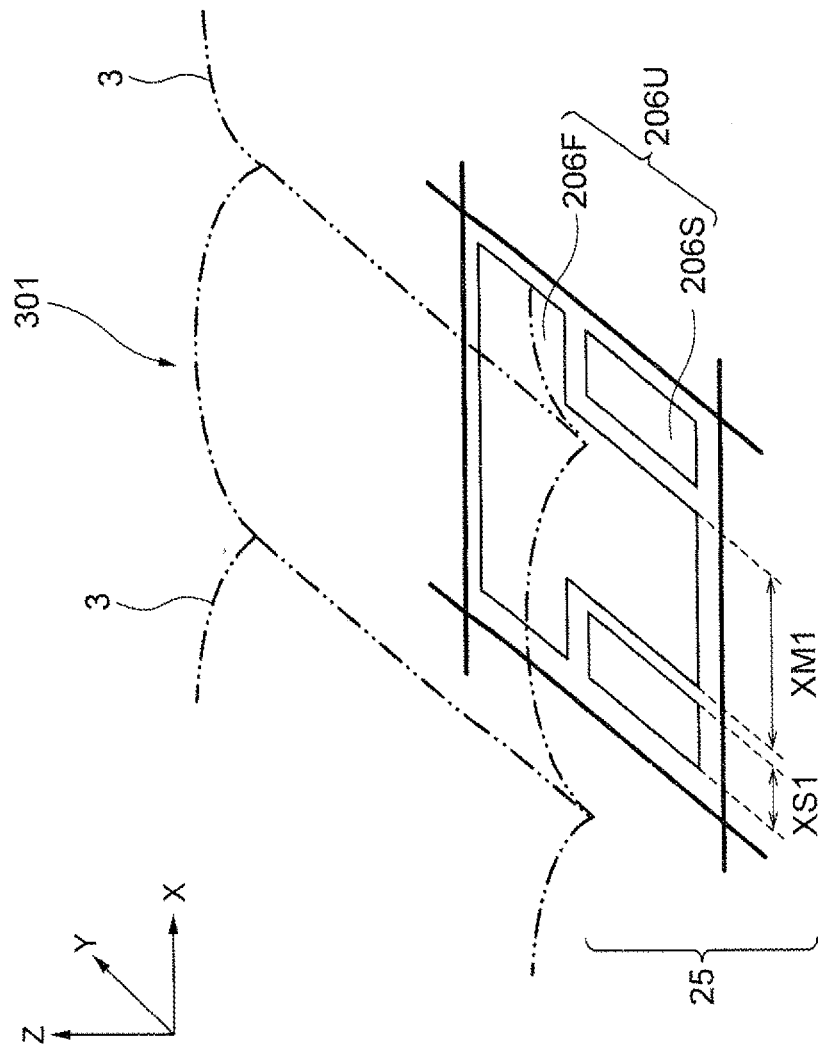
FIG. 31 is a perspective view showing an example of a schematic structure of a display device according to another exemplary embodiment of the invention.

In a display device 301 shown in FIG. 31, a main pixel 206F and a sub-pixel 206S configuring each display unit 206U in a display panel 25 (display part) are in a layout structure that is different from each of the exemplary embodiments. Further, length XM1 of the longitudinal-bar part of the flat T-letter shaped display area of the main pixel 206F in the X direction is formed longer than length XS1 of the sub-pixel 206S in the X direction. With this, the viewing angle of the first display range in the display angle limited mode can be formed wider than that of the first exemplary embodiment.

Figure 32:
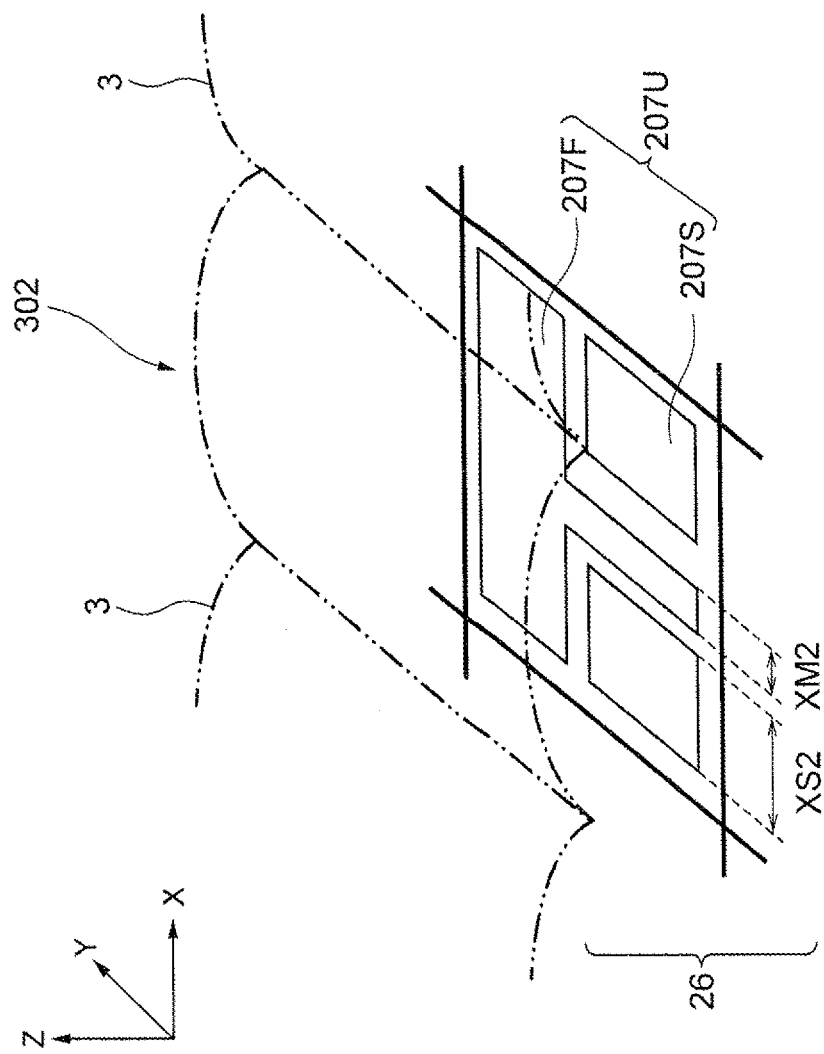
FIG. 32 is a perspective view showing an example of a schematic structure of a display device according to another exemplary embodiment of the invention.

Further, in a display device 302 shown in FIG. 32, a main pixel 207F and a sub-pixel 207S configuring each display unit 206U in a display panel 26 (display part) are in a layout structure that is different from each of the exemplary embodiments. Furthermore, length XM2 of the longitudinal-bar part of the flat T-letter shaped display area of the main pixel 207F in the X direction is formed shorter than length XS2 of the sub-pixel 207S in the X direction. With this, the viewing angle of the first display range in the display angle limited mode can be formed narrower than that of the first exemplary embodiment.

Figure 33:
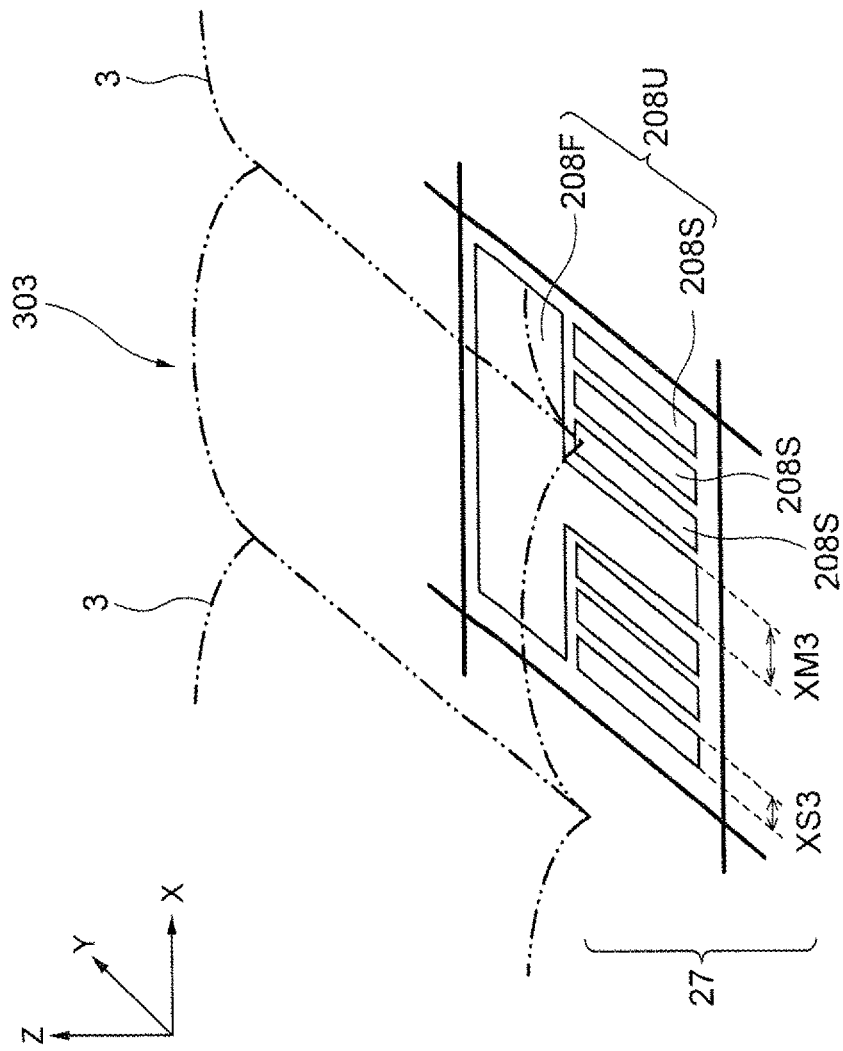
FIG. 33 is a perspective view showing an example of a schematic structure of a display device according to another exemplary embodiment of the invention.

Further, in a display device 303 shown in FIG. 33, a main pixel 208F and a sub-pixel 208S configuring each display unit 208U in a display panel 27 (display part) are in a layout structure that is different from each of the exemplary embodiments described above. Furthermore, a plurality of sub-pixels 208S are formed in both sides of the longitudinal-bar part of the flat T-letter shaped display area of the main pixel 208F. Thereby, it becomes possible to display different images or same images on a given sub-pixel 208S and the other sub-pixels 208S among the plurality of sub-pixels 208S according to the mode.

For example, in a first limited mode of the display angle limited mode, a gradation inverted image of a first image of the main pixel 208F is displayed for second images of six sub-pixels 208S. In a second limited mode, a same image as that of the main pixel is displayed for the second images of the two sub-pixels 208S on both sides of the longitudinal-bar part, and a gradation inverted image of the first image of the main pixel 208F is displayed for the second images of the other four sub-pixels 208S. In a third limited mode, a same image as that of the main pixel is displayed for the second images of the two sub-pixels 208S on both sides of the longitudinal-bar part as well as the two pixels on both sides of those sub-pixel (four sub-pixels in total), and a gradation inverted image of the first image of the main pixel 208F is displayed for the second images of the remaining two sub-pixels 208S on both sides.

This makes it possible to select the set viewing angles appropriately depending on the size of the sub-pixel in the first display area, and to select the viewing angle of the first display range in the display angle limited mode by using the first limited mode, the second limited mode, and the third limited mode.

Figure 34:
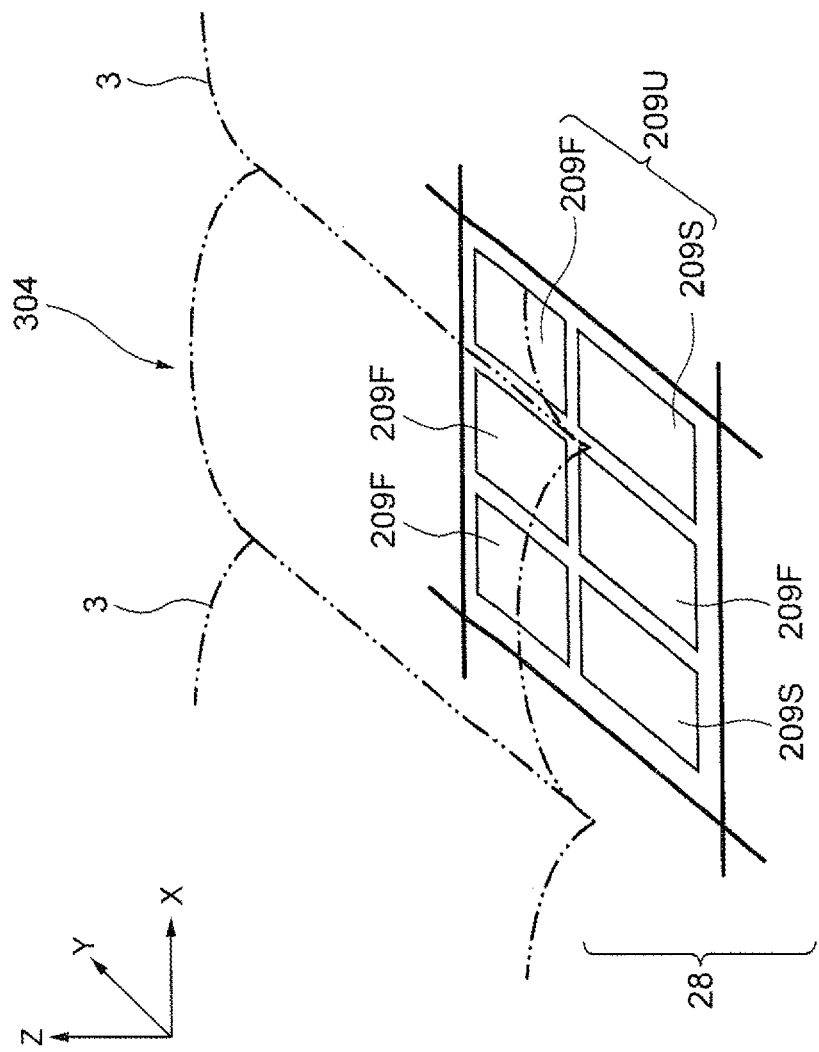
FIG. 34 is a perspective view showing an example of a schematic structure of a display device according to another exemplary embodiment of the invention.

Further, in a display device 304 shown in FIG. 34, a main pixel 209F and a sub-pixel 209S configuring each display unit 209U in a display panel 28 (display part) are in a layout structure that is different from each of the exemplary embodiments described above. Then, among the six rectangular pixels, the four pixels on the upper right, upper center, upper left, and the lower center are formed as the main pixels 209F, while the two pixels on the lower right and the lower left are formed as the sub-pixels 209S. It is also possible even with this structure to achieve the same effects as those of the first exemplary embodiment.

In each of the display devices shown in FIG. 31-FIG. 34, other structures and other steps as well as the functions and the operational effects thereof are the same as the cases of the above-described exemplary embodiments. Further, the operation contents of each of the above-described steps and the structural elements of each part as well as each function achieved thereby may be put into a program so as to be executed by a computer.

(Display Control System 1)

Figure 35:
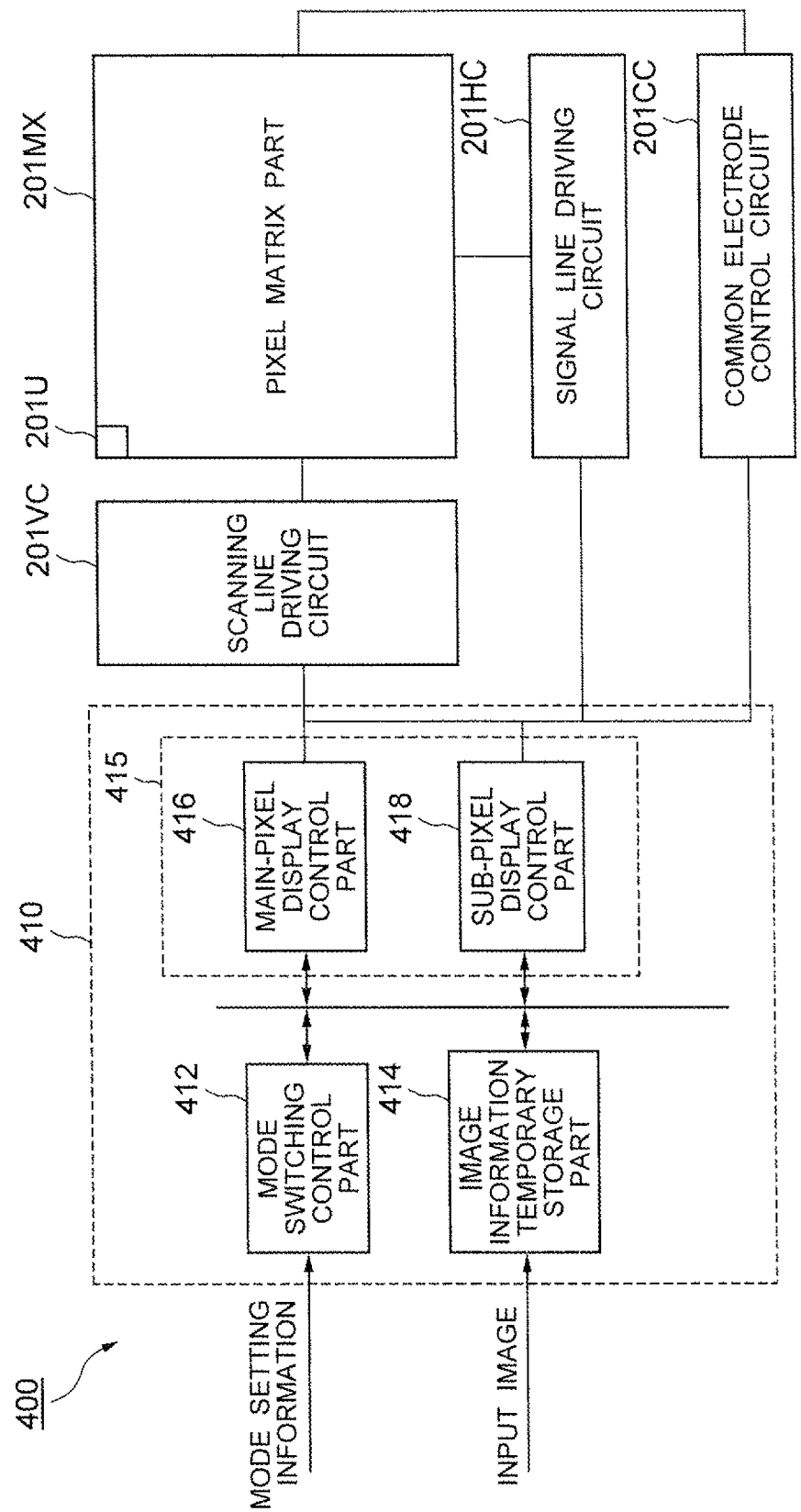
FIG. 35 is a block diagram showing an example of an overall schematic structure of a display control system according to an exemplary embodiment of the invention.

Further, the display devices according to each of the above-described exemplary embodiments can be used for a display control system 400 as shown in FIG. 35, for example. FIG. 35 is a block diagram showing an example of an overall schematic structure of the display control system according to an exemplary embodiment of the present invention.

The display control system 400 according to this exemplary embodiment can control a display panel in which a plurality of display units each containing a main pixel for displaying a first image and a sub-pixel for displaying a second image are arranged in matrix in a first direction and a second direction that crosses with the first direction.

As shown in FIG. 35, this display control system 400 can have a pixel matrix part 201MX in which any of the display units 201U according to each of the above-described exemplary embodiments are formed in matrix and have the same functions as those of each of the above-described exemplary embodiments. The display control system 400 is configured, including a signal line driving circuit 201HC (second driver), a scanning line driving circuit 201VC (first driver), a common electrode control circuit 201CC, which are the circuits for drive-controlling the scanning lines, the signal lines, the common electrodes, and the storage capacitance lines of the display panel, and including a controller 410 which controls each of those circuits.

The controller 410 controls each of those circuits which respectively controls the scanning lines and signal lines of the display panel containing the main pixels and the sub-pixels.

As the basic structures, the controller 410 can include: a mode switching control part 412 for switching the display angle limited mode which displays a first image on the main pixels and a second image on the sub-pixels and the normal display mode which displays the first image on the main pixels and the sub-pixels; and a display control part 415 for executing a control so as to display the first image and the second image in the first display area that is a part of the display unit configured with the main pixel and the sub-pixel in the display angle limited mode, and to display the first image in the second display area that is apart of the display unit configured only with the main pixel.

The controller 410 can further include an image information temporary storage part 414 for temporarily storing input images.

As a way of example, in the display angle limited mode, the display control part 415 can execute controls to display the first image in a main pixel selecting period where the main pixels are selected and to display the second image in a sub-pixel selecting period where the sub-pixels are selected.

Further, as another example, in the display angle limited mode, the display control part 415 can execute controls to supply the first image to the main pixels and the sub-pixels, while displaying the first image in the main pixel selecting period where the main pixels are selected and displaying the second image on the sub-pixels in the sub-pixel selecting period where the sub-pixels are selected with a different polarity from that of the main pixels of the main pixel selecting period.

The mode switching control part 412 can execute mode switching controls based on mode setting information which shows one of the setting modes, i.e., the normal display mode or the display angle limited mode.

As a first example, the display control system 400 may control a panel structure configured with, as in the case of the first exemplary embodiment described above: a first scanning line for selecting a first switching element of a main pixel electrode of the main pixel; a second scanning line for selecting a second switching element of a sub-pixel electrode of the sub-pixel; a signal line in common to the main pixel and the sub-pixel; a first storage capacitance line for the main pixel; a second storage capacitance line for the sub-pixel; and a common electrode in common to the main pixel and the sub-pixel.

Further, as a second example, the display control system 400 may control a panel structure configured with, as in the case of the third exemplary embodiment described above: a main pixel electrode for configuring the main pixel; a sub-pixel electrode for configuring the sub-pixel; a first common electrode corresponding to the main pixel electrode; a second common electrode corresponding to the sub-pixel electrode; a first switching element for transmitting video signals to the main pixel electrode; a second switching element for transmitting video signals to the sub-pixel electrode; a scanning line for controlling the first switching element and the second switching element; a signal line for supplying the video signals; a first storage capacitance line for the main pixel; and a second storage capacitance line for the sub-pixel.

Other than those cases, the display control system 400 may control a panel structure having a first signal line for the main pixel and a second signal line for the sub-pixel. In that case, image information can be supplied separately to the main pixels and the sub-pixels.

Further, while it is preferable for the second image to be the image in which the gradation is inverted from that of the first image as in the case of the above-described exemplary embodiments, the second image is not necessarily limited to be the gradation inverted image. For example, a dark color or black may be displayed as the second image.

When the mode switching control part 412 executes a control as "display angle limited mode", the display control part 415 can further include: a main-pixel display control part 416 which executes a control to display input image in the image information temporary storage part 414 on the main pixel as the first image; and a sub-pixel display control part 418 which executes a control to generate the second image for the sub-pixel based on the first image that is the input image in the image information temporary storage part 414 and displays that second image on the sub-pixel.

The main-pixel display control part 416 can execute controls to display the first image on the main pixels by controlling each of the signal line driving circuit 201HC (second driver), the scanning line driving circuit 201VC (first driver), and the common electrode control circuit 201CC based on various kinds of main pixel control signals.

When the mode switching control part 412 execute controls as the "display angle limited mode", the sub-pixel display control part 418 can execute controls to display the second image on the sub-pixels through controlling each of the signal line driving circuit 201HC (second driver), the scanning line driving circuit 201VC (first driver), and the common electrode control circuit 201CC based on the various kinds of first mode sub-pixel control signals.

When the mode switching control part 412 execute controls as the "normal display mode", the sub-pixel display control part 418 can execute controls to display the first image on the sub-pixels through controlling each of the signal line driving circuit 201HC (second driver), the scanning line driving circuit 201VC (first driver), and the common electrode control circuit 201CC based on various kinds of second mode sub-pixel control signals.

That is, the mode switching control part 412 gives an instruction to output the various kinds of first mode sub-pixel control signals from the sub-pixel display control part 418 for displaying the second image on the sub-pixel in the "display angle limited mode". At that time, the mode switching control part 412 gives an instruction to output the various kinds of main pixel control signals from the main pixel display control part 416 for displaying the first image on the main pixels.

Further, the mode switching control part 412 gives an instruction to output the various kinds of second mode sub-pixel control signals from the sub-pixel display control part 418 for displaying the first image on the sub-pixel in the "normal display mode". At that time, the mode switching control part 412 gives an instruction to output the various kinds of main pixel control signals from the main pixel display control part 416 for displaying the first image on the main pixels.

Therefore, the sub-pixel display control part 418 can execute controls to display the first image on the sub-pixels in the "normal display mode", and to display the second images on the sub-pixels in the "display angle limited mode". That is, the sub-pixel display control part 418 displays different images in the "normal display mode" and the "display angle limited mode" based on the mode control signals from the mode switching control part 412.

With this, the controller 410 can execute controls to display the first image on the main pixels and the sub-pixels, respectively, in the "normal display mode", and to display the first image on the main pixels and the second image on the sub-pixels in the "display angle limited mode". Therefore, as described above, a synthesized image of the first image and the second image is displayed in the first display area that is configured with the main pixel and the sub-pixel, and only the first image is displayed in the second display area that is configured only with the main pixel in the "display angle limited mode". This makes it possible to display the first image only for a specific viewing angle.

(Display Control Procedure 1)

Figure 36:
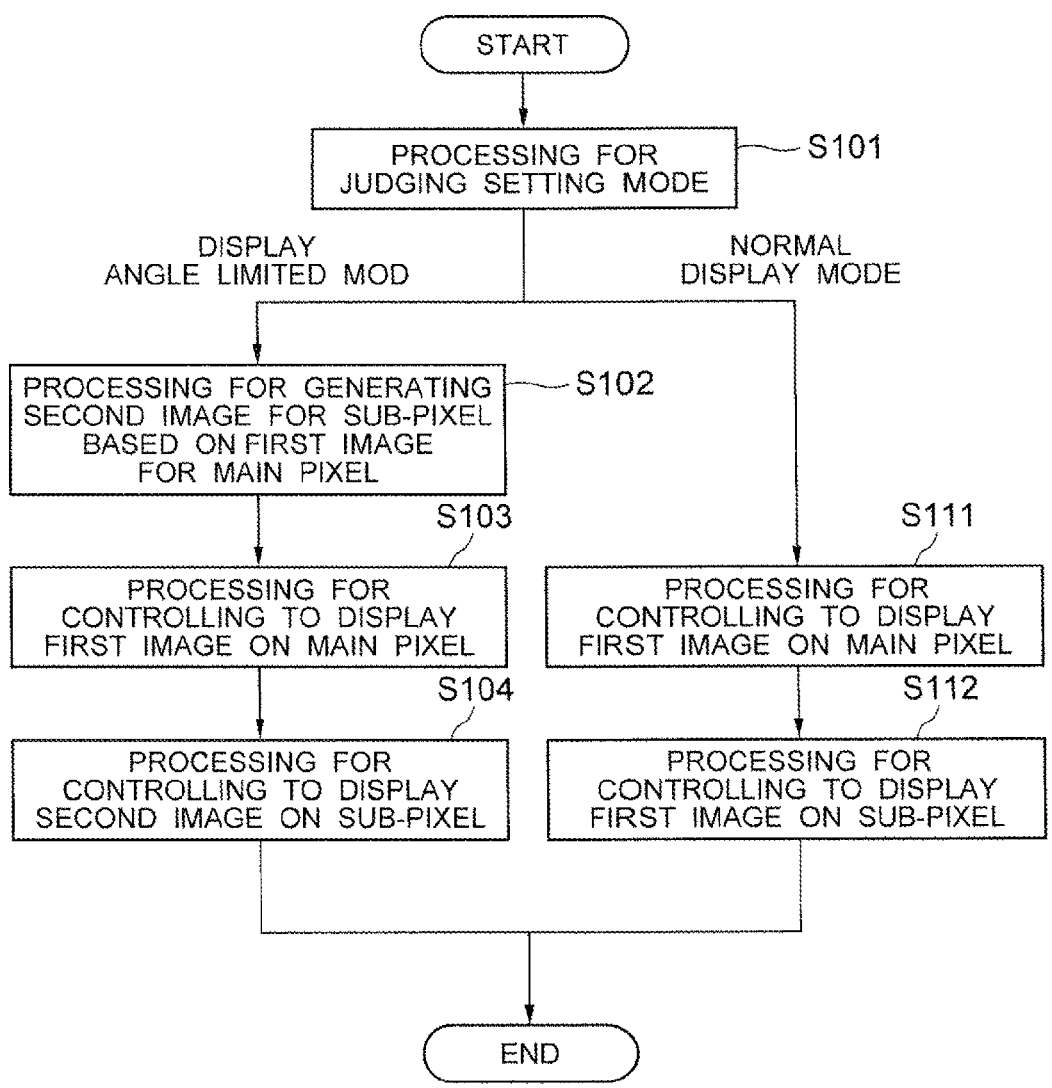
FIG. 36 is a flowchart showing an example of a processing procedure related to display control performed in the display control system according to the exemplary embodiment of the invention.

The processing of each part in the display control system structured as described above can be achieved also as a method. The various kinds of processing procedures as the display control method will be described by referring to FIG. 36. FIG. 36 is a flowchart showing an example of the processing procedure related to display controls performed in the display control system according to an exemplary embodiment of the present invention.

The display control method according to this exemplary embodiment can be directed to the processing executed by a computer that is provided to a controller which controls a display panel containing main pixels and sub-pixels.

As the basic structures, the display control method can include: a mode switching control step (step S101 shown in FIG. 36, for example) for switching the display angle limited mode which displays a first image on the main pixels and a second image on the sub-pixels and the normal display mode which displays the first image on the main pixels and the sub-pixels; display control steps for the display angle limited mode (steps configured with step S102-step S104 shown in FIG. 36, for example) for executing a control so as to display the first image and the second image in the first display area that is a part of the display unit configured with the main pixel and the sub-pixel, and to display the first image in the second display area that is a part of the display unit configured only with the main pixel in the display angle limited mode; and display control steps for the normal display mode (steps configured with step S102-step S104 shown in FIG. 36, for example) for executing a control so as to display the first image in the first display area that is a part of the display unit configured with the main pixel and the sub-pixel, and to display the first image also in the second display area that is a part of the display unit configured only with the main pixel in the normal display mode.

More specifically, first, as shown in FIG. 36, performed is control processing for judging the setting mode to find whether the controller (or the computer provided to the controller) is set to the "normal display mode" or the "display angle limited mode" (step S101: mode setting control step or mode setting control function).

Then, when it is judged in step S101 that the setting mode is the "display angle limited mode", the controller performs processing for generating the second image for the sub-pixels based on the first image (inputted image) for the main pixels (step S102: sub-pixel image generating processing step or sub-pixel image generating processing function).

While it is preferable for the second image to be the image in which the gradation is inverted from that of the first image as in the case of the above-described exemplary embodiments, it is not necessarily limited to be the gradation inverted image. For example, a dark color or black may be displayed as the second image.

Subsequently, the controller performs control processing for displaying the first image that is the input image on the main pixels (step S103: first mode main-pixel display control step or first mode main-pixel display control function).

Further, the controller performs control processing for displaying the second image on the sub-pixels (step S104: first mode sub-pixel display control step or first mode sub-pixel display control function).

In the meantime, when it is judged in step S101 that the setting mode is the "normal display mode", the controller performs control processing for displaying the first image that is inputted image on the main pixels (step S111: second mode main-pixel display control step or second mode main-pixel display control function).

Further, the controller performs control processing for displaying the first image on the sub-pixels (step S112: second mode sub-pixel display control step or second mode sub-pixel display control function).

Thereby, the first images are displayed on the main pixels and the sub-pixels, respectively, in the "normal display mode", and the first image is displayed on the main pixels and the second image is displayed on the sub-pixels in the "display angle limited mode".

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

(Display Control System 2)

Figure 37:
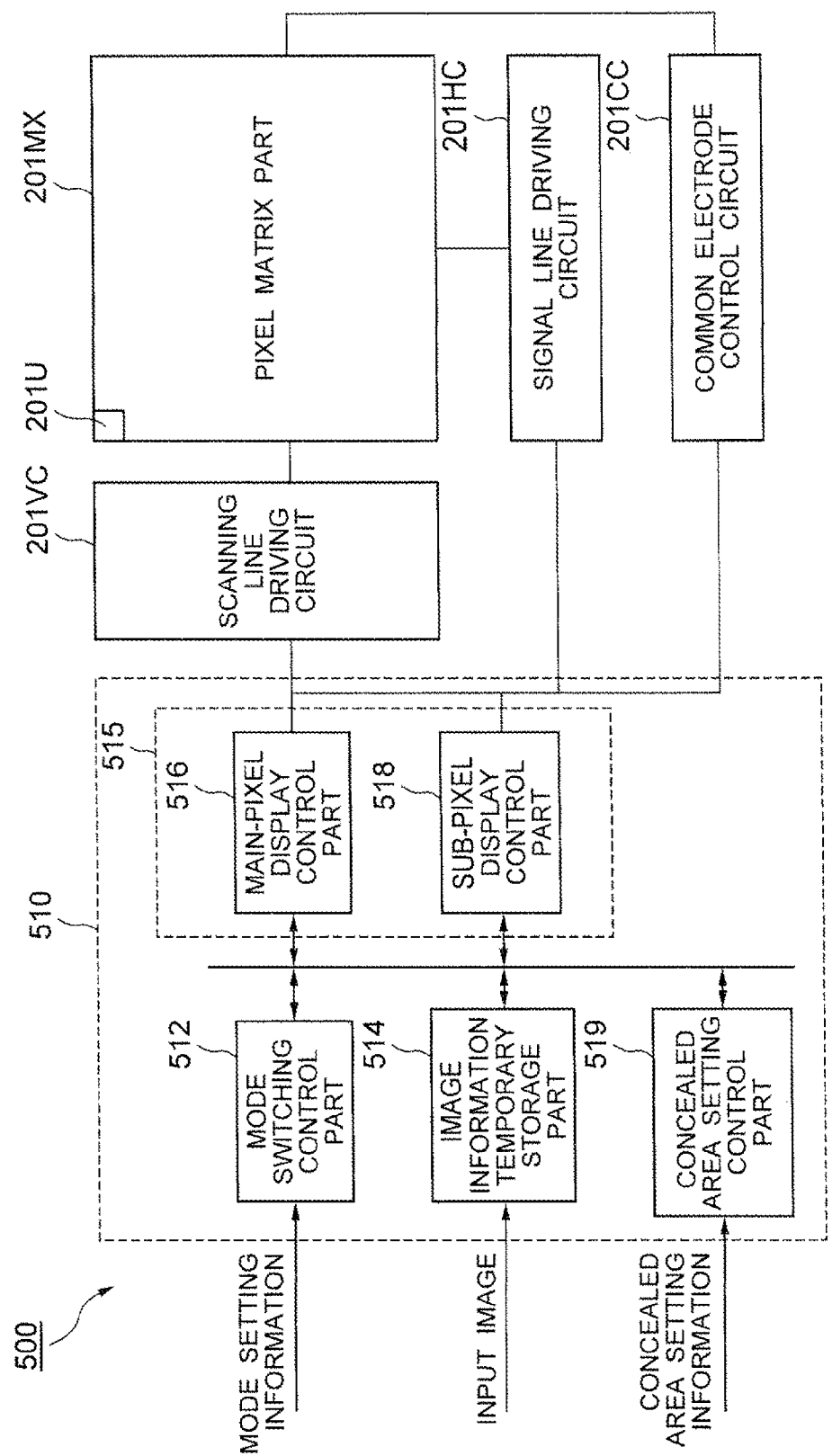
FIG. 37 is a block diagram showing an example of an overall schematic structure of a display control system according to an exemplary embodiment of the invention.

Further, the display devices according to each of the above-described exemplary embodiments can be used for a display control system 500 as shown in FIG. 37, for example. FIG. 37 is a block diagram showing an example of an overall schematic structure of the display control system according to an exemplary embodiment of the present invention.

In addition to the above-described structure of the exemplary embodiment (the display control system 1), the display control system 500 includes a concealed area setting control part 519 which can execute setting controls to display the first image for a specific viewing angle in the concealed area based on concealed area setting information that is set by a concealed area setting part.

Other structures such as a mode switching control part 512, an image information temporary storage part 514, and a main-pixel display control part 516 as well as a sub-pixel display control part 518 configuring a display control unit 515 can have the same functions as those of the above-described exemplary embodiment (the display control system 1).

The concealed area setting control part 519 operates when there is a signal received from the mode switching control part 512 indicating that it is the "display angle limited mode" and there is input of concealed area setting information.

Figure 39:
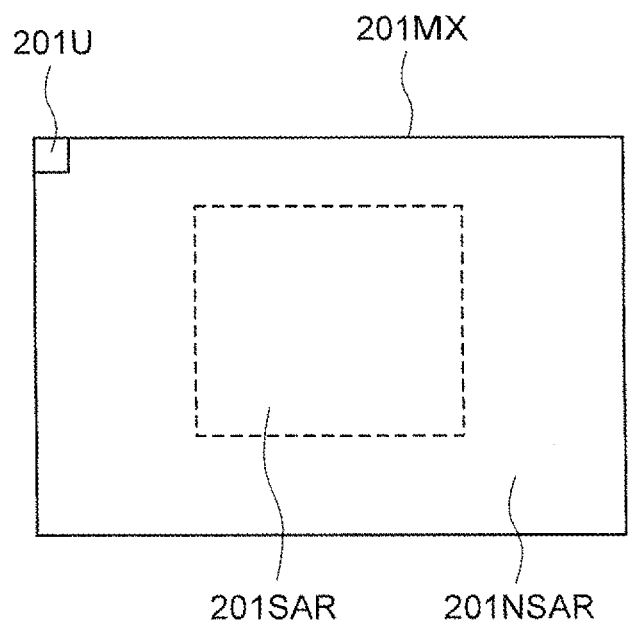
FIG. 39 is an explanatory diagram showing an example for describing a concealed area that is set by the display control system according to the exemplary embodiment of the invention.

Note here that the concealed area indicates a specific part area that is an arbitrary set area among the whole area of the display screen that is the pixel matrix part 201MX configured with a plurality of display units 201U, as in a concealed area 201SAR shown in FIG. 39, for example. The other area of the whole area of the display screen is an unconcealed area 201NSAR.

In a "concealed area setting mode" where the concealed area 201SAR is further set in the "normal display mode", the first image is displayed on the main pixels and the second image is displayed on the sub-pixels in the concealed area 201SAR, whereas the first image is displayed on the main pixels and the sub-pixels, respectively, in the unconcealed area 201NSAR.

Therefore, the concealed area setting part 519 gives an instruction to output the various kinds of main-pixel control signals from the main-pixel display control part 516 for displaying the first image on the main pixels.

Further, the concealed area setting control part 519 gives an instruction to output various kinds of third mode sub-pixel control signals from the sub-pixel display control part 518 for displaying the second image on the sub-pixels in the concealed area 201SAR and for displaying the first image on the sub-pixels in the unconcealed area 201NSAR.

This makes it possible to display the first image only for a specific viewing angle in the concealed area 201SAR.

(Display Control Procedure 2)

Figure 38:
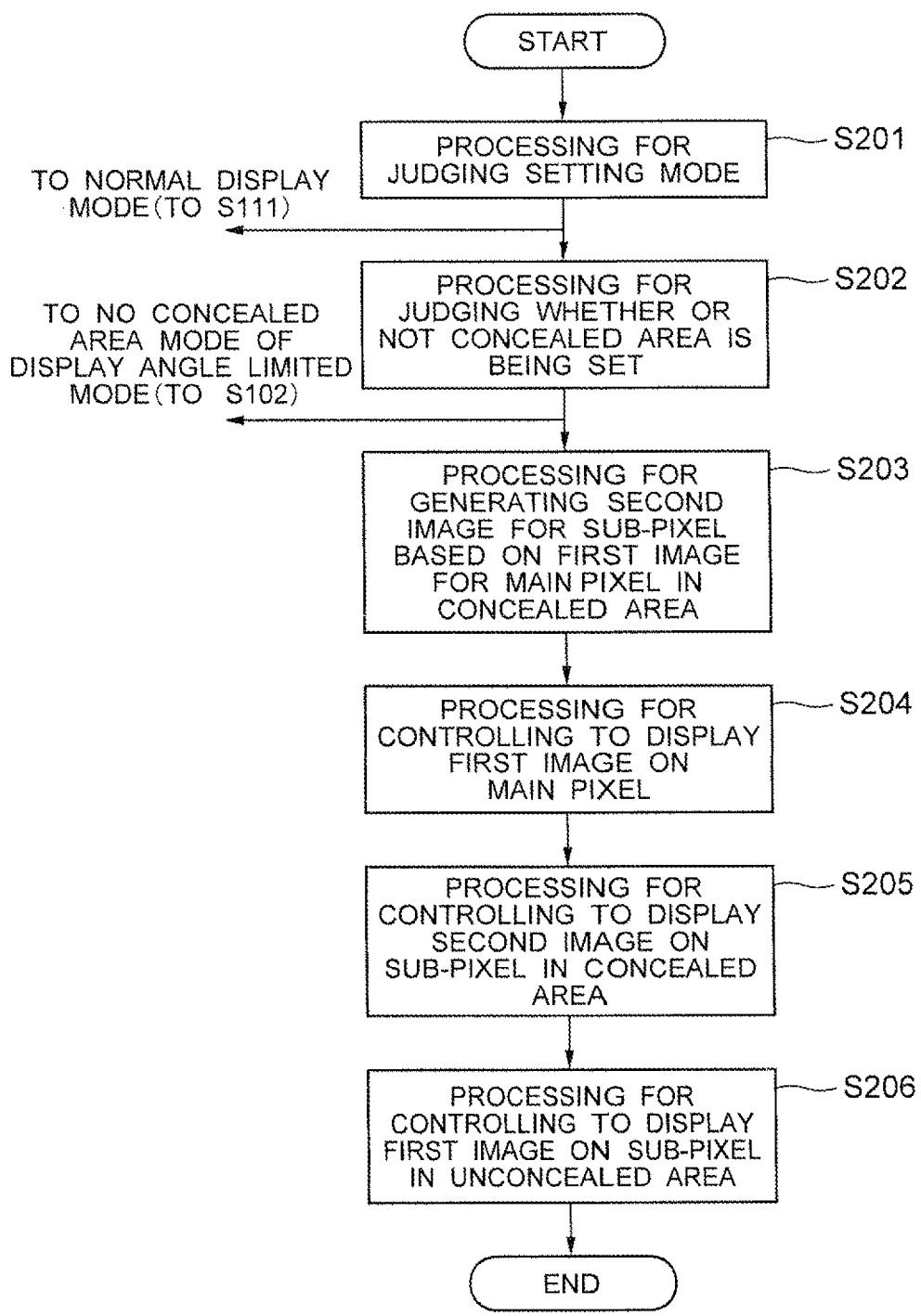
FIG. 38 is a flowchart showing an exemplar of a processing procedure related to display control performed in the display control system according to the exemplary embodiment of the invention.

The processing of each part in the display control system structured as described above can be achieved also as a method. The various kinds of processing procedures as the display control method will be described by referring to FIG. 38. FIG. 38 is a flowchart showing an example of the processing procedure related to display controls performed in the display control system according to an exemplary embodiment of the present invention.

The display control method according to this exemplary embodiment can be directed to the processing executed by a computer that is provided to a controller which controls a display panel containing main pixels and sub-pixels.

As the basic structures, the display control method can include: a mode switching control step (step S201 shown in FIG. 38, for example) for switching the display angle limited mode which displays a first image on the main pixels and a second image on the sub-pixels and the normal display mode which displays the first image on the main pixels and the sub-pixels; a concealed area setting control step (step S202 shown in FIG. 38, for example) which performs a control for judging an arbitrarily set concealed area; and display control steps for the concealed-area display angle limited mode (steps configured with step S202-step S206 shown in FIG. 38, for example) for executing a control so as to display the first image and the second image in the first display area that is a part of the display unit configured with the main pixel and the sub-pixel for the concealed area in the display angle limited mode, and to display the first image in the second display area that is a part of the display unit configured only with the main pixel in the display angle limited mode.

More specifically, first, as shown in FIG. 38, performed is control processing for judging the setting mode to find whether the controller (or the computer provided to the controller) is set to the "normal display mode" or the display angle limited mode" (step S201: mode setting control step or mode setting control function).

Then, when it is judged in step S201 that the setting mode is the "display angle limited mode", the controller further performs processing for judging whether or not the concealed area is being set (step S202: concealed area setting mode judging processing step or concealed area setting mode judging processing function).

In the meantime, when it is judged in step S201 that the setting mode is the "normal display mode", the processing of step S111 and thereafter of the display control procedure 1 is performed.

Subsequently, when it is judged in step S202 that the concealed area is not being set, it is judged as being "no concealed area mode" in the "display angle limited mode". Thus, there is performed the processing of step S102 and thereafter of the display control procedure 1.

In the meantime, when it is judged in step S202 that the concealed area is being set, it is judged as being "concealed area setting mode" in the "display angle limited mode". Thus, there is performed the processing for generating the second image for the sub-pixels based on the first image for the main pixels within the concealed area (step S203: concealed area sub-pixel image generating step or concealed area sub-pixel image generating processing function).

While it is preferable for the second image to be the image in which the gradation is inverted from that of the first image as in the case of the above-described exemplary embodiments, it is not necessarily limited to be the gradation inverted image. For example, a dark color or black may be displayed as the second image.

Subsequently, the controller performs control processing for displaying the first image that is the input image on the main pixels (step S204: third mode main-pixel display control step or third mode main-pixel display control function).

Further, the controller performs control processing for displaying the second image on the sub-pixels within the concealed area (step S205: concealed area sub-pixel display control step or concealed area sub-pixel display control function).

Furthermore, the controller performs control processing for displaying the first image on the sub-pixels within the concealed area (step S206: unconcealed area sub-pixel display control step or unconcealed area sub-pixel display control function).

With this, the first image is displayed on the main pixels and the second image is displayed on the sub-pixels in the concealed area, while the first image is displayed on the main pixels and the sub-pixels, respectively, in the unconcealed area.

Other structures and other steps as well as the functions and the operational effects thereof are the same as the case of the above-described first exemplary embodiment. Further, the operation contents of each of the above-described steps and the structural elements of each part as well as each function achieved thereby may be put into a program so as to be executed by a computer.

Further, the display devices according to each of the above-described exemplary embodiments can be used as display units of various kinds of electronic appliances. In the above-described embodiments, a portable telephone is illustrated as the electronic device and the terminal device. However, the present invention is not limited only to such case.

As the examples of the electronic appliances, the present invention can be preferably applied not only to the portable telephones but also to various kinds of portable terminal devices such as PDAs (Personal Digital Assistants: personal information terminals), game machines, digital cameras, and digital videos. Furthermore, the present invention can be applied not only to the portable terminal devices but also to various kinds of terminal devices such as notebook-type personal computers, cash dispensers, and vending machines.

Further, the electronic appliances may include broadcast receiving devices such as television sets, various kinds of information processors such as computers, remote controllers of various kinds of devices, household appliances to which various kinds of information communicating functions are loaded, and various kinds of electric products such as portable music players, various kinds of recording devices, car navigations devices, pagers, electronic notebooks, calculators, word processors, POS terminals, wearable information terminals, PNDs, and PMPs.

Each of the above-described exemplary embodiments may be executed alone or may be executed in combination as appropriate.

Further, the display device according to an exemplary embodiment of the present invention can have: a display part in which a plurality of display units each containing a main pixel for displaying a first image and a sub-pixel for displaying a second image are arranged in matrix in a first direction and a second direction that crosses with the first direction; and an optical member provided by being corresponded to each of the display units for distributing light emitted from the display units to different directions at least along the first direction, wherein a display area of the display unit includes a first display area in which the main pixel and the sub-pixel are formed in the second direction, and include a second display area in which only the main pixel is formed in the second direction.

In this case, the display unit can be formed in such a manner that length of the main pixel in the second direction in the first display area becomes equivalent to length of the sub-pixel in the second direction. Furthermore, the display unit can be formed in such a manner that a total value of length of the main pixel in the second direction in the first display area and length of the sub-pixel in the second direction becomes equivalent to length of the main pixel in the second direction in the second display area.

Further, the display unit can have a structure in which the main pixel is formed in a flat T-letter shape that is extended in the second direction, and the sub-pixel is disposed, respectively, on both sides of the longitudinal-bar part of the flat T-letter shape.

Furthermore, the display unit can have a structure in which the main pixel is formed in a flat "Π" shape that is a shape where a plurality of longitudinal-bar parts extending in the second direction are arranged in the first direction, and the sub-pixel is disposed, respectively, on sides of each longitudinal-bar part of the flat "Π" shape.

Moreover, the display unit can be formed in such a manner that the main pixel and the sub-pixel overlap with each other partially, and can be formed in a wormhole figure in which the sub-pixel eats into the main pixel.

Further, provided that an image formed on an observing plane by first light among light emitted from each of the display units, which passes through a part corresponding to each of the display unit and emits therefrom, is a main robe and an image formed on the observing plane by second light that is different from the first light is a side robe, the optical member can be formed to separate light from the main pixel to form either the main robe or the side robe.

Furthermore, the optical member can be configured with a lenticular lens in which cylindrical lenses are arranged by corresponding to each of the display units arranged at least along the first direction.

Moreover, the optical member can be configured with a parallax barrier in which a large number of apertures extended along the second direction are arranged by corresponding to each of the display units arranged at least along the first direction.

Further, the optical member can be configured with two parallax barriers each having a large number of slits extending along the second direction, which are stacked by having positions of each of the slits in the first direction different from each other.

Furthermore, the display unit can be display-controlled to be capable of switching a display angle limited mode which displays the second image that is different from the first image and a normal display mode which displays the second image that is the same image as the first image.

Further, the display device according to an exemplary embodiment of the present invention can have: a display part in which a plurality of display units each containing a main pixel for displaying a first image and a sub-pixel for displaying a second image are arranged in matrix in a first direction and a second direction that crosses with the first direction; and an optical member provided by being corresponded to each of the display units for distributing light emitted from the display units to different direction at least along the first direction. When a segment extended along a second direction that is orthogonal to the first direction on the display surface crosses with the sub-pixel, the segment also crosses with the main pixel. Further, there may also be a case where the segment crosses only with the main pixel.

In this display device, it is possible to achieve such layout that the sub-pixel is not separated from the main pixel and observed by itself by the use of the optical member. Thus, the use of the sub-pixels makes it possible to prevent the display on the main pixels from being visually recognized from the directions other than a specific direction. That is, the display device can be so configured that only the display on the main pixels are visually recognized from the specific direction, and the display on the main pixels and the display on the sub-pixel are visually recognized in a mixed manner from the other directions. Thus, the visibility of the display on the main pixels can be greatly deteriorated for the directions other than the specific direction, which makes it possible to achieve a confidentiality keeping mode. Further, through displaying same images on the main pixels and the sub-pixels, it becomes possible to achieve a normal display mode with which the same display can be visually recognized in a range of wide angles. As described, it is possible to switch the confidentiality keeping mode and the normal display mode by simply changing the display contents, so that this switching can be done by each display unit. Further, since the optical member can be simplified, manufacture thereof becomes easy. Therefore, the reliability can be improved.

Further, regarding the length of the segment that extends in the second direction and crosses with the sub-pixel and the main pixel, it is preferable for the length of the segment crossing with the sub-pixel to be substantially equivalent to the length of the segment crossing with the main pixel. With this, the effect for deteriorating the visibility of the main pixel by the sub-pixel can be improved, so that the excellent confidentiality keeping performance can be achieved.

Further, regarding the length of the segment that extends in the second direction and crosses with the sub-pixel and the main pixel, it is preferable for a total value of the length of the segment crossing with the sub-pixel and the length of the segment crossing with the main pixel to be substantially equivalent to the length of the segment that crosses only with the main pixel.

With this, the luminance in the specific direction and that of the other directions can be made equal, so that an uncomfortable feeling felt by the user particularly in the normal display mode can be eased.

Further, it is also possible that the main pixel is formed in a T-letter shape having a longitudinal-bar part extended in the second direction, the sub-pixel is formed in two rectangles, and the rectangular sub-pixels are arranged neighboring to the longitudinal-bar part in the first direction. This makes it easy to arrange each pixel, so that a high effect can be achieved with a simple structure.

Furthermore, it is also possible that the main pixel is formed in a "Π" shape in which two T-letter shapes each having a longitudinal-bar part extended in the second direction are arranged, the sub-pixel is formed in three rectangles, and the rectangular sub-pixels are arranged neighboring to the longitudinal-bar parts in the first direction.

With this, the images of the longitudinal-bar parts of the "Π" shaped display area of the main pixel can be set for the both eyes of the user located in the front-face direction, so that the user can separately observe only the main pixels. In the locations other than the positions of the both eyes, the main pixels and the sub-pixels are observed in a mixed manner, so that confidential information cannot be visually recognized therefrom. In this manner, a confidentiality keeping action can be achieved. Further, the confidential information is displayed for the positions of the both eyes of the user with this exemplary embodiment, so that it is possible to decrease the probability of having peeping attempts compared to that of the above-described first exemplary embodiment. Furthermore, the area where the main pixels can be observed can be set to fit the both eyes (left and right eyes) of the observer, and it is possible to give a margin to the width of that area. This makes it is possible to deal with the individual differences of the distances between both eyes, so that the visibility can be improved while reducing the probability of having the peeping attempts.

Furthermore, the sub-pixel may be formed in a wormhole figure with a large number of wormholes. With this, the image quality can be improved in particular, when the pitch of the display units is large so that the resolution of the display panel is low.

In a display device according to an exemplary embodiment of the present invention, provided that an image formed on an observing plane by light that exits from each of the display units and passes through an optical member corresponding to each display unit is a main robe and an image formed on the observing plane by other light is a side robe, the optical member can separate light from the main pixel in either the main robe or the side robe.

With this display device, the effect for separating the light of the main pixel and the sub-pixel can be achieved only for the specific direction, thereby making it possible to improve the performance of the confidentiality keeping mode. Further, by using this display device in combination with the pixel structure of the display device according to the first exemplary embodiment of the present invention, it is possible to clarify the boundary between the separation display for the specific direction and the mixed display for the other directions.

Furthermore, the optical member may be a lenticular lens in which a large number of cylindrical lenses are arranged by corresponding to each of the display units. This makes it possible to provide bright displays without having optical loss. Further, it is possible to achieve a two-dimensional display mode switching effect by using the lenticular lens that is an optical member with one-dimensional layout. That is, the switching effect can be achieved not only for the arranging direction of the cylindrical lenses but also for the orthogonal direction thereof within the display surface.

Further, provided that the main pixel is formed in a T-letter shape having a longitudinal-bar part extended in the second direction, the sub-pixel is formed in two rectangles, the rectangular sub-pixels are arranged neighboring to the longitudinal-bar part in the first direction, the pitch of the display units is P, the pitch of the cylindrical lenses of the lenticular lens is L, the refractive index of the lens is n, the distance between the principle point of the cylindrical lens and the display unit is H, and the cycle of the enlarged projection images of the display units at the observing distance OD is e, it is preferable for the width P1 of the longitudinal-bar part in the first direction to satisfy following Expressions 46 and 47.

$$P1 \leq (P \times L/e/I) \times (\sqrt{(OD^2+e^2)}-I) \quad \text{(Expression 46)}$$

$$I = 1/(n/\sqrt{(H^2+P^2)}-(n-1)/r) \quad \text{(Expression 47)}$$

Thereby, it becomes possible to prevent the main pixels from being fully recognized from the directions other than the specific direction when using the main pixel having the T-letter shaped display area and the sub-pixel having the two rectangular display areas. Therefore, peeing attempts can be prevented completely.

Furthermore, provided that the main pixel is formed in a "Π" shape in which two T-letter shapes each having a longitudinal-bar part extended in the second direction are arranged, the sub-pixel is formed in three rectangles, the rectangular sub-pixels are arranged neighboring to the longitudinal-bar parts in the first direction, the pitch of the display units is P, the pitch of the cylindrical lenses of the lenticular lens is L, the refractive index of the lens is n, the distance between the principle point of the cylindrical lens and the display unit is H, and the cycle of the enlarged projection images of the display units at the observing distance OD is e, it is preferable for the width P1 of the longitudinal-bar part in the first direction and the pitch P1S of the longitudinal-part in the first direction to satisfy following Expressions 48 and 49.

$$P1S \leq (P \times L/e/I) \times (\sqrt{(OD^2+((P-(P1P+P1S)/2) \times e/P)^2)}-I) \quad \text{(Expression 48)}$$

$$I = 1/(n/\sqrt{(H^2+(P-(P1P+P1S)/2)^2)}-(n-1)/r) \quad \text{(Expression 49)}$$

Thereby, it becomes possible to prevent the main pixels from being fully recognized from the directions other than the specific direction, when using the main pixel having the "Π" shaped display area and the sub-pixel having the three rectangular display areas. Therefore, peeing attempts can be prevented completely.

Further, the optical member may be a parallax barrier in which a large number of limited apertures are formed by corresponding to each of the display units. This makes it possible to lower the cost.

Furthermore, the parallax barrier may have a large number of slits in addition to the limited number of apertures, and two of the parallax barriers with different slit positions may be stacked. With this, the image separating effect for the oblique directions can be decreased further, so that the confidentiality keeping effect of the present invention can be improved further.

A display device according to an exemplary embodiment of the present invention can display an image whose gradation is inverted from that of the first image as the second image.

With this display device, the use of inverted images can cancel the displays for the directions other than the specific direction in the confidentiality keeping mode, thereby making it possible to prevent the peeping attempts. Further, the inverted image can be generated relatively easily, and the contrast of the display to be peeped can be deteriorated greatly. Therefore, the effect thereof is remarkable.

It is a feature of a terminal device according to an exemplary embodiment of the present invention to have one of the above-described display devices. This terminal device may be a portable telephone, a PDA, a game machine, a digital camera, a video camera, a video player, a notebook-type personal computer, a cash dispenser, or a vending machine.

An optical member according to an exemplary embodiment of the present invention is formed with a plurality of parallax barriers each having a large number of limited apertures and a large number of slits formed between the limited apertures, and it can be structured in such a manner that the positions of the limited apertures in each of the parallax barriers substantially coincide with each other, and the positions of the slits become different from each other.

Through combining this optical member with the display device, it is possible to decrease the image separating effect for the oblique directions. Therefore, the display device with an improved confidentiality keeping effect can be achieved at a low cost with a simple structure.

Further, the display panel according to an exemplary embodiment of the present invention can have a display part in which a plurality of display units each containing a main pixel for displaying a first image and a sub-pixel for displaying a second image are arranged in matrix in a first direction and a second direction that crosses with the first direction. When a segment extended along a second direction that is orthogonal to the first direction on the display surface crosses with the sub-pixel, the segment also crosses with the main pixel. Further, there may also be a case where the segment crosses only with the main pixel.

In this display panel, it is possible to prevent the display on the main pixels from being visually recognized from the directions other than a specific direction by using the sub-pixels, through having the optical member that distributes light emitted from each pixel along the first direction arranged by corresponding to each of the display units. Further, through displaying same images on the main pixels and the sub-pixels, it becomes possible to achieve a normal display mode with which the same display can be visually recognized in a range of wide angles. As described, the confidentiality keeping mode and the normal display mode can be switched by simply changing the display contents, so that this switching can be done by each display unit. Further, since the optical member can be simplified, manufacture thereof becomes easy. Therefore, the reliability can be improved.

Further, regarding the length of the segment that extends in the second direction and crosses with the sub-pixel and the main pixel, it is preferable for the length of the segment crossing with the sub-pixel to be substantially equivalent to the length of the segment crossing with the main pixel.

Further, regarding the length of the segment that extends in the second direction and crosses with the sub-pixel and the main pixel, it is preferable for a total value of the length of the segment crossing with the sub-pixel and the length of the segment crossing with the main pixel to be substantially equivalent to the length of the segment that crosses only with the main pixel.

Further, it is also possible that the main pixel is formed in a T-letter shape having a longitudinal-bar part extended in the second direction, the sub-pixel is formed in two rectangles, and the rectangular sub-pixels are arranged neighboring to the longitudinal-bar part in the first direction.

Furthermore, it is also possible that the main pixel is formed in a "Π" shape in which two T-letter shapes each having a longitudinal-bar part extended in the second direction are arranged, the sub-pixel is formed in three rectangles, and the rectangular sub-pixels are arranged neighboring to the longitudinal-bar parts in the first direction.

Further, the sub-pixel may be formed in a wormhole figure having a large number of wormholes.

Further, a display device driving control method according to an exemplary embodiment of the present invention is a driving control method of a display device that has: a display part in which a plurality of display units each containing a main pixel for displaying a first image and a sub-pixel for displaying a second image are arranged in matrix in a first direction and a second direction that crosses with the first direction; and an optical member provided by being corresponded to each of the display units for distributing light emitted from the display units to different direction at least along the first direction. When a segment extended along a second direction that is orthogonal to the first direction on the display surface crosses with the sub-pixel, the segment also crosses with the main pixel. Further, there may also be a case where the segment crosses only with the main pixel. With the display device driving control method, the polarity inversion of each pixel can be executed so that the pixels configuring each display unit come to be in a same polarity.

With this display device driving control method, the polarity of the display for the vicinity of the front-face direction and the polarity of the display for the range of the other angles can be made uniform particularly in the normal display mode by making the polarities of the pixels be the same in each of the display units. Therefore, a high image quality can be achieved. Further, when displaying inverted information of the main pixel on the sub-pixel, the method makes it possible to increase the leveling effect in the mixed display and to improve the confidentiality keeping performance.

Further, a display device driving control method according to an exemplary embodiment of the present invention is a driving control method of a display device that has: a display part in which a plurality of display units each containing a main pixel for displaying a first image and a sub-pixel for displaying a second image are arranged in matrix in a first direction and a second direction that crosses with the first direction; and an optical member provided by being corresponded to each of the display units for distributing light emitted from the display units to different direction at least along the first direction. When a segment extended along a second direction that is orthogonal to the first direction on the display surface crosses with the sub-pixel, the segment also crosses with the main pixel. Further, there may also be a case where the segment crosses only with the main pixel. Each of the pixels in the display device has a pixel electrode and a common electrode, and a switching element for transmitting video signals to the pixel electrode, a scanning line for controlling the switching element, and a signal line for supplying the video signals are provided. With the driving control method of such display device, only one of the potentials of the video signal and the common electrode in the sub-pixel is inverted so as to generate a gradation inverted image for the sub-pixel.

The driving control method of the display device can easily generate the gradation inverted image by utilizing the polarity inversion action without using a special circuit. Therefore, the cost can be lowered.

Further, a display device driving control method according to an exemplary embodiment of the present invention is a driving control method of a display device that has: a display part in which a plurality of display units each containing a main pixel for displaying a first image and a sub-pixel for displaying a second image are arranged in matrix in a first direction and a second direction that crosses with the first direction; and an optical member provided by being corresponded to each of the display units for distributing light emitted from the display units to different direction at least along the first direction. When a segment extended along a second direction that is orthogonal to the first direction on the display surface crosses with the sub-pixel, the segment also crosses with the main pixel. Further, there may also be a case where the segment crosses only with the main pixel. Each of the pixels in the display device has a pixel electrode and a common electrode, and a switching element for transmitting video signals to the pixel electrode, a scanning line for controlling the switching element, and a signal line for supplying the video signals are provided. In each of the display units, the switching elements of each of the pixels are connected to a single signal line, and the main pixel has a common electrode which is different from that of the sub-pixel. With the driving control method of such display device, the polarity of the common electrode of the main pixel and the polarity of the common electrode of the sub-pixel are changed so as to generate a gradation inverted image for the sub-pixel.

With the driving control method of the display device, it is possible to change the mode from the normal display mode to the confidentiality keeping mode by a simple operation such as inverting the polarity of the common electrode. Further, each of the display units can be controlled by a pair of scanning line/signal line. This makes it possible to reduce the number of scanning lines so that the writing time in each scanning line can be secured. Moreover, this is also advantageous when increasing the number of display units.

Further, a display device driving control method according to an exemplary embodiment of the present invention is a driving control method of a display device that has: a display part in which a plurality of display units each containing a main pixel for displaying a first image and a sub-pixel for displaying a second image are arranged in matrix in a first direction and a second direction that crosses with the first direction; and an optical member provided by being corresponded to each of the display units for distributing light emitted from the display units to different direction at least along the first direction. When a segment extended along a second direction that is orthogonal to the first direction on the display surface crosses with the sub-pixel, the segment also crosses with the main pixel. Further, there may also be a case where the segment crosses only with the main pixel. Each of the pixels of the display device has a pixel electrode and a common electrode, and the pixel electrode of the main pixel and the pixel electrode of the sub-pixel are stacked at least partially. With the driving control method of such display device, the polarities of each of the pixels are inverted so that the pixels configuring each display unit come to be in a different polarity from each other.

The driving control method of the display device is capable of canceling the coupling of the main pixel and the sub-pixel, and it is possible to deal with a case where 0 V needs to be applied between the pixel electrode and the common electrode. Particularly, the method can be preferably used for a normally-black mode display panel, in which whitening of the black display can be prevented to suppress deterioration of the contrast ratio. That is, the use of the above-described driving method can improve the display quality.

(Program)

Note here that various kinds of driving circuits and controllers can be included in the control unit for controlling the display panel. In that case, each part configuring the control unit may be considered as a computer that is functionalized by a program described along with the function of the program or may be considered as a device configured with a plurality of electronic circuit blocks permanently functionalized by specific hardware. These functional blocks can be achieved by hardware alone, software alone, or combinations of those, and no specific limit set for the form thereof.

Further, when the programmable part is put into a control program, the software program of the present invention for achieving the functions of the control procedures of the above-described exemplary embodiments includes: each processing program that is processed by a program corresponding to each part, function, and the like shown in each of the drawings of each of the exemplary embodiments described above, processed by a program and the like corresponding to the procedures, functions, and the like shown in the timing charts and the like; and the entire part or each part of the method depicted through this specification, the processing described herein, and the data.

Specifically, with an exemplary embodiment of the control program of the present invention, it is possible to allow a computer that is provided to a controller which controls a display panel containing main pixels and sub-pixels to achieve various functions. The display control program can allow the computer to achieve the functions, including: a mode switching control function (function achieved by step S101 shown in FIG. 36, for example) for switching the display angle limited mode which displays a first image on the main pixels and a second image on the sub-pixels and the normal display mode which displays the first image on the main pixels and the sub-pixels; and a display control function (function achieved by steps configured with step S102-step S104 shown in FIG. 36, for example) for executing a control so as to display the first image and the second image in the first display area that is a part of the display unit configured with the main pixel and the sub-pixel, and to display the first image in the second display area that is a part of the display unit configured only with the main pixel in the display angle limited mode.

Further, with an exemplary embodiment of the control program of the present invention, it is possible to allow a computer to execute a concealed area setting control function (function achieved by step S201 shown in FIG. 38, for example) which performs a control for judging an arbitrarily set concealed area. In that case, the control program can allow the computer to execute functions including a display control function (function achieved by steps configured with step S203-step S206 shown in FIG. 38, for example) for executing a control so as to display the first image and the second image in the first display area that is a part of the display unit configured with the main pixel and the sub-pixel for the concealed area in the display angle limited mode, and to display the first image in the second display area that is a part of the display unit configured only with the main pixel.

With the program of the present invention, the above-described device according to the present invention can be achieved relatively easily by having the control program loaded from a storage medium such as a ROM to which the control program is stored and having it executed by the computer (CPU). When it is formed as software of the device as an example of the embodiment of the technical spirit of the present invention, there naturally exits a storage medium to which the software is stored.

Further, the driving control method and the display control method are not necessarily limited to be used for a specific device. It is to be easily understood that those can function as the methods. Accordingly, the present invention regarding the methods is not necessarily limited to any specific devices, but may be effective as the methods.

Each of such display device, display panel, and optical member may exist by itself or each may be utilized while being mounted into a certain device. The technical spirit of the present invention is not intended to be limited to such cases, but to include various kinds of forms.

Furthermore, the scope of the present invention is not limited to the examples shown in the drawings.

Moreover, each of the exemplary embodiments includes various stages, and various kinds of inventions can be derived therefrom by properly combining a plurality of feature elements disclosed therein. That is, the present invention includes combinations of each of the above-described exemplary embodiments or combinations of any of the exemplary embodiments and any of the modifications examples thereof. In that case, even though it is not specifically mentioned in the exemplary embodiments, the operational effects that are obvious from each structure disclosed in each of the exemplary embodiments and the modification examples thereof can naturally be included as the operational effects of the exemplary embodiments. Inversely, the structures that can provide all the operational effects depicted in the exemplary embodiments are not necessarily the essential feature elements of the substantial feature parts of the present invention. Furthermore, the present invention can include structures of other exemplary embodiments in which some of the feature elements are omitted from the entire feature elements of the above-described exemplary embodiments, as well as the technical scope of the structures based thereupon.

The descriptions regarding each of the exemplary embodiments including the modification examples thereof are presented merely as examples of various embodiments of the present invention (i.e., examples of concretive cases for embodying the present invention) for implementing easy understanding of the present invention. It is to be understood that those exemplary embodiments and the modification examples thereof are illustrative examples, and not intended to set any limitations therewith. The present invention can be modified and/or changed as appropriate. Further, the present invention can be embodied in various forms based upon the technical spirit or the main features thereof, and the technical scope of the present invention is not to be limited by the exemplary embodiments and the modification examples.

Therefore, each element disclosed above is to include all the possible design changes and the equivalents that fall within the technical scope of the present invention.

Industrial Applicability

The present invention can be applied to display devices in general.

What is claimed is:

1. A display device, comprising:
 a display part in which a plurality of display units each containing a main pixel for displaying a first image and a sub-pixel for displaying a second image are arranged in matrix in a first direction and a second direction that crosses with the first direction; and
 a lenticular lens provided by being corresponded to each of the display units for distributing light emitted from the display units to different directions at least along the first direction,
 wherein a value of a pitch of each of the display units in the first direction is substantially the same as a value of a pitch of the lenticular lens in the first direction,
 wherein an end of each of the display units is substantially aligned with a lens end of the lenticular lens in the first direction,
 wherein the display unit has a structure in which the main pixel has a flat T-letter shape, a lateral-bar part of the flat T-letter shape is parallel to the first direction, and the sub-pixel is disposed, respectively, on both sides of longitudinal-bar part of the flat T-letter shape,
 wherein a display area of the display unit includes a first display area in which the main pixel and the sub-pixel are formed in the second direction, and
 a second display area in which only the main pixel is formed in the second direction, and
 wherein the display unit includes the first display area, the second display area and the first display area in that order from an end in parallel to the first direction.

2. An electronic appliance comprising the display device claimed in claim 1.

3. A display device, comprising:
 a display part in which a plurality of display units each containing a main pixel for displaying a first image and a sub-pixel for displaying a second image are arranged in matrix in a first direction and a second direction that crosses with the first direction; and
 a lenticular lens provided by being corresponded to each of the display units for distributing light emitted from the display units to different directions at least along the first direction,
 wherein a value of a pitch of each of the display units in the first direction is substantially the same as a value of a pitch of the lenticular lens in the first direction,
 wherein an end of each of the display units is substantially aligned with a lens end of the lenticular lens in the first direction,
 wherein the display unit has a structure in which the main pixel has a flat "Π" shape, a lateral-bar part of the flat "Π" shape is parallel to the first direction, and the sub-pixel is disposed respectively on both sides of longitudinal-bar parts of the flat "Π" shape,
 wherein a display area of the display unit includes a first display area in which the main pixel and the sub-pixel are formed in the second direction, and
 a second display area in which only the main pixel is formed in the second direction,
 wherein the display unit includes the first display area, the second display area, the first display area, the second display area, and the first display area in that order from an end in parallel to the first direction, and
 wherein a pitch of an enlarged projection image of the longitudinal-bar part of the "Π" shaped display area is set by corresponding to a distance between both eyes of an observer.

4. An electronic appliance comprising the display device claimed in claim 3.

5. A display device, comprising:
 a display part in which a plurality of display units each containing a main pixel for displaying a first image and a sub-pixel for displaying a second image are arranged in matrix in a first direction and a second direction that crosses with the first direction; and
 a lenticular lens provided by being corresponded to each of the display units for distributing light omitted from the display units to different directions at least along the first direction,
 wherein a value of a pitch of each of the display units in the first direction is substantially the same as a value of a pitch of the lenticular lens in the first direction,
 wherein an end of each of the display units is substantially aligned with a lens end of the lenticular lens in the first direction,
 wherein the display unit has a structure in which the main pixel has a flat T-letter shape, a lateral-bar part of the flat T -letter shape is parallel to the first direction, wherein a display area of the display unit includes a first display area in which the main pixel and the sub-pixel are formed in the second direction, and a second display area in which only the main pixel is formed in the second direction, wherein the display unit includes the first display area, the second display area, and the first display area in that order from an end in parallel to the first direction, and wherein a longitudinal-bar part of the flat T-letter shape is tilted from the second direction, the sub-pixel is disposed, respectively, on both sides of the longitudinal-bar part of the flat T-letter shape, and a boundary between the first display range and the second display range is gradually changed through having sides of the sub-pixel neighboring the longitudinal-bar part is tilted from the second direction.

6. An electronic appliance comprising the display device claimed in claim 5.

7. A display device, comprising:

a display part in which a plurality of display units each containing a main pixel for displaying a first image and a sub-pixel for displaying a second image are arranged in matrix in a first direction and a second direction that crosses with the first direction; and a lenticular lens provided by being corresponded to each of the display units for distributing light emitted from the display units to different directions at least along the first direction, wherein a value of a pitch of each of the display units in the first direction is substantially the same as a value of a pitch of the lenticular lens in the first direction, wherein an end of each of the display units is substantially aligned with a lens end of the lenticular lens in the first direction, wherein a display area of the display unit includes a first display area in which the main pixel and the sub-pixel are formed in the second direction, and a second display area in which only the main pixel is formed in the second direction, wherein the display area of the display unit includes the first display area, the second display area, and the first display area in that order in the first direction, wherein at one side of the first display area near the second display area, a boundary between the main pixel and the sub-pixel has meandering shape, and the main pixel from which the longitudinal-bar part is eliminated and the sub-pixel are mixed in a fine manner, and wherein the display unit includes the first display area, the second display area, and the first display area in that order from an end in parallel to the first direction.

8. An electronic appliance comprising the display device claimed in claim 7.

9. A display device, comprising:

a display part in which a plurality of display units each containing a main pixel for displaying a first image and a sub-pixel for displaying a second image are arranged in matrix in a first direction and a second direction that crosses with the first direction; and a parallax barrier provided by being corresponded to each of the display units for distributing light emitted from the display units to different directions at least along the first direction, wherein a value of a pitch of each of the display units in the first direction is substantially the same as a value of an arranging pitch of a slit of the parallax barrier in the first direction, wherein a center part of each of the display units in the first direction is substantially aligned with a center part of the slit in the first direction, wherein the display unit has a structure in which the main pixel has a flat T-letter shape, a lateral-bar part of the flat T-letter shape is parallel to the first direction, and the sub-pixel is disposed, respectively, on both sides of longitudinal-bar part of the flat T-letter shape, wherein a display area of the display unit includes a first display area in which the main pixel and the sub-pixel are formed in the second direction, and a second display area in which only the main pixel is formed in the second direction, and wherein the display unit includes the first display area, the second display area, and the first display area in that order from an end in parallel to the first direction.

10. An electronic appliance comprising the display device claimed in claim 9.

11. A display device, comprising:

a display part in which a plurality of display units each containing a main pixel for displaying a first image and a sub-pixel for displaying a second image are arranged in matrix in a first direction and a second direction that crosses with the first direction; and a parallax barrier provided by being corresponded to each of the display units for distributing light emitted from the display units to different directions at least along the first direction, wherein a value of a pitch of each of the display units in the first direction is substantially the same as a value of all arranging pitch of a slit of the parallax barrier in the first direction, wherein a center part of each of the display units in the first direction is substantially aligned with a center part of the slit in the first direction, wherein the display unit has a structure in which the main pixel has a flat "Π" shape, a lateral-bar part of the flat "Π" shape is parallel to the first direction, and the sub-pixel is disposed respectively on both sides of longitudinal bar parts of the flat "Π" shape, wherein a display area of the display unit includes a first display area in which the main pixel and the sub-pixel are formed in the second direction, and a second display area in which only the main pixel is formed in the second direction, wherein the display unit includes the first display area, the second display area, the first display area, the second display area, and the first display area in that order from an end in parallel to the first direction, and wherein a pitch of an enlarged projection image of the longitudinal-bar part of the "Π" shaped display area is set by corresponding to a distance between both eyes of an observer.

12. An electronic appliance comprising the display device claimed in claim 10.

13. A display device, comprising:

a display part in which a plurality of display units each containing a main pixel for displaying a first image and a sub-pixel for displaying a second image are arranged in matrix in a first direction and a second direction that crosses with the first direction; and a parallax barrier provided by being corresponded to each of the display units for distributing light emitted from the display units to different directions at least along the first direction, wherein a value of a pitch of each of the display units in the first direction is substantially the same as a value of an arranging pitch of a slit of the parallax barrier in the first direction, wherein a center part of each of the display units in the first direction is substantially aligned with a center part of the slit in the first direction, wherein the display unit has a structure in which the main pixel has a flat T-letter shape, a lateral-bar part of the flat T-letter shape is parallel to the first direction, wherein a display area of the display unit includes a first display area in which the main pixel and the sub-pixel are formed in the second direction, and a second display area in which only the main pixel is formed in the second direction, wherein the display unit includes the first display area, the second display area, and the first display area in that order from an end in parallel to the first direction, and wherein a longitudinal-bar part of the flat T-letter shape is tilted from the second direction, the sub-pixel is disposed, respectively, on both sides of the longitudinal-bar part of the flat T-letter shape, and a boundary between a first display range and a second display range is gradually changed through having sides of the sub-pixel neighboring the longitudinal-bar part tilted from the second direction.

14. An electronic appliance comprising the display device claimed in claim 13.

15. A display device, comprising:

a display part in which a plurality of display units each containing a main pixel for displaying a first image and a sub-pixel for displaying a second image are arranged in matrix in a first direction and a second direction that crosses with the first direction; and a parallax barrier provided by being corresponded to each of the display units for distributing light emitted from the display units to different directions at least along the first direction, wherein a value of a pitch of each of the display units in the first direction is substantially the same as a value of an arranging pitch of a slit of the parallax barrier in the first direction, wherein a center part of each of the display units in the first direction is substantially aligned with a center part of the slit in the first direction, wherein a display area of the display unit includes a first display area in which the main pixel and the sub-pixel are formed in the second direction, and a second display area in which only the main pixel is formed in the second direction, wherein the display area of the display unit includes the first display area, the second display area, and the first display area in that order in the first direction, wherein, at one side of the first display area near the second display area, a boundary between the main pixel and the sub-pixel has a meandering shape, and the main pixel from which the longitudinal-bar part is eliminated and the sub-pixel are mixed in a fine manner, and wherein the display unit includes the first display area, the second display area, and the first display area in that order from an end in parallel to the first direction.

16. An electronic appliance comprising the display device claimed in claim 15.

* * * * *